(12) United States Patent
Kimura et al.

(10) Patent No.: US 6,351,569 B1
(45) Date of Patent: Feb. 26, 2002

(54) CODING METHOD, DECODING METHOD, CODING DEVICE AND DECODING DEVICE

(75) Inventors: Tomohiro Kimura; Masayuki Yoshida; Fumitaka Ono, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/155,166

(22) PCT Filed: Jan. 14, 1998

(86) PCT No.: PCT/JP98/00102

§ 371 Date: Sep. 23, 1998

§ 102(e) Date: Sep. 23, 1998

(87) PCT Pub. No.: WO98/33322

PCT Pub. Date: Jul. 30, 1998

(30) Foreign Application Priority Data

Jan. 29, 1997 (JP) .............................................. 9-015536

(51) Int. Cl.$^7$ ................................................ G06K 9/36
(52) U.S. Cl. ...................................... 382/247; 382/233
(58) Field of Search ................................ 382/238, 239, 382/240, 241, 242, 243, 244, 245, 246, 247, 248, 249; 348/415, 416, 417

(56) References Cited

U.S. PATENT DOCUMENTS

| | | |
|---|---|---|
| 4,191,974 A | 3/1980 | Ono et al. |
| 4,213,154 A | 7/1980 | Ono et al. |
| 4,542,411 A | 9/1985 | Imanaka et al. |
| 4,816,914 A * | 3/1989 | Ericsson ...................... 358/133 |
| 4,849,810 A * | 7/1989 | Ericsson ...................... 358/133 |
| 5,059,976 A | 10/1991 | Ono et al. |
| 5,297,220 A | 3/1994 | Nomizu |
| 5,307,062 A | 4/1994 | Ono et al. |
| 5,313,204 A | 5/1994 | Semasa et al. |
| 5,404,140 A | 4/1995 | Ono et al. |
| 5,828,411 A * | 10/1998 | Takizawa ..................... 348/415 |
| 5,960,116 A * | 9/1999 | Kajiwara ..................... 382/238 |

FOREIGN PATENT DOCUMENTS

| | | |
|---|---|---|
| JP | A6 38048 | 2/1994 |
| JP | B2834433 | 3/1996 |
| JP | B22504316 | 4/1996 |

OTHER PUBLICATIONS

Japanese abstract: JPA5–176171 Jul. 13, 1993.
Japanese abstract: JPA4–122174 Apr. 22, 1992.
Japanese abstract: JPA2–305225, Dec. 18, 1990.

(List continued on next page.)

Primary Examiner—Phuoc Tran
Assistant Examiner—Amir Alavi

(57) ABSTRACT

A prediction value is previously set in an MPS table corresponding to a state number, a state number for an encoding pixel is obtained from a STATE table, the prediction value is determined based on the MPS table using the state number, a pixel-to-symbol converter compares the prediction value and the encoding pixel to obtain a symbol, and an arithmetic encoder obtains an LPS interval from an LSZ table using the state number for the encoding pixel, and the arithmetic encoder implements encoding based on the symbol and the LPS interval.

32 Claims, 56 Drawing Sheets

OTHER PUBLICATIONS

Japanese abstract: JPA6–164940, Jun. 10, 1994.
Japanese abstract: JPA62–108663, May 19, 1987.
Japanese abstract: JPA57–147346, Sep. 11, 1982.
Japanese abstract: JPA58–94274, Jun. 4, 1983.
Japanese abstract: JPA57–147325, Sep. 11, 1982.
Japanese abstract: JPA6–181523 Jun. 28, 1994.
Japanese abstract: JP53–98718, Aug. 29, 1978.
Japanese abstract: JP53–98719, Aug. 29, 1978.
Japanese abstract: JP53–98720, Aug. 29, 1978.
Japanese abstract: JPA61–65573, Apr. 4, 1986.
Japanese abstract: JPA58–94275, Jun. 4, 1983.
Japanese abstract: JPA59–30366, Feb. 17, 1984.
Japanese abstract: JPA59–30367, Feb. 17, 1984.
Japanese abstract: JPA5–191770, Jul. 30, 1993.
Japanese abstract: JPA5–91459, Apr. 9, 1993.
Japanese abstract: JPA5–91460, Apr. 9, 1993.
Run Length Encoding Method According To Start Patterns of Prediction Transformation Signals, Ryoichi et al., General National Assembly of the Institute of Electronics and Communication Engineers held in 1977 pp. 1–4.
ITU–T Recommendation T.81 (In Japanese and English).
ITU–T Recommendation T.82 pp. 26–45.

* cited by examiner

\* : ENCODING/DECODING PIXEL (A) 2-LINE MODEL TEMPLATE (B) 3-LINE MODEL TEMPLATE

Fig.42

| ST | LSZ | NLPS | NMPS | SWTCH | ST | LSZ | NLPS | NMPS | SWTCH |
|---|---|---|---|---|---|---|---|---|---|
| 0 | 0x5a1d | 1 | 1 | 1 | 57 | 0x01a4 | 55 | 58 | 0 |
| 1 | 0x2586 | 14 | 2 | 0 | 58 | 0x0160 | 56 | 59 | 0 |
| 2 | 0x1114 | 16 | 3 | 0 | 59 | 0x0125 | 57 | 60 | 0 |
| 3 | 0x080b | 18 | 4 | 0 | 60 | 0x00f6 | 58 | 61 | 0 |
| 4 | 0x03d8 | 20 | 5 | 0 | 61 | 0x00cb | 59 | 62 | 0 |
| 5 | 0x01da | 23 | 6 | 0 | 62 | 0x00ab | 61 | 63 | 0 |
| 6 | 0x00e5 | 25 | 7 | 0 | 63 | 0x008f | 61 | 32 | 0 |
| 7 | 0x006f | 28 | 8 | 0 | 64 | 0x5b12 | 65 | 65 | 1 |
| 8 | 0x0036 | 30 | 9 | 0 | 65 | 0x4d04 | 80 | 66 | 0 |
| 9 | 0x001a | 33 | 10 | 0 | 66 | 0x412c | 81 | 67 | 0 |
| 10 | 0x000d | 35 | 11 | 0 | 67 | 0x37d8 | 82 | 68 | 0 |
| 11 | 0x0006 | 9 | 12 | 0 | 68 | 0x2fe8 | 83 | 69 | 0 |
| 12 | 0x0003 | 10 | 13 | 0 | 69 | 0x293c | 84 | 70 | 0 |
| 13 | 0x0001 | 12 | 13 | 0 | 70 | 0x2379 | 86 | 71 | 0 |
| 14 | 0x5a7f | 15 | 15 | 1 | 71 | 0x1edf | 87 | 72 | 0 |
| 15 | 0x3f25 | 36 | 16 | 0 | 72 | 0x1aa9 | 87 | 73 | 0 |
| 16 | 0x2cf2 | 38 | 17 | 0 | 73 | 0x174e | 72 | 74 | 0 |
| 17 | 0x207c | 39 | 18 | 0 | 74 | 0x1424 | 72 | 75 | 0 |
| 18 | 0x17b9 | 40 | 19 | 0 | 75 | 0x119c | 74 | 76 | 0 |
| 19 | 0x1182 | 42 | 20 | 0 | 76 | 0x0f6b | 74 | 77 | 0 |
| 20 | 0x0cef | 43 | 21 | 0 | 77 | 0x0d51 | 75 | 78 | 0 |
| 21 | 0x09a1 | 45 | 22 | 0 | 78 | 0x0bb6 | 77 | 79 | 0 |
| 22 | 0x072f | 46 | 23 | 0 | 79 | 0x0a40 | 77 | 48 | 0 |
| 23 | 0x055c | 48 | 24 | 0 | 80 | 0x5832 | 80 | 81 | 1 |
| 24 | 0x0406 | 49 | 25 | 0 | 81 | 0x4d1c | 88 | 82 | 0 |
| 25 | 0x0303 | 51 | 26 | 0 | 82 | 0x438e | 89 | 83 | 0 |
| 26 | 0x0240 | 52 | 27 | 0 | 83 | 0x3bdd | 90 | 84 | 0 |
| 27 | 0x01b1 | 54 | 28 | 0 | 84 | 0x34ee | 91 | 85 | 0 |
| 28 | 0x0144 | 56 | 29 | 0 | 85 | 0x2eae | 92 | 86 | 0 |
| 29 | 0x00f5 | 57 | 30 | 0 | 86 | 0x299a | 93 | 87 | 0 |
| 30 | 0x00b7 | 59 | 31 | 0 | 87 | 0x2516 | 86 | 71 | 0 |
| 31 | 0x008a | 60 | 32 | 0 | 88 | 0x5570 | 88 | 89 | 1 |
| 32 | 0x0068 | 62 | 33 | 0 | 89 | 0x4ca9 | 95 | 90 | 0 |
| 33 | 0x004e | 63 | 34 | 0 | 90 | 0x44d9 | 96 | 91 | 0 |
| 34 | 0x003b | 32 | 35 | 0 | 91 | 0x3e22 | 97 | 92 | 0 |
| 35 | 0x002c | 33 | 9 | 0 | 92 | 0x3824 | 99 | 93 | 0 |
| 36 | 0x5ae1 | 37 | 37 | 1 | 93 | 0x32b4 | 99 | 94 | 0 |
| 37 | 0x484c | 64 | 38 | 0 | 94 | 0x2e17 | 93 | 86 | 0 |
| 38 | 0x3a0d | 65 | 39 | 0 | 95 | 0x56a8 | 95 | 96 | 1 |
| 39 | 0x2ef1 | 67 | 40 | 0 | 96 | 0x4f46 | 101 | 97 | 0 |
| 40 | 0x261f | 68 | 41 | 0 | 97 | 0x47e5 | 102 | 98 | 0 |
| 41 | 0x1f33 | 69 | 42 | 0 | 98 | 0x41cf | 103 | 99 | 0 |
| 42 | 0x19a8 | 70 | 43 | 0 | 99 | 0x3c3d | 104 | 100 | 0 |
| 43 | 0x1518 | 72 | 44 | 0 | 100 | 0x375e | 99 | 93 | 0 |
| 44 | 0x1177 | 73 | 45 | 0 | 101 | 0x5231 | 105 | 102 | 0 |
| 45 | 0x0e74 | 74 | 46 | 0 | 102 | 0x4c0f | 106 | 103 | 0 |
| 46 | 0x0bfb | 75 | 47 | 0 | 103 | 0x4639 | 107 | 104 | 0 |
| 47 | 0x09f8 | 77 | 48 | 0 | 104 | 0x415e | 103 | 99 | 0 |
| 48 | 0x0861 | 78 | 49 | 0 | 105 | 0x5627 | 105 | 106 | 1 |
| 49 | 0x0706 | 79 | 50 | 0 | 106 | 0x50e7 | 108 | 107 | 0 |
| 50 | 0x05cd | 48 | 51 | 0 | 107 | 0x4b85 | 109 | 103 | 0 |
| 51 | 0x04de | 50 | 52 | 0 | 108 | 0x5597 | 110 | 109 | 0 |
| 52 | 0x040f | 50 | 53 | 0 | 109 | 0x504f | 111 | 107 | 0 |
| 53 | 0x0363 | 51 | 54 | 0 | 110 | 0x5a10 | 110 | 111 | 1 |
| 54 | 0x02d4 | 52 | 55 | 0 | 111 | 0x5522 | 112 | 109 | 0 |
| 55 | 0x025c | 53 | 56 | 0 | 112 | 0x59eb | 112 | 111 | 1 |
| 56 | 0x01f8 | 54 | 57 | 0 | | | | | |

Fig.47

| CX | ST |
|---|---|
| 0 | 0 |
| 1 | 1→14 |
| 2 | 0 |
| ⋮ | ⋮ |
| 1023 | 0 |

Fig.48

| CX | ST |
|---|---|
| 0 | 0 |
| 1 | 14→15 |
| 2 | 0 |
| ⋮ | ⋮ |
| 1023 | 0 |

Fig.49

| CX | STATE |
|---|---|
| 0 | 0 |
| 1 | 0 |
| 2 | 0 |
| ⋮ | ⋮ |
| 1023 | 0 |

47

8bit

Fig.50

| ST | LSZ | NLPS | NMPS | MPS | LPS |
|---|---|---|---|---|---|
| 0 | 0x5a1d | 129 | 1 | 0 | 1 |
| 1 | 0x2586 | 14 | 2 | 0 | 1 |
| 2 | 0x1114 | 16 | 3 | 0 | 1 |
| 3 | 0x080b | 18 | 4 | 0 | 1 |
| 4 | 0x03d8 | 20 | 5 | 0 | 1 |
| 5 | 0x01da | 23 | 6 | 0 | 1 |
| 6 | 0x00e5 | 25 | 7 | 0 | 1 |
| 7 | 0x006f | 28 | 8 | 0 | 1 |
| 8 | 0x0036 | 30 | 9 | 0 | 1 |
| 9 | 0x001a | 33 | 10 | 0 | 1 |
| 10 | 0x000d | 35 | 11 | 0 | 1 |
| 11 | 0x0006 | 9 | 12 | 0 | 1 |
| 12 | 0x0003 | 10 | 13 | 0 | 1 |
| 13 | 0x0001 | 12 | 13 | 0 | 1 |
| 14 | 0x5a7f | 143 | 15 | 0 | 1 |
| 15 | 0x3f25 | 36 | 16 | 0 | 1 |
| 16 | 0x2cf2 | 38 | 17 | 0 | 1 |
| 17 | 0x207c | 39 | 18 | 0 | 1 |
| 18 | 0x17b9 | 40 | 19 | 0 | 1 |
| 19 | 0x1182 | 42 | 20 | 0 | 1 |
| 20 | 0x0cef | 43 | 21 | 0 | 1 |
| 21 | 0x09a1 | 45 | 22 | 0 | 1 |
| 22 | 0x072f | 46 | 23 | 0 | 1 |
| 23 | 0x055c | 48 | 24 | 0 | 1 |
| 24 | 0x0406 | 49 | 25 | 0 | 1 |
| 25 | 0x0303 | 51 | 26 | 0 | 1 |
| 26 | 0x0240 | 52 | 27 | 0 | 1 |
| 27 | 0x01b1 | 54 | 28 | 0 | 1 |
| 28 | 0x0144 | 56 | 29 | 0 | 1 |
| 29 | 0x00f5 | 57 | 30 | 0 | 1 |
| 30 | 0x00b7 | 59 | 31 | 0 | 1 |
| 31 | 0x008a | 60 | 32 | 0 | 1 |
| 32 | 0x0068 | 62 | 33 | 0 | 1 |
| 33 | 0x004e | 63 | 34 | 0 | 1 |
| 34 | 0x003b | 32 | 35 | 0 | 1 |
| 35 | 0x002c | 33 | 9 | 0 | 1 |
| 36 | 0x5ae1 | 165 | 37 | 0 | 1 |
| 37 | 0x484c | 64 | 38 | 0 | 1 |
| 38 | 0x3a0d | 65 | 39 | 0 | 1 |
| 39 | 0x2ef1 | 67 | 40 | 0 | 1 |
| 40 | 0x261f | 68 | 41 | 0 | 1 |
| 41 | 0x1f33 | 69 | 42 | 0 | 1 |
| 42 | 0x19a8 | 70 | 43 | 0 | 1 |
| 43 | 0x1518 | 72 | 44 | 0 | 1 |
| 44 | 0x1177 | 73 | 45 | 0 | 1 |
| 45 | 0x0e74 | 74 | 46 | 0 | 1 |
| 46 | 0x0bfb | 75 | 47 | 0 | 1 |
| 47 | 0x09f8 | 77 | 48 | 0 | 1 |
| 48 | 0x0861 | 78 | 49 | 0 | 1 |
| 49 | 0x0706 | 79 | 50 | 0 | 1 |
| 50 | 0x05cd | 48 | 51 | 0 | 1 |
| 51 | 0x04de | 50 | 52 | 0 | 1 |
| 52 | 0x040f | 50 | 53 | 0 | 1 |
| 53 | 0x0363 | 51 | 54 | 0 | 1 |
| 54 | 0x02d4 | 52 | 55 | 0 | 1 |
| 55 | 0x025c | 53 | 56 | 0 | 1 |
| 56 | 0x01f8 | 54 | 57 | 0 | 1 |
| 57 | 0x01a4 | 55 | 58 | 0 | 1 |
| 58 | 0x0160 | 56 | 59 | 0 | 1 |
| 59 | 0x0125 | 57 | 60 | 0 | 1 |
| 60 | 0x00f6 | 58 | 61 | 0 | 1 |
| 61 | 0x00cb | 59 | 62 | 0 | 1 |
| 62 | 0x00ab | 61 | 63 | 0 | 1 |
| 63 | 0x008f | 61 | 32 | 0 | 1 |
| 64 | 0x5b12 | 193 | 65 | 0 | 1 |
| 65 | 0x4d04 | 80 | 66 | 0 | 1 |
| 66 | 0x412c | 81 | 67 | 0 | 1 |
| 67 | 0x37d8 | 82 | 68 | 0 | 1 |
| 68 | 0x2fe8 | 83 | 69 | 0 | 1 |
| 69 | 0x293c | 84 | 70 | 0 | 1 |
| 70 | 0x2379 | 86 | 71 | 0 | 1 |
| 71 | 0x1edf | 87 | 72 | 0 | 1 |
| 72 | 0x1aa9 | 87 | 73 | 0 | 1 |
| 73 | 0x174e | 72 | 74 | 0 | 1 |
| 74 | 0x1424 | 72 | 75 | 0 | 1 |
| 75 | 0x119c | 74 | 76 | 0 | 1 |
| 76 | 0x0f6b | 74 | 77 | 0 | 1 |
| 77 | 0x0d51 | 75 | 78 | 0 | 1 |
| 78 | 0x0bb6 | 77 | 79 | 0 | 1 |
| 79 | 0x0a40 | 77 | 48 | 0 | 1 |
| 80 | 0x5832 | 208 | 81 | 0 | 1 |
| 81 | 0x4d1c | 88 | 82 | 0 | 1 |
| 82 | 0x438e | 89 | 83 | 0 | 1 |
| 83 | 0x3bdd | 90 | 84 | 0 | 1 |
| 84 | 0x34ee | 91 | 85 | 0 | 1 |
| 85 | 0x2eae | 92 | 86 | 0 | 1 |
| 86 | 0x299a | 93 | 87 | 0 | 1 |
| 87 | 0x2516 | 86 | 71 | 0 | 1 |
| 88 | 0x5570 | 216 | 89 | 0 | 1 |
| 89 | 0x4ca9 | 95 | 90 | 0 | 1 |
| 90 | 0x44d9 | 96 | 91 | 0 | 1 |
| 91 | 0x3e22 | 97 | 92 | 0 | 1 |
| 92 | 0x3824 | 99 | 93 | 0 | 1 |
| 93 | 0x32b4 | 99 | 94 | 0 | 1 |
| 94 | 0x2e17 | 93 | 86 | 0 | 1 |
| 95 | 0x56a8 | 223 | 96 | 0 | 1 |
| 96 | 0x4f46 | 101 | 97 | 0 | 1 |
| 97 | 0x47e5 | 102 | 98 | 0 | 1 |
| 98 | 0x41cf | 103 | 99 | 0 | 1 |
| 99 | 0x3c3d | 104 | 100 | 0 | 1 |
| 100 | 0x375e | 99 | 93 | 0 | 1 |
| 101 | 0x5231 | 105 | 102 | 0 | 1 |
| 102 | 0x4c0f | 106 | 103 | 0 | 1 |
| 103 | 0x4639 | 107 | 104 | 0 | 1 |
| 104 | 0x415e | 103 | 99 | 0 | 1 |
| 105 | 0x5627 | 233 | 106 | 0 | 1 |
| 106 | 0x50e7 | 108 | 107 | 0 | 1 |
| 107 | 0x4b85 | 109 | 103 | 0 | 1 |
| 108 | 0x5597 | 110 | 109 | 0 | 1 |
| 109 | 0x504f | 111 | 107 | 0 | 1 |
| 110 | 0x5a10 | 238 | 111 | 0 | 1 |
| 111 | 0x5522 | 112 | 109 | 0 | 1 |
| 112 | 0x59eb | 240 | 111 | 0 | 1 |

Fig.51

| ST | LSZ | NLPS | NMPS | MPS | LPS | ST | LSZ | NLPS | NMPS | MPS | LPS |
|---|---|---|---|---|---|---|---|---|---|---|---|
| | | | | | | 185 | 0x01a4 | 183 | 186 | 1 | 0 |
| 129 | 0x2586 | 142 | 130 | 1 | 0 | 186 | 0x0160 | 184 | 187 | 1 | 0 |
| 130 | 0x1114 | 144 | 131 | 1 | 0 | 187 | 0x0125 | 185 | 188 | 1 | 0 |
| 131 | 0x080b | 146 | 132 | 1 | 0 | 188 | 0x00f6 | 186 | 189 | 1 | 0 |
| 132 | 0x03d8 | 148 | 133 | 1 | 0 | 189 | 0x00cb | 187 | 190 | 1 | 0 |
| 133 | 0x01da | 151 | 134 | 1 | 0 | 190 | 0x00ab | 189 | 191 | 1 | 0 |
| 134 | 0x00e5 | 153 | 135 | 1 | 0 | 191 | 0x008f | 189 | 160 | 1 | 0 |
| 135 | 0x006f | 156 | 136 | 1 | 0 | 192 | 0x5b12 | 65 | 193 | 1 | 0 |
| 136 | 0x0036 | 158 | 137 | 1 | 0 | 193 | 0x4d04 | 208 | 194 | 1 | 0 |
| 137 | 0x001a | 161 | 138 | 1 | 0 | 194 | 0x412c | 209 | 195 | 1 | 0 |
| 138 | 0x000d | 163 | 139 | 1 | 0 | 195 | 0x37d8 | 210 | 196 | 1 | 0 |
| 139 | 0x0006 | 137 | 140 | 1 | 0 | 196 | 0x2fe8 | 211 | 197 | 1 | 0 |
| 140 | 0x0003 | 138 | 141 | 1 | 0 | 197 | 0x293c | 212 | 198 | 1 | 0 |
| 141 | 0x0001 | 140 | 141 | 1 | 0 | 198 | 0x2379 | 214 | 199 | 1 | 0 |
| 142 | 0x5a7f | 15 | 143 | 1 | 0 | 199 | 0x1edf | 215 | 200 | 1 | 0 |
| 143 | 0x3f25 | 164 | 144 | 1 | 0 | 200 | 0x1aa9 | 215 | 201 | 1 | 0 |
| 144 | 0x2cf2 | 166 | 145 | 1 | 0 | 201 | 0x174e | 200 | 202 | 1 | 0 |
| 145 | 0x207c | 167 | 146 | 1 | 0 | 202 | 0x1424 | 200 | 203 | 1 | 0 |
| 146 | 0x17b9 | 168 | 147 | 1 | 0 | 203 | 0x119c | 202 | 204 | 1 | 0 |
| 147 | 0x1182 | 170 | 148 | 1 | 0 | 204 | 0x0f6b | 202 | 205 | 1 | 0 |
| 148 | 0x0cef | 171 | 149 | 1 | 0 | 205 | 0x0d51 | 203 | 206 | 1 | 0 |
| 149 | 0x09a1 | 173 | 150 | 1 | 0 | 206 | 0x0bb6 | 205 | 207 | 1 | 0 |
| 150 | 0x072f | 174 | 151 | 1 | 0 | 207 | 0x0a40 | 205 | 176 | 1 | 0 |
| 151 | 0x055c | 176 | 152 | 1 | 0 | 208 | 0x5832 | 80 | 209 | 1 | 0 |
| 152 | 0x0406 | 177 | 153 | 1 | 0 | 209 | 0x4d1c | 216 | 210 | 1 | 0 |
| 153 | 0x0303 | 179 | 154 | 1 | 0 | 210 | 0x438e | 217 | 211 | 1 | 0 |
| 154 | 0x0240 | 180 | 155 | 1 | 0 | 211 | 0x3bdd | 218 | 212 | 1 | 0 |
| 155 | 0x01b1 | 182 | 156 | 1 | 0 | 212 | 0x34ee | 219 | 213 | 1 | 0 |
| 156 | 0x0144 | 184 | 157 | 1 | 0 | 213 | 0x2eae | 220 | 214 | 1 | 0 |
| 157 | 0x00f5 | 185 | 158 | 1 | 0 | 214 | 0x299a | 221 | 215 | 1 | 0 |
| 158 | 0x00b7 | 187 | 159 | 1 | 0 | 215 | 0x2516 | 214 | 199 | 1 | 0 |
| 159 | 0x008a | 188 | 160 | 1 | 0 | 216 | 0x5570 | 88 | 217 | 1 | 0 |
| 160 | 0x0068 | 190 | 161 | 1 | 0 | 217 | 0x4ca9 | 223 | 218 | 1 | 0 |
| 161 | 0x004e | 191 | 162 | 1 | 0 | 218 | 0x44d9 | 224 | 219 | 1 | 0 |
| 162 | 0x003b | 160 | 163 | 1 | 0 | 219 | 0x3e22 | 225 | 220 | 1 | 0 |
| 163 | 0x002c | 161 | 137 | 1 | 0 | 220 | 0x3824 | 227 | 221 | 1 | 0 |
| 164 | 0x5ae1 | 37 | 165 | 1 | 0 | 221 | 0x32b4 | 227 | 222 | 1 | 0 |
| 165 | 0x484c | 192 | 166 | 1 | 0 | 222 | 0x2e17 | 221 | 214 | 1 | 0 |
| 166 | 0x3a0d | 193 | 167 | 1 | 0 | 223 | 0x56a8 | 95 | 224 | 1 | 0 |
| 167 | 0x2ef1 | 195 | 168 | 1 | 0 | 224 | 0x4f46 | 229 | 225 | 1 | 0 |
| 168 | 0x261f | 196 | 169 | 1 | 0 | 225 | 0x47e5 | 230 | 226 | 1 | 0 |
| 169 | 0x1f33 | 197 | 170 | 1 | 0 | 226 | 0x41cf | 231 | 227 | 1 | 0 |
| 170 | 0x19a8 | 198 | 171 | 1 | 0 | 227 | 0x3c3d | 232 | 228 | 1 | 0 |
| 171 | 0x1518 | 200 | 172 | 1 | 0 | 228 | 0x375e | 227 | 221 | 1 | 0 |
| 172 | 0x1177 | 201 | 173 | 1 | 0 | 229 | 0x5231 | 233 | 230 | 1 | 0 |
| 173 | 0x0e74 | 202 | 174 | 1 | 0 | 230 | 0x4c0f | 234 | 231 | 1 | 0 |
| 174 | 0x0bfb | 203 | 175 | 1 | 0 | 231 | 0x4639 | 235 | 232 | 1 | 0 |
| 175 | 0x09f8 | 205 | 176 | 1 | 0 | 232 | 0x415e | 231 | 227 | 1 | 0 |
| 176 | 0x0861 | 206 | 177 | 1 | 0 | 233 | 0x5627 | 105 | 234 | 1 | 0 |
| 177 | 0x0706 | 207 | 178 | 1 | 0 | 234 | 0x50e7 | 236 | 235 | 1 | 0 |
| 178 | 0x05cd | 176 | 179 | 1 | 0 | 235 | 0x4b85 | 237 | 231 | 1 | 0 |
| 179 | 0x04de | 178 | 180 | 1 | 0 | 236 | 0x5597 | 238 | 237 | 1 | 0 |
| 180 | 0x040f | 178 | 181 | 1 | 0 | 237 | 0x504f | 239 | 235 | 1 | 0 |
| 181 | 0x0363 | 179 | 182 | 1 | 0 | 238 | 0x5a10 | 110 | 239 | 1 | 0 |
| 182 | 0x02d4 | 180 | 183 | 1 | 0 | 239 | 0x5522 | 240 | 237 | 1 | 0 |
| 183 | 0x025c | 181 | 184 | 1 | 0 | 240 | 0x59eb | 112 | 239 | 1 | 0 |
| 184 | 0x01f8 | 182 | 185 | 1 | 0 | | | | | | |

Fig.52

| CX | STATE |
|---|---|
| 0 | 0 |
| 1 | 0→129 |
| 2 | 0 |
| ⋮ | ⋮ |
| 1023 | 0 |

47

8bit

Fig.53

| CX | STATE |
|---|---|
| 0 | 0 |
| 1 | 129→142 |
| 2 | 0 |
| ⋮ | ⋮ |
| 1023 | 0 |

47

8bit

Fig.54

| CX | STATE |
|---|---|
| 0 | 0 |
| 1 | 142→143 |
| 2 | 0 |
| ⋮ | ⋮ |
| 1023 | 0 |

8bit

Fig.55

| PIX.No. | MPS | ST | STATE | |
|---|---|---|---|---|
| 1 | 0 | 0 | 0×128+ 0 → | 0 |
| 2 | 1 | 1 | 1×128+ 1 → | 129 |
| 3 | 1 | 14 | 1×128+14 → | 142 |
| 4 | 1 | 15 | 1×128+15 → | 143 |
| ⋮ | ⋮ | ⋮ | ⋮ | |

Fig.57

| ENCODING DETAIL | CHARACTER IMAGE | ERR. DIFFUSION IMAGE |
|---|---|---|
| IMAGE SIZE | 1728×2376 | 3248×4500 |
| NUMBER OF PIXELS | 4105728 | 14616000 |
| LPS RATIO (SWTCH DETECTION RATIO) =NO. OF LPS/NO. OF PIX | 0.79% | 25.6% |
| INVERSION RATIO OF PRED. VAL. =NO. OF INVERSION OF PRED. VAL./ NO. OF SWTCH DETECTION | 9.2% | 9.6% |

Fig.58

| ST | LSZ | NLPS | NMPS | MPS | LPS | ST | LSZ | NLPS | NMPS | MPS | LPS |
|---|---|---|---|---|---|---|---|---|---|---|---|
| 0 | 0x5a1d | 3 | 2 | 0 | 1 | 57 | 0x0144 | 113 | 59 | 1 | 0 |
| 1 | | | | | | 58 | 0x00f5 | 114 | 60 | 0 | 1 |
| 2 | 0x2586 | 28 | 4 | 0 | 1 | 59 | 0x00f5 | 115 | 61 | 1 | 0 |
| 3 | 0x2586 | 29 | 5 | 1 | 0 | 60 | 0x00b7 | 118 | 62 | 0 | 1 |
| 4 | 0x1114 | 32 | 6 | 0 | 1 | 61 | 0x00b7 | 119 | 63 | 1 | 0 |
| 5 | 0x1114 | 33 | 7 | 1 | 0 | 62 | 0x008a | 120 | 64 | 0 | 1 |
| 6 | 0x080b | 36 | 8 | 0 | 1 | 63 | 0x008a | 121 | 65 | 1 | 0 |
| 7 | 0x080b | 37 | 9 | 1 | 0 | 64 | 0x0068 | 124 | 66 | 0 | 1 |
| 8 | 0x03d8 | 40 | 10 | 0 | 1 | 65 | 0x0068 | 125 | 67 | 1 | 0 |
| 9 | 0x03d8 | 41 | 11 | 1 | 0 | 66 | 0x004e | 126 | 68 | 0 | 1 |
| 10 | 0x01da | 46 | 12 | 0 | 1 | 67 | 0x004e | 127 | 69 | 1 | 0 |
| 11 | 0x01da | 47 | 13 | 1 | 0 | 68 | 0x003b | 64 | 70 | 0 | 1 |
| 12 | 0x00e5 | 50 | 14 | 0 | 1 | 69 | 0x003b | 65 | 71 | 1 | 0 |
| 13 | 0x00e5 | 51 | 15 | 1 | 0 | 70 | 0x002c | 66 | 18 | 0 | 1 |
| 14 | 0x006f | 56 | 16 | 0 | 1 | 71 | 0x002c | 67 | 19 | 1 | 0 |
| 15 | 0x006f | 57 | 17 | 1 | 0 | 72 | 0x5ae1 | 75 | 74 | 0 | 1 |
| 16 | 0x0036 | 60 | 18 | 0 | 1 | 73 | 0x5ae1 | 74 | 75 | 1 | 0 |
| 17 | 0x0036 | 61 | 19 | 1 | 0 | 74 | 0x484c | 128 | 76 | 0 | 1 |
| 18 | 0x001a | 66 | 20 | 0 | 1 | 75 | 0x484c | 129 | 77 | 1 | 0 |
| 19 | 0x001a | 67 | 21 | 1 | 0 | 76 | 0x3a0d | 130 | 78 | 0 | 1 |
| 20 | 0x000d | 70 | 22 | 0 | 1 | 77 | 0x3a0d | 131 | 79 | 1 | 0 |
| 21 | 0x000d | 71 | 23 | 1 | 0 | 78 | 0x2ef1 | 134 | 80 | 0 | 1 |
| 22 | 0x0006 | 18 | 24 | 0 | 1 | 79 | 0x2ef1 | 135 | 81 | 1 | 0 |
| 23 | 0x0006 | 19 | 25 | 1 | 0 | 80 | 0x261f | 136 | 82 | 0 | 1 |
| 24 | 0x0003 | 20 | 26 | 0 | 1 | 81 | 0x261f | 137 | 83 | 1 | 0 |
| 25 | 0x0003 | 21 | 27 | 1 | 0 | 82 | 0x1f33 | 138 | 84 | 0 | 1 |
| 26 | 0x0001 | 24 | 26 | 0 | 1 | 83 | 0x1f33 | 139 | 85 | 1 | 0 |
| 27 | 0x0001 | 25 | 27 | 1 | 0 | 84 | 0x19a8 | 140 | 86 | 0 | 1 |
| 28 | 0x5a7f | 31 | 30 | 0 | 1 | 85 | 0x19a8 | 141 | 87 | 1 | 0 |
| 29 | 0x5a7f | 30 | 31 | 1 | 0 | 86 | 0x1518 | 144 | 88 | 0 | 1 |
| 30 | 0x3f25 | 72 | 32 | 0 | 1 | 87 | 0x1518 | 145 | 89 | 1 | 0 |
| 31 | 0x3f25 | 73 | 33 | 1 | 0 | 88 | 0x1177 | 146 | 90 | 0 | 1 |
| 32 | 0x2cf2 | 76 | 34 | 0 | 1 | 89 | 0x1177 | 147 | 91 | 1 | 0 |
| 33 | 0x2cf2 | 77 | 35 | 1 | 0 | 90 | 0x0e74 | 148 | 92 | 0 | 1 |
| 34 | 0x207c | 78 | 36 | 0 | 1 | 91 | 0x0e74 | 149 | 93 | 1 | 0 |
| 35 | 0x207c | 79 | 37 | 1 | 0 | 92 | 0x0bfb | 150 | 94 | 0 | 1 |
| 36 | 0x17b9 | 80 | 38 | 0 | 1 | 93 | 0x0bfb | 151 | 95 | 1 | 0 |
| 37 | 0x17b9 | 81 | 39 | 1 | 0 | 94 | 0x09f8 | 154 | 96 | 0 | 1 |
| 38 | 0x1182 | 84 | 40 | 0 | 1 | 95 | 0x09f8 | 155 | 97 | 1 | 0 |
| 39 | 0x1182 | 85 | 41 | 1 | 0 | 96 | 0x0861 | 156 | 98 | 0 | 1 |
| 40 | 0x0cef | 86 | 42 | 0 | 1 | 97 | 0x0861 | 157 | 99 | 1 | 0 |
| 41 | 0x0cef | 87 | 43 | 1 | 0 | 98 | 0x0706 | 158 | 100 | 0 | 1 |
| 42 | 0x09a1 | 90 | 44 | 0 | 1 | 99 | 0x0706 | 159 | 101 | 1 | 0 |
| 43 | 0x09a1 | 91 | 45 | 1 | 0 | 100 | 0x05cd | 96 | 102 | 0 | 1 |
| 44 | 0x072f | 92 | 46 | 0 | 1 | 101 | 0x05cd | 97 | 103 | 1 | 0 |
| 45 | 0x072f | 93 | 47 | 1 | 0 | 102 | 0x04de | 100 | 104 | 0 | 1 |
| 46 | 0x055c | 96 | 48 | 0 | 1 | 103 | 0x04de | 101 | 105 | 1 | 0 |
| 47 | 0x055c | 97 | 49 | 1 | 0 | 104 | 0x040f | 100 | 106 | 0 | 1 |
| 48 | 0x0406 | 98 | 50 | 0 | 1 | 105 | 0x040f | 101 | 107 | 1 | 0 |
| 49 | 0x0406 | 99 | 51 | 1 | 0 | 106 | 0x0363 | 102 | 108 | 0 | 1 |
| 50 | 0x0303 | 102 | 52 | 0 | 1 | 107 | 0x0363 | 103 | 109 | 1 | 0 |
| 51 | 0x0303 | 103 | 53 | 1 | 0 | 108 | 0x02d4 | 104 | 110 | 0 | 1 |
| 52 | 0x0240 | 104 | 54 | 0 | 1 | 109 | 0x02d4 | 105 | 111 | 1 | 0 |
| 53 | 0x0240 | 105 | 55 | 1 | 0 | 110 | 0x025c | 106 | 112 | 0 | 1 |
| 54 | 0x01b1 | 108 | 56 | 0 | 1 | 111 | 0x025c | 107 | 113 | 1 | 0 |
| 55 | 0x01b1 | 109 | 57 | 1 | 0 | 112 | 0x01f8 | 108 | 114 | 0 | 1 |
| 56 | 0x0144 | 112 | 58 | 0 | 1 | 113 | 0x01f8 | 109 | 115 | 1 | 0 |

Fig.59

| ST | LSZ | NLPS | NMPS | MPS | LPS | ST | LSZ | NLPS | NMPS | MPS | LPS |
|---|---|---|---|---|---|---|---|---|---|---|---|
| 114 | 0x01a4 | 110 | 116 | 0 | 1 | 171 | 0x2eae | 185 | 173 | 1 | 0 |
| 115 | 0x01a4 | 111 | 117 | 1 | 0 | 172 | 0x299a | 186 | 174 | 0 | 1 |
| 116 | 0x0160 | 112 | 118 | 0 | 1 | 173 | 0x299a | 187 | 175 | 1 | 0 |
| 117 | 0x0160 | 113 | 119 | 1 | 0 | 174 | 0x2516 | 172 | 142 | 0 | 1 |
| 118 | 0x0125 | 114 | 120 | 0 | 1 | 175 | 0x2516 | 173 | 143 | 1 | 0 |
| 119 | 0x0125 | 115 | 121 | 1 | 0 | 176 | 0x5570 | 177 | 178 | 0 | 1 |
| 120 | 0x00f6 | 116 | 122 | 0 | 1 | 177 | 0x5570 | 176 | 179 | 1 | 0 |
| 121 | 0x00f6 | 117 | 123 | 1 | 0 | 178 | 0x4ca9 | 190 | 180 | 0 | 1 |
| 122 | 0x00cb | 118 | 124 | 0 | 1 | 179 | 0x4ca9 | 191 | 181 | 1 | 0 |
| 123 | 0x00cb | 119 | 125 | 1 | 0 | 180 | 0x44d9 | 192 | 182 | 0 | 1 |
| 124 | 0x00ab | 122 | 126 | 0 | 1 | 181 | 0x44d9 | 193 | 183 | 1 | 0 |
| 125 | 0x00ab | 123 | 127 | 1 | 0 | 182 | 0x3e22 | 194 | 184 | 0 | 1 |
| 126 | 0x008f | 122 | 64 | 0 | 1 | 183 | 0x3e22 | 195 | 185 | 1 | 0 |
| 127 | 0x008f | 123 | 65 | 1 | 0 | 184 | 0x3824 | 198 | 186 | 0 | 1 |
| 128 | 0x5b12 | 131 | 130 | 0 | 1 | 185 | 0x3824 | 199 | 187 | 1 | 0 |
| 129 | 0x5b12 | 130 | 131 | 1 | 0 | 186 | 0x32b4 | 198 | 188 | 0 | 1 |
| 130 | 0x4d04 | 160 | 132 | 0 | 1 | 187 | 0x32b4 | 199 | 189 | 1 | 0 |
| 131 | 0x4d04 | 161 | 133 | 1 | 0 | 188 | 0x2e17 | 186 | 172 | 0 | 1 |
| 132 | 0x412c | 162 | 134 | 0 | 1 | 189 | 0x2e17 | 187 | 173 | 1 | 0 |
| 133 | 0x412c | 163 | 135 | 1 | 0 | 190 | 0x56a8 | 191 | 192 | 0 | 1 |
| 134 | 0x37d8 | 164 | 136 | 0 | 1 | 191 | 0x56a8 | 190 | 193 | 1 | 0 |
| 135 | 0x37d8 | 165 | 137 | 1 | 0 | 192 | 0x4f46 | 202 | 194 | 0 | 1 |
| 136 | 0x2fe8 | 166 | 138 | 0 | 1 | 193 | 0x4f46 | 203 | 195 | 1 | 0 |
| 137 | 0x2fe8 | 167 | 139 | 1 | 0 | 194 | 0x47e5 | 204 | 196 | 0 | 1 |
| 138 | 0x293c | 168 | 140 | 0 | 1 | 195 | 0x47e5 | 205 | 197 | 1 | 0 |
| 139 | 0x293c | 169 | 141 | 1 | 0 | 196 | 0x41cf | 206 | 198 | 0 | 1 |
| 140 | 0x2379 | 172 | 142 | 0 | 1 | 197 | 0x41cf | 207 | 199 | 1 | 0 |
| 141 | 0x2379 | 173 | 143 | 1 | 0 | 198 | 0x3c3d | 208 | 200 | 0 | 1 |
| 142 | 0x1edf | 174 | 144 | 0 | 1 | 199 | 0x3c3d | 209 | 201 | 1 | 0 |
| 143 | 0x1edf | 175 | 145 | 1 | 0 | 200 | 0x375e | 198 | 186 | 0 | 1 |
| 144 | 0x1aa9 | 174 | 146 | 0 | 1 | 201 | 0x375e | 199 | 187 | 1 | 0 |
| 145 | 0x1aa9 | 175 | 147 | 1 | 0 | 202 | 0x5231 | 210 | 204 | 0 | 1 |
| 146 | 0x174e | 144 | 148 | 0 | 1 | 203 | 0x5231 | 211 | 205 | 1 | 0 |
| 147 | 0x174e | 145 | 149 | 1 | 0 | 204 | 0x4c0f | 212 | 206 | 0 | 1 |
| 148 | 0x1424 | 144 | 150 | 0 | 1 | 205 | 0x4c0f | 213 | 207 | 1 | 0 |
| 149 | 0x1424 | 145 | 151 | 1 | 0 | 206 | 0x4639 | 214 | 208 | 0 | 1 |
| 150 | 0x119c | 148 | 152 | 0 | 1 | 207 | 0x4639 | 215 | 209 | 1 | 0 |
| 151 | 0x119c | 149 | 153 | 1 | 0 | 208 | 0x415e | 206 | 198 | 0 | 1 |
| 152 | 0x0f6b | 148 | 154 | 0 | 1 | 209 | 0x415e | 207 | 199 | 1 | 0 |
| 153 | 0x0f6b | 149 | 155 | 1 | 0 | 210 | 0x5627 | 211 | 212 | 0 | 1 |
| 154 | 0x0d51 | 150 | 156 | 0 | 1 | 211 | 0x5627 | 210 | 213 | 1 | 0 |
| 155 | 0x0d51 | 151 | 157 | 1 | 0 | 212 | 0x50e7 | 216 | 214 | 0 | 1 |
| 156 | 0x0bb6 | 154 | 158 | 0 | 1 | 213 | 0x50e7 | 217 | 215 | 1 | 0 |
| 157 | 0x0bb6 | 155 | 159 | 1 | 0 | 214 | 0x4b85 | 218 | 206 | 0 | 1 |
| 158 | 0x0a40 | 154 | 96 | 0 | 1 | 215 | 0x4b85 | 219 | 207 | 1 | 0 |
| 159 | 0x0a40 | 155 | 97 | 1 | 0 | 216 | 0x5597 | 220 | 218 | 0 | 1 |
| 160 | 0x5832 | 161 | 162 | 0 | 1 | 217 | 0x5597 | 221 | 219 | 1 | 0 |
| 161 | 0x5832 | 160 | 163 | 1 | 0 | 218 | 0x504f | 222 | 214 | 0 | 1 |
| 162 | 0x4d1c | 176 | 164 | 0 | 1 | 219 | 0x504f | 223 | 215 | 1 | 0 |
| 163 | 0x4d1c | 177 | 165 | 1 | 0 | 220 | 0x5a10 | 221 | 222 | 0 | 1 |
| 164 | 0x438e | 178 | 166 | 0 | 1 | 221 | 0x5a10 | 220 | 223 | 1 | 0 |
| 165 | 0x438e | 179 | 167 | 1 | 0 | 222 | 0x5522 | 224 | 218 | 0 | 1 |
| 166 | 0x3bdd | 180 | 168 | 0 | 1 | 223 | 0x5522 | 225 | 219 | 1 | 0 |
| 167 | 0x3bdd | 181 | 169 | 1 | 0 | 224 | 0x59eb | 225 | 222 | 0 | 1 |
| 168 | 0x34ee | 182 | 170 | 0 | 1 | 225 | 0x59eb | 224 | 223 | 1 | 0 |
| 169 | 0x34ee | 183 | 171 | 1 | 0 | | | | | | |
| 170 | 0x2eae | 184 | 172 | 0 | 1 | | | | | | |

Fig.60

| CX | STATE 11 47 | 10 |
|---|---|---|
| | ST | MPS |
| 0 | 0 | 0 |
| 1 | 0 | 0 |
| 2 | 0 | 0 |
| ⋮ | ⋮ | ⋮ |
| 1023 | 0 | 0 |

CODING METHOD, DECODING METHOD, CODING DEVICE AND DECODING DEVICE

This application is the national phase under 35 U.S.C. §371 of prior PCT International Application No. PCT/JP98/00102 which has an International filing date of Jan. 14, 1998 which designated the United States of America, the entire contents of which are hereby incorporated by reference.

TECHNICAL FIELD

The present invention relates to implementation of encoding and decoding image data.

BACKGROUND ART

A number line encoding method (arithmetic encoding method) is also known as encoding method for Markov information source, where a symbol sequence is mapped between 0.0 and 1.0 on the number line, and its coordinate is encoded into a codeword indicated by, for example, binary notation.

FIG. 1 is a conceptual drawing of the above method. For simplifying an explanation, binary symbols "1" and "0" are supplied at random out of a memoryless state, which is independent of past occurrence states. In this case, an occurrence probability of symbol "1" is defined as r and an occurrence probability of symbol "0" is expressed as 1–r. A range for the symbol "1" is placed at the bottom of the figure. The length of an output sequence of memoryless source is assumed to be three, and coordinates for C(000) through C(111) shown in the right rows are respectively expressed by binary numbers. These binary numbers are cut off at digit, where the number can be identified, and the binary numbers are defined as respective codewords. By defining as above, the codewords can be decoded at a receiving side by operating a process similar to a transmitting side.

In the above case, a mapping range $A_i$ for mapping on the number line of the symbol sequence at the i-th point, minimum coordinates $C_i$ of the mapping range $A_i$ are as follows where an initial value of the mapping range is $A_0=1.0$ and the minimum coordinates $C_0=0.0$:
when an occurring symbol value $a_i$ is "0", $$A_i=(1-r)A_{i-1}$$

$$C_i=C_{i-1}+rA_{i-1};$$

and
when the symbol value $a_i$ is "1", $$A_i=rA_{i-1}$$

$$C_i=C_{i-1}$$

As described in "An overview of the basic principles of the Q-coder Adaptive binary arithmetic coder" (IBM Journal of Research & Development Vol. 32 No. 6, November, 1988), in order to reduce a number of operations such as a multiplication with large operational load, instead of calculating $rA_{i-1}$, a set of fixed values S may be provided as a table. Encoding and decoding with finite precision is implemented by selecting a value corresponding to Markov status out of the table.

Accordingly, as mapping is continuously repeated, the range (interval) $A_{i-1}$ becomes smaller, renormalization is performed (e.g., $A_{i-1}$ is multiplied by power of 2 to keep the value $A_{i-1}$ more than a predefined value), and an operational precision is kept under a virtual decimal point by virtually resetting a decimal point. In obtaining an actual codeword, the above set of fixed values can be always used.

Here, by approximating $rA_{i-1}$ to S, each of the above expressions becomes each of the following:
when the symbol value $a_i$ is "0", $$A_i=A_{i-1}-S$$

$$C_i=C_{i-1}+S;$$

and
when the symbol value $a_i$ is "1", $$A_i=S$$

$$C_i=C_{i-1}$$

The range (interval) $A_{i-1}$ resulted from the previous symbol, essentially becomes smaller as mapping is continuously repeated, thus, S should accordingly be reduced. This reduction can be performed by shifting operation into one n-th (n is power of 2). However, the reduction of S causes to increase a number of 0 aligning in the high order bits of S, which does not directly effect to the operation. On the contrary to the above operation, by multiplying $A_{i-1}$ by power of 2 and by keeping $A_{i-1}$ more than a minimum value (1/2), it is possible that S having the fixed value is used. The foregoing process is called renormalization.

In the following explanation, a symbol is called MPS (more probable symbol: symbol having higher probability of occurrence) when the symbol $a_i$ is "0", and a symbol is called LPS (less probable symbol: symbol having lower probability of occurrence) when the symbol $a_i$ is "1". Namely, a prediction conversion is previously performed and MPS showing a higher probability of occurrence or LPS showing a lower probability of occurrence is assigned to each symbol. And when the symbol $a_i$ is "1", the range $$A_i=rA_{i-1}=S$$

becomes a range (interval) of the less probable symbol.

FIG. 2 is a block diagram showing an example of an encoder of a conventional encoding apparatus. In the figure, reference numeral 1 shows a register for temporarily storing a value of range (interval) assigned to the previous symbol. Reference numeral 2 shows a subtracter, 3 shows a switch of range (interval), 4 shows a switch of coordinates, 5 shows a shifter for determining a shifting amount for renormalization, and 6 shows a calculator for calculating encoded output.

Next, an operation of the apparatus will be described referring to the figure.

S (within a range (interval) of LPS), which is previously selected from the states of Markov information source based on the table specifying a plurality of values at a prediction estimator (not shown in the figure), is entered to the subtracter 2. The subtracter 2 obtains and outputs a difference $(A_{i-1}-S)$ from the range (interval) $A_{i-1}$ for the previous symbol stored in the register 1.

The switch 3 receives the range (interval) $(A_{i-1}-S)$ assigned to MPS and the range (interval) S assigned to LPS, and the switch 3 switches the range according to whether the symbol is MPS or LPS. Namely, when the symbol is MPS, the range (interval) $A_i$ assigned to the symbol is determined and output as $$A_i=A_{i-1}-S$$

and when the symbol is LPS, the range (interval) $A_i$ assigned to the symbol is determined and output as $$A_i = S$$

The switch 4 selects one of the range (interval) S for LPS and a fixed value 0 according to whether received symbol is MPS or LPS and outputs the selected value as ΔC, difference coordinates between the range (interval) assigned to the previous symbol and the minimum coordinates $C_{i-1}$. Namely, when the received symbol is MPS placed in the high order bit, the difference coordinates ΔC is output as $$\Delta C = S$$

when the received symbol is LPS placed in the low order bit, the difference coordinates ΔC is output as $$\Delta C = 0$$

The output $A_i$ of the switch 3 is supplied to the register 1 and to the shifter 5.

The range (interval) $A_i$ assigned to the symbol $a_i$ is stored in the register 1 and the range (interval) for a next symbol is calculated based on the data of $A_i$. The shifter 5 compares the range (interval) $A_i$ with ½. When the range (interval) $A_i$ is smaller than ½, the shifter 5 doubles the range (interval) $A_i$ and compares the doubled result of the range (interval) $A_i$ with ½ again. The shifter 5 repeats this doubling of the range (interval) $A_i$ until the doubled result of the range (interval) $A_i$ is greater than ½. The number 1 of the above doublings is obtained and output to the register 1 and the calculator 6 as a shifting amount 1. Then, the calculator 6 calculates a codeword using the outputs supplied from the switch 4 and the shifter 5 and outputs the codeword. The calculator 6 stores difference coordinates accumulated from the past. Namely, this accumulated value equals to the minimum coordinates $C_{i-1}$ of the range (interval) assigned to the previous symbol. The input difference coordinates ΔC is added to the minimum coordinates $C_{i-1}$ of the previous symbol to obtain the minimum coordinates $C_i$ of the range (interval) assigned to the present symbol. The minimum coordinates $C_i$ is shifted by the shifting amount 1 (bits). Then, it is checked whether one of the high order bits of the maximum coordinates within the effective range matches to any of the high order bits of the shifted minimum coordinates $C_i$. If there exists a bit matched, the matched bit is determined and output as determined bit of coordinates, in other words, a codeword.

Next, the general arithmetic encoder and the general arithmetic decoder will be explained in detail.

The encoder and decoder using arithmetic encoding and decoding can be embodied using the table and the processing flow described in the International Standard Recommendation T.82 of ITU-T (International Telecommunication Union). In the following explanation, the arithmetic encoder is referred to as a QM-Coder, the encoder is as a QM encoding section 7, and the decoder is as a QM decoding section 8. FIGS. 3 and 4 show general configurations of the encoder and the decoder. On the contrary to FIG. 1, in the QM-Coder, the range for LPS (symbol "1") on the number line is placed in the upper part of the figure.

In FIG. 3, a reference numeral 9 shows an image memory for storing an input image and a reference numeral 10 shows a prediction value table (MPS table) storing a pixel value MPS (More Probable Symbol), which has a high probability of occurrence, as a prediction value of one bit. A reference numeral 11 shows a state table (ST table) storing a state number (0–112) of 7 bits. This state number is for classifying the state of matching probability of the prediction value into a total of 113 states. A reference numeral 12 shows an LPS interval size table (LSZ table) specifying a size of an LPS interval by 16 bits. 13 denotes a next MPS state table (NMPS table) specifying a next state for MPS transition by 7 bits. 14 denotes a next LPS state table (NLPS table) specifying a next state for LPS transition by 7 bits. 15 denotes a prediction switching table (SWTCH table) showing inversion of the prediction value of the MPS table 10 by one bit. 16 denotes a pixel-to-symbol converter inputting a prediction value of the MPS table 10 and a pixel PIX supplied from the image memory 9 and outputting a symbol. 17 and 18 denote update processors updating the values of the MPS table 10 and the ST table 11. 19 denotes an arithmetic encoder.

In this case, the above MPS table 10 and the ST table 11 are variable tables. The above LSZ table 12, the NMPS table 13, the NLPS table 14, and the SWTCH table 15 are constant tables (probability estimation tables). In the following, an operation of the encoding apparatus will be explained referring to FIG. 3.

In FIG. 3, a QM encoding section 7 receives two inputs, one of which is a context and the other is an encoding pixel. The QM encoding section 7 outputs a code.

The image memory 9 stores an image and generates a context (10 bits, a total of 1024 patterns=$2^{10}$), which is a reference pattern of 10 adjacent pixels, already encoded or decoded, indicated by Model Template for an encoding pixel. The image memory 9 also outputs the encoding pixel at the time of encoding. The QM-Coder is provided with 2-line and 3-line standard model templates for generating a context as shown in FIG. 5.

In the QM-Coder, a prediction matching probability of pixel value is estimated for each context of each encoding pixel, and encoding is performed by learning the change of the prediction matching probability of pixel value. Learning is implemented by rewriting values of two variable tables having indexes of contexts as shown in FIGS. 40 and 41 (namely, the MPS table 10 indicating a prediction value by one bit corresponding to the context, and the ST table 11 indicating a state by seven bits corresponding to the context).

The QM-Coder includes a constant table (probability estimation table) for referring state number (state) on encoding as an index as well as the variable tables. FIG. 42 shows values set in the constant table. A prefix such as "0x" of "0x08000" indicates hexadecimal number. In FIG. 42, the LSZ table 12 shows a size of LPS interval by LSZ value of 16 bits, the NMPS table 13 shows a next state for MPS transition by NMPS value of seven bits, the NLPS table 14 shows a next state for LPS transition by NLPS value of seven bits, and an SWTCH table 15 shows an inversion of prediction value by SWTCH value of one bit. (These names expressed by capital alphabet letters for variable and constant tables will be used as array names in processing flow explained below.)

The size of LPS interval of the LSZ table 12 is referred to by a calculator, which is not shown in the figure, of the arithmetic encoder 19 and is not directly related to learning of adaptive prediction. In the arithmetic encoder 19, a calculation is operated using the LSZ, and when an operation precision is reduced, the operation is renormalized. When the renormalization occurs, learning is performed at the same time.

If the encoding symbol is MPS when renormalization occurs, the NMPS value of the NMPS table 13 is written in the ST table 11. If the encoding symbol is LPS, the NLPS value of the NLPS table 14 is written in the ST table 11 (this operation means the state corresponding to the context is rewritten). The state is thus moved. On encoding, the pixel-to-symbol converter 16 outputs the symbol to the arithmetic encoder 19 and the update processors 17 and 18.

If the renormalization is due to the LPS, and when the prediction matching probability is less than around ½, the MPS value is inverted (operation "1-MPS") and the inverted value is written in the MPS table 10. Whether the prediction matching probability is less than ½ or not can be determined by the SWTCH value of the SWTCH table 15 as a flag.

Namely, the SWTCH value of the SWTCH table 15 is set to "1" for the state where the prediction matching probability is less than around ½ and the SWTCH value of the SWTCH table 15 other than the above case is set to "0". By setting like above, the SWTCH value of the SWTCH table 15 can indicate the prediction value as an inversion flag.

As has been described, the ST table 11 and the MPS table 10 should be updated and controlled, respectively. As shown in FIG. 3, the update processors 17 and 18 determine the updating values for the ST table 11 and the MPS table 10, respectively. The update processors 17 and 18 also respectively rewrite the values of the tables with the above values. The updating process has been thus performed.

FIG. 6 shows a state transition diagram in the QM-Coder operated based on the table shown in FIG. 42 (since the number of the states is too large as 113 to show in the figure, only a part of the state transition is described). Each block shows one state and has a state number (a parenthesized number is hexadecimal notation) inside of the block. An arrow with "MPS" shows a state transition due to MPS (and accompanied with renormalization). An arrow with "LPS" shows a state transition due to LPS. Next states for the state transitions due to MPS and LPS are shown in the NMPS table 13 and the NLPS table 14, respectively. LPS state transition shown by underlined LPS means LPS state transition accompanied by inversion of the prediction value, which is indicated in the SWTCH table 15 as the SWTCH value "1".

An example of the state transition will be explained. On starting the encoding process, values are initialized for all contexts as "state=0, prediction value=0", as shown in FIGS. 43 and 44. To simplify the explanation, it is assumed that context CX for a plurality of sequential pixels continuously takes the same value (e.g., CX=1). A state number and a prediction value for the context CX can be obtained as ST[CX] and as MPS[CX] by referring to the variable table. When LPS occurs as a first symbol, the state ST[CX] is moved to 1 from 0. The next state for the LPS state transition is shown as:

NLPS[ST[CX](=0)]=1 and the value of ST[CX] of the ST table 11 is updated to:

ST[CX]=1 as shown in FIG. 45. At this time, the prediction value is simultaneously updated since:

SWTCH[ST[CX](=0)]=1

(this is also shown in the figure as underlined "LPS"). Namely, MPS [CX] of the MPS table 10 becomes 1 (inversion value) from 0 as shown in FIG. 46. When a second symbol occurs as LPS, the next state for the state transition is:

NLPS[ST[CX](=1)]=14 and the value of ST[CX] of the ST table 11 is updated as:

ST[CX]=14 as shown in FIG. 47. At this time, since:

SWTCH[ST[CX](=1)]=0, the prediction value of the MPS table 10 does not need to be inverted. If a third symbol occurs as MPS, the state is moved to a next state only when the renormalization occurs. For explanation of the operation, it is assumed the state is moved, the next state is:

NMPS[ST[CX](=14)]=15 and the value of ST[CX] of the ST table 11 is updated to:

ST[CX]=15 as shown in FIG. 48.

The state transition explained hereinbefore is indicated by "***" in the figure. The state transition will be the same on decoding process.

Before explaining an encoding processing flow, bit assignments of an encoding register 20 and an interval size register 21 included in the arithmetic encoder 19 are shown in FIG. 7.

In the encoding register 20, a decimal point is placed between $15^{th}$ bit and $16^{th}$ bit, "x" (16 bits) shows a calculation part (Cx22) for the LSZ table 12. If the calculation results in carry-over, the bits of "x" is propagated to the high order bit. "s" (3 bits) shows a spacer bit part (Cs23), "b" (8 bits) shows a bite output part (Cb24), and "c" (1 bit) shows a carry detector (Cc25). In the encoding process, the value of the encoding register 20 is updated to the lower bound of the range corresponding to the encoded symbol.

In the interval size register 21, a decimal point corresponds to the decimal point of the encoding register 20, and decimals "a" (16 bits) are placed corresponding to register part "x". Only for the initial value, an integer ($16^{th}$ bit) becomes "1". The interval size (also called as an interval range) is updated to A-LSZ (lower sub-interval size) or LSZ (upper sub-interval size). Except for the initial value (integer part="1"), $15^{th}$ bit showing the weigh of ½ is renormalized to "1". By keeping the value of the interval size register 21 over ½, it is guaranteed the lower sub-interval can be obtained for any LSZ values selected from the LSZ table 12 as the upper sub-interval size. In renormalization, both of the interval size register 21 and the encoding register 20 are extended (shifted) simultaneously.

In the QM-Coder, "conditional MPS/LPS exchange" is performed, namely, the upper sub-interval LSZ, having a fixed size corresponding to the state and selected from the LSZ table 12, is usually assigned to LPS and is assigned to MPS when the lower sub-interval is less than the upper sub-interval. Renormalization is implemented after encoding LPS or encoding MPS when "conditional MPS/LPS exchange" is applied.

In the following, processing flow of the encoding is explained by referring to the bit assignment of the register. In the processing flow, "layer" means "layer (of the resolution)" in case of hierarchical encoding and "stripe" means "stripe" of the image divided by N line unit (only the last stripe may have lines equal to or less than N lines). Here, the number of layers is assumed to be 1, however, this encoding process can be applied to a plurality of layers.

The following auxiliary variables CT 26, BUFFER 27, SC 28 and TEMP 29 are used for explaining the encoding process as well as variables, tables, and registers described above in the explanation of FIGS. 3, 7 and 42. The auxiliary variable CT 26 counts the number of shifts by the renormalization implemented in the encoding register 20 and the interval size register 21. When the value becomes 0, the CT 26 outputs a next encoding bite. The auxiliary variable BUFFER 27 stores the encoding bite value supplied from the encoding register 20. The auxiliary variable SC 28 is used only for encoding. The SC 28 counts the number of 0xff continuously occur when the encoding register 20 outputs the encoding bite value 0xff. The auxiliary variable TEMP 29 is used only for encoding. The TEMP 29 detects the carry to the BUFFER 27, obtains the low order 8 bits of the carry-over number as a new value of the BUFFER 27. The BUFFER 27 is set by the encoding register 20 through the TEMP 29. The BUFFER 27 never becomes 0xff without carry-over. In case of carry-over to the high order bits, the bits, the order of which is lower than the BUFFER 27, namely, the BUFFER 27 and SC number of 0xff, are changed. Accordingly, the code output from the encoding register 20 cannot be determined.

FIG. 8 is a flowchart showing a general encoding process of the ENCODER. In this processing flow of the Recommendation T. 82, prediction process for TP (Typical Prediction) and DP (Deterministic Prediction) is shown. Process for TP and DP is not directly related to the present invention nor the conventional art, thus an explanation for TP and DP is omitted. First, at step S101, INITENC is called to perform initialization of encoding process. At step S102, a pair of the pixel PIX and the context CX is read one by one to be encoded by the encoder (ENCODE) at step S103. At step S104, S102 and S103 are repeated until the stripe (or the image) is finished to be supplied. When the stripe is finished to be supplied, FLUSH is called to perform termination process at step S105.

FIG. 9 is a flowchart showing ENCODE processing flow. In this flow, a process to be called is switched based on match or mismatch between the encoding pixel value (PIX) and the output value (prediction value) of the MPS table 10. At step S111, match or mismatch between the pixel value and the prediction value is detected. When match is detected, the encoder encodes MPS, and when mismatch is detected, the encoder encodes LPS. At step S113, CODEMPS is called to encode MPS, and at step S112, CODELPS is called to encode LPS.

FIG. 10 is a flowchart showing CODELPS processing flow. The CODELPS is called for encoding LPS, namely, the mismatch is detected between the encoding pixel value (PIX) and the output value (prediction value) of the MPS table 10. At step S121, the value of the interval size register 21 is temporarily updated to the lower sub-interval size. At step S122, it is checked whether the LPS interval is greater than the MPS interval. If step S122 results in "Yes", conditional MPS/LPS exchange is applied. Namely, the value of the interval size register 21 is unchanged to encode the lower sub-interval and the encoding register 20A is not updated. If step S122 results in "No", the upper sub-interval is encoded. That is, at step S123, the encoding register 20 is updated as the lower bound and at step S 124, the interval size register 21 is updated as the interval size. When the constant SWTCH value of the SWTCH table 15 equals "1" at step S125, the prediction value (MPS table 10) is inverted or updated at step S126. In LPS encoding, the state transition referring to the NLPS table 14 is performed at step S127. At step S128, renormalization is implemented by calling RENORME.

FIG. 11 is a flowchart showing CODEMPS processing flow. The CODEMPS is called for encoding MPS, that is, the encoding pixel (PIX) matches to the output value (prediction value) of the MPS table 10. First, at step S131, the value of the interval size register 21 is temporarily updated to the lower sub-interval size. At step S132, it is detected whether the renormalization is required or not by checking the interval range is smaller than "0x8000" showing a minimum value of the interval size (weigh of ½). If step S132 results in "No", CODEMPS process is finished. If step S132 results in "Yes", the state transition is implemented referring to the NMPS table 13 at step S136. And at step S137, the renormalization is implemented by calling RENORME. Before steps S136 and 137, if step S133 results in "Yes", the interval size register 21 does not change for encoding the lower sub-interval and the encoding register 20 is not updated. If step S133 results in "No", conditional MPS/LPS exchange is applied. At step S134, the encoding register 20 is updated and the interval size register 21 is updated at step S135.

FIG. 12 shows RENORME processing flow for implementing the renormalization. In the figure, "<<1" shows an operation to shift the value of the register to higher order by 1 bit. To shift the value of the interval size register 21 and the encoding register 20 to higher order by 1 bit at steps S141 and S142 means to perform an operation equal to the multiplication by 2. At step S143, 1 is subtracted from the variable CT 26 and at step S144, it is checked whether the variable CT 26 is 0 or not. If step S144 results in "Yes", BYTEOUT process is called at step S145 and the encoding register 20 outputs 1 byte code. At step S146, completion of the renormalization is detected. If the value of the interval size register 21 is less than 0x8000, steps S141 through S145 are repeated. If the value of the interval size register 21 is equal to or more than 0x8000, the interval becomes more than ½ and the renormalization process is completed.

FIG. 13 shows BYTEOUT processing flow for outputting codes one by one from the encoding register 20. In the figure, ">>19" means an operation to shift the value of the register to lower order by 19 bits. The byte output section (Cb 24) of the encoding register 20 is to be output. The carry detector (Cc 25) operates at the same time for detecting carry-over. At step S151, 9 bits of the sum of the value (Cb 24) and the value (Cc 25) of the encoding register are set to the variable TEMP 29. If the carry-over has occurred at step S152: TEMP>0x100; Cc=1.

If the carry-over has not occurred, it is checked whether TEMP=0xff or TEMP<0xff at step S159. The byte output is processed by two ways based on the check at step S159. If step S152 results in "Yes", at step S153, the code already output from the encoding register 20 and stored as the BUFFER 27 and carry value 1 is written. At step S154, SC number of byte value 0 (stacked 0xff has been converted to 0x00 by the carry) is written and "SC+1" bytes of the code value with carry-over is determined. At step S155, the variable SC 28 is set to 0 and at step S156, the low order 8 bits of the variable TEMP are set to the variable BUFFER 27. In the figure, "&" shows AND operation. At step S157, (Cc 25) and (Cb 24) of the encoding register 20, which are processed as variable TEMP 29, are cleared. At step S158, 8 is set to the variable CT 26 for processing 8 bits until next byte output. If step S159 results in "Yes", the code is not determined and the variable SC 28 is incremented to accumulate 0xff. If step S159 results in "No", the code already output from the encoding register 20 is written as the BUFFER 27 at step S161. At step S162, SC number of byte value 0x00 are written and the code value of "SC+1" bytes is determined. At step S163, 0 is set to the variable SC 28 and at step S164, the variable TEMP 29 (8 bits, without carry-over) is set to the variable BUFFER 27.

FIG. 14 shows INITENC processing flow for setting the initial values of the ST table 11, the MPS table 10 and each variable at starting time of the encoding. In the figure, at step S171, "the first stripe of this layer" means "image" itself when an image encoding does not include a concept of layer or stripe. At starting time of encoding an image, INITENC is implemented. In case of an image consisting of a plurality of stripes, processing can be continued without initializing the variable tables for each stripe. At step S171, it is checked if this is the first stripe of the pixel of this layer or forced reset of the tables. If step S171 results in "Yes", the ST table 11 and the MPS table 10, which are the variable tables for all the contexts CX 2, are initialized at step S172. The SC 28, the interval size register 21, the encoding register 20 and the variable CT 26 are initialized at steps S173, S174, S175 and S176, respectively. The initial value of the CT 26 is the sum of the number of bits of (Cb24) and bits of (Cs23) of the encoding register 20. After processing 11 bits, the first code is output. If step S171 results in "No", the table values at the end of the previous stripe of this layer are set to the variable tables at step S177 instead of the initialization.

FIG. 15 shows FLUSH processing flow for implementing termination process including sweeping out the remaining value in the encoding register 20. At step S181, CLEAR-BITS is called to minimize the number of effective bits of the code remaining in the encoding register 20. At step S182, FINALWRITES is called to finally output the variable BUFFER 27, SC 28 and the code of the encoding register 20. At step S183, the first byte of the code is removed because the variable BUFFER 27 is output (as integer part of the code) prior to the value output from the encoding register 20. At step S184, the byte "0x00" at the end of the code can be removed, if desired, because the code is decimal coordinates within the final effective range.

FIG. 16 shows CLEARBITS processing flow for minimizing the number of effective bits of the code at the end of encoding. By this process, the code is determined to be the value that ends with the greatest possible number of "0x00". At step S191, the variable TEMP 29 is set to the value obtained by clearing the low-order byte (Cx 22) of the upper bound value of the final effective range of the encoding register 20. At step S192, it is checked if the value obtained by clearing the low-order two bytes of the upper bound value is larger than the value of the encoding register 20. If step S192 results in "Yes", overcleared byte is returned to the variable TEMP 29 at step S193 and the value of the encoding register 20 is set to the remaining value after returning the overcleared byte. If step S192 results in "No", the value of the variable TEMP 29 is set in the encoding register 20.

FIG. 17 shows FINALWRITES processing flow for writing the code determined at the end of encoding including remaining value in the encoding register 20. At step S201, encoding register 20 is shifted by the number of bits shown by the variable CT 26 to enable to output the code and to detect the carry. At step S202, it is checked if the carry has occurred or not. If step S202 results in "Yes", the carry has occurred and if "No", the carry has not occurred. As well as in the BYTEOUT processing flow, the code of "SC+1" bytes is determined by writing the code value already output from the encoding register 20 at steps S203 and S204 for the code value with the carry or at steps S207 and S208 for the code value without the carry. At step S205, the value of (Cb 24) (1 byte) of the encoding register is output. At step S206, the code is finished to be output by outputting the low-order 1 byte of the value of (Cb 24).

Next, a decoding apparatus and decoding method of the apparatus will be explained.

In FIG. 4, a reference numeral 9 shows an image memory for storing an input image. A reference numeral 10 shows an MPS table for storing MPS (More Probable Symbol) of 1 bit, which is a pixel value having high probability of occurrence, as a prediction value. A reference numeral 11 shows an ST table for storing state number (0–112) of 7 bits. This state number is for classifying the state (State) of matching probability of the prediction value into a sum of 113. A reference numeral 12 shows an LSZ table specifying a size of an LPS interval by 16 bits. 13 shows an NMPS table specifying a next state for the MPS transition by 7bits. 14 shows an NLPS table specifying a next state of the LPS transition by 7 bits. 15 shows an SWTCH table indicating an inversion of the prediction value by 1 bit. 61 shows a symbol-to-pixel converter inputting a prediction value of the MPS table 10 and a pixel PIX supplied from the image memory 9 and outputting symbols. 17 and 18 respectively show update processors for updating the values of the MPS table 10 and the ST table 11. A reference numeral 30 shows an arithmetic decoder.

Similar to the encoding apparatus, the MPS table 10 and the ST table 11 are variable tables. The LSZ table 12, the NMPS table 13, the NLPS table 14 and the SWTCH table 15 are constant tables (probability estimation tables). The value identical to each table shown in FIG. 3 should be set in each of the above tables. An operation of the decoding apparatus will be described in the following referring to FIG. 4.

In FIG. 4, a QM decoding section 8 receives two inputs, one of which is a context and the other is a code. The QM decoding section 8 outputs a decoded pixel.

The image memory 9 accumulates images and generates a context (10 bits, the sum of 1024), which is reference pattern of 10 adjacent encoded/decoded pixels indicated by the model template for decoding pixel. In the QM-Coder, 2-line and 3-line standard model templates are provided and commonly used for encoding/decoding.

In the QM-Coder, the matching probability of the prediction value of the pixel of each context for decoding pixel is estimated to proceed decoding with learning accompanied with the variation of the matching probability as well as the encoding apparatus. Learning is performed by rewriting two variable tables (the MPS table 10 and the ST table 11), an index of which is a context. Other than the variable tables, the QM decoding section 8 includes constant tables (probability estimation tables) for referring to the state number (state) as index on decoding. The values shown in FIG. 42 are set in these constant tables. The constant tables are the LSZ table 12 specifying the LPS interval size by 16 bits, the NMPS table 13 specifying a next state for the MPS state transition by 7 bits, the NLPS table 14 specifying a next state for the LPS state transition by 7 bits and the SWTCH table 15 specifying the inversion of the prediction value by 1 bit. (These English names for the variable and constant tables will be used for names of arrays in the processing flow explained below.)

The LPS interval size of the LSZ table 12 is referred to by a calculator, which is not shown in the figure, inside of the arithmetic decoder 30. The LPS interval size is not directly related to learning of adaptive prediction. In the arithmetic decoder 30, the calculator operates using the LSZ and implements renormalization when an operation precision is reduced. When the renormalization occurs, learning is performed at the same time.

If the decoding symbol is MPS when the renormalization is implemented, the NMPS value of the NMPS table 13 is written in the ST table 11. If the decoding symbol is LPS when the renormalization is implemented, the NLPS value of the NLPS table 14 is written in the ST table 11. The state is moved to a next state. On decoding, the arithmetic decoder 30 outputs a symbol to the symbol-to-pixel converter 61 and the update processors 17 and 18.

When the renormalization due to the LPS is implemented, if the prediction matching probability is less than around 1/2, the MPS value is inverted (operation "1-MPS") and the inverted value is written in the MPS table 10. Whether the matching probability is less than around 1/2 or not can be detected by the SWTCH value of the SWTCH table 15 as a flag.

As has been described, the ST table 11 and the MPS table 10 should be respectively updated and controlled. In FIG. 4, the update processors 17 and 18 determine the updating values and rewrite the values of the ST table 11 and the MPS table 10, respectively.

Before explaining the decoding processing flow, as the same with the encoding, bit arrays of the decoding register 31 and the interval size register 32, provided inside of the arithmetic decoder 30, will be shown in FIG. 19.

In the decoding register, a low-order word CLOW 33 and a high-order word CHIGH 35 can be embodied by the registers of 32 bits. A decimal is set at position upper to the bit 31, which is MSB (Most Significant Bit). "b" (8 bits) is a high-order byte Cb 34 of the byte inputting part (CLOW register 33), and "x" (16 bits) is calculating part Cx 36 (CHIGH register 35) corresponding to the value of the LSZ table 12. In the decoding process, the value of the C register is updated to an offset value of the code, which is coordinate of the interval, from the lower bound value of the interval corresponding to the decoded symbol.

In the interval size register 32, a decimal is set corresponding to the decimal of the decoding register 31, and "a" (16 bits) is placed as decimal part corresponding to the register part "x". At initial state, the integer part (bit 16) of the interval size register 32 becomes "1". The interval size (also called "interval size") is updated to "A-LSZ" (lower sub-interval size) or LSZ (upper sub-interval size). The interval size register 32 is renormalized so that bit 15 showing weigh of ½ becomes "1" except the initial value (the integer part="1"). It is guaranteed that the lower sub-interval is obtained even if any LSZ is selected from the LSZ table 12 as the upper sub-interval size by keeping the weigh more than ½. In the renormalization, the interval size register 32 and the decoding register 31 are extended (shifted) simultaneously.

In the OM-Coder, the upper sub-interval LSZ given by the LSZ table 12, which is fixed size for any state, is usually assigned to LPS. When the lower sub-interval becomes smaller than the upper sub-interval, the upper sub-interval LSZ is assigned to MPS by "conditional MPS/LPS exchange". In decoding LPS, or decoding MPS by applying "conditional MPS/LPS exchange", renormalization is implemented.

The decoding processing flow will be explained according to the bit array of the register. In the processing flow, a term "layer" is interpreted in the same way as the encoding process, and the decoding process is explained assuming the number of layers=1. This decoding process can be applied to a plurality of layers.

For explaining the decoding processing flow, the following auxiliary variables CT 26 and BUFFER 27 are used other than the variables, tables and registers shown in FIGS. 4, 19 and 42. The CT 26 is the auxiliary variable for counting the number of shifts of the decoding register 31 and the interval size register 32 in the renormalization, and inputting the next code byte when the number of shifts becomes 0. The BUFFER 27 is the auxiliary variable for storing code byte value to be input to the Cb register 34 of the decoding register 31 from the code.

FIG. 18 shows DECODER processing flow illustrating a whole decoding process. In this processing flow of the Recommendation T. 82, process for TP (Typical Prediction) and DP (Deterministic Prediction) is shown. Process for TP and DP is not directly related to the present invention nor the conventional art, thus an explanation for TP and DP is omitted. First, at step S211, INITDEC is called to initialize the decoding process. At step S212, a set of the contexts CX 2 is read one by one. At step S213, the pixel PIX is decoded by the process DECODE. At step S214, steps S212 and S213 will be repeated until the stripe (or the image) is finished to be supplied.

FIG. 20 shows DECODE processing flow for decoding the decoding pixel. First, at step S221, the interval size register 32 is temporarily updated to the lower sub-interval size. If step S222 results in "Yes", the lower sub-interval is decoded. If step S223 results in "Yes", MPS_EXCHANGE is called at step S224 and RENORMD is called at step S225 to implement the renormalization. If step S223 results in "No", the MPS is decoded without implementing the renormalization, and the prediction value of the MPS table 10 is determined as the pixel value (PIX). If step S222 results in "No", the upper sub-interval is decoded. LPS_EXCHANGE is called at step S227 and RENORMD is called at step S228 to implement the renormalization. In the path for calling MPS_EXCHANGE and LPS_EXCHANGE, even if the decoding interval is determined, it is impossible to know which should be decoded between MPS and LPS without detecting which is larger, MPS or LPS. Accordingly, each pixel value is determined by the called processing flow.

FIG. 21 shows LPS_EXCHANGE processing flow for decoding the upper sub-interval. If step S231 results in "Yes", the MPS is decoded. At step S232, the decoding register 31 is updated and the interval size register 32 is updated at step S233. At step S234, the prediction value obtained from the MPS table 10 is determined as the pixel value (PIX) without any change. At step S235, a state is moved to a next state by referring to the NMPS table 13. If step S231 results in "No", the LPS is decoded. At step S236, the decoding register 31 is updated and the interval size register 32 is updated at step S237. At step S238, non-prediction value "1-prediction value" is determined as the pixel value (PIX). If step S239 results in "Yes", the prediction value (MPS table 10) is inverted or updated at step S240. At step S241, a state is moved to a next state by referring to the NLPS table 14.

FIG. 22 shows MPS_EXCHANGE processing flow for decoding the lower sub-interval. If step S251 results in "Yes", the LPS is decoded. At step S252, non-prediction value is determined as the pixel value (PIX). If step S253 results in "Yes", the prediction value (MPS table 10) is inverted or updated at step S254. At step S255, a state is moved to a next state by referring to the NLPS table. If step S251 results in "No", the LPS is decoded. At step S256, the prediction value obtained from the MPS table 10 is determined as the pixel value (PIX) without any change. At step S257, a state is moved to a next state by referring to the NMPS table 13.

FIG. 23 shows RENORMD processing flow for implementing renormalization. At step Ss261, it is checked whether the variable CT 26 is 0 or not. If step S261 results in "Yes", BYTEIN is called so as to input 1 byte code into the decoding register 31 at step S262. At step S263, the interval size register 32 is shifted to high-order bit by 1 bit and the decoding register 31 is shifted to high-order bit by 1 bit at step S264. This shifting operation equals to duplication. At step S265, 1 is subtracted from the CT 26. At step S266, it is checked whether the renormalization is completed, that is, the value of the interval size register 32 is less than 0x8000, or not. If the value of the interval size register 32 is less than 0x8000, steps S261 through S265 are repeated. At step S267, it is checked whether the variable CT 26 is 0 or not. If step S267 results in "Yes", BYTEIN is called so as to input 1 byte code into the decoding register 31.

FIG. 24 shows BYTEIN processing flow for reading a code into the decoding register 31 byte by byte. In the figure, "SCD" (Stripe Coded Data) is a code for stripe. If step S271 results in "Yes", no code is to be read at step S272, and the variable BUFFER 27 becomes 0. At step S273, the variable BUFFER 27 is read into the CLOW register 33 (Cb 34), and at step S274, the variable CT 26 is set to 8 for processing the code of 8 bits until next code is input. If step S271 results in "No", 1 byte code is read into the variable BUFFER 27 at step S275.

FIG. 25 shows INITDEC processing flow for setting initial values of the ST table 11, the MPS table 10 and each variable at starting time of the decoding. Initialization of the table values of steps S281, S282 and S290 are the same as ones of steps S171, S172 and S177 of INITENC processing flow in the encoding process. The initial value of the decoding register 31 is set by inserting 3 bytes of the code into the Cx register 36 and the Cb register 34. At step S283, the decoding register 31 is cleared, and at step S284, BYTEIN is called so as to insert 1 byte of a code into the Cb register 37. At step S285, the decoding register 31 is shifted by 8 bits, and at step S286, BYTEIN is called so as to insert 1 byte of the code into the Cb register 34. At step S287, the decoding register 31 is shifted by 8 bits, and at step S288, BYTEIN is called so as to insert 1 byte of the code into the Cb register 34. By these steps, the sum of 3 bytes of the code is set to the Cx register 36 and the Cb register 34. The initial value of the interval size register 32 is set at step S289.

According to the encoding method for information source data described in the related art, on encoding the less probable symbol, the state and the prediction value is controlled respectively for each context. For this reason, the state transition and to check whether switching the prediction value is required or not, and to switch the prediction value, if required, are controlled and performed respectively. This causes a problem that a whole number of processes becomes large and implementation of encoding/decoding requires lots of time.

The present invention is provided so as to solve the above-mentioned problem. The invention aims to obtain a high-speed operation of encoding/decoding with less number of processes by making correspondence of the state and the prediction value, controlling and updating the state and the prediction value at once.

DISCLOSURE OF THE INVENTION

According to the present invention, an encoding apparatus includes:

an image memory for storing an image data consisting of pixels, outputting an encoding pixel, and outputting a context configured based on a reference pixel adjacent to the encoding pixel; and an encoding section for inputting the encoding pixel and the context from the image memory, obtaining a state for the encoding pixel corresponding to the context, determining a prediction value for the encoding pixel from the state, and encoding the encoding pixel based on the prediction value.

The encoding section includes:

a variable table for storing the state corresponding to the context for the encoding pixel as a variable, inputting the context from the image memory, and outputting the state for the encoding pixel;

a constant table for storing an interval size and the prediction value for the state as a constant, inputting the state for the encoding pixel from the variable table, and outputting the interval size and the prediction value for the encoding pixel;

a pixel-to-symbol converter for inputting the encoding pixel from the image memory, inputting the prediction value from the constant table, comparing the encoding pixel with the prediction value, converting the encoding pixel to a symbol, and outputting the symbol; and an encoder for inputting the interval size for the encoding pixel from the constant table, inputting the symbol from the pixel-to-symbol converter, encoding the symbol based on the interval size, and outputting the symbol encoded.

The variable table includes a state table for storing a combination of the prediction value for the encoding pixel and a value specifying a matching probability between the prediction value and the encoding pixel as a state.

The constant table includes a prediction value table for outputting a prediction value using the state stored in the state table as an index.

The state table stores the state including the prediction value in a predetermined bit, and the predetermined bit of the state table is used as a part of the constant table.

The predetermined bit of the state table is located in either of a high order bit and a low order bit for indicating the prediction value.

The constant table includes a next state table, using the state stored in the state table as an index, for storing a next state for a transition of the state of the state table; and the encoding section includes an update processor for updating the prediction value of the next state by the transition of the state of the state table.

The encoding apparatus is installed in one of a computer, a scanner, a facsimile, a printer, a database, and a semiconductor chip.

According to the present invention, a decoding apparatus includes:

an image memory for storing a received decoded pixel and outputting a reference pixel as a context adjacent to a decoding pixel; and a decoding section inputting a code, inputting the context from the image memory, obtaining a state for the decoding pixel from the context, determining a prediction value for the decoding pixel from the state, and decoding the decoding pixel from the code based on the prediction value.

The decoding section includes:

a variable table for storing the state, corresponding to the context, for the decoding pixel as a variable, and inputting the context and outputting the state for the decoding pixel;

a constant table for storing an interval size and the prediction value corresponding to the state as a constant, inputting the state for the decoding pixel from the variable table, and outputting one of the interval size for the decoding pixel, the prediction value and a non-prediction value, and;

a decoder for inputting the interval size for the decoding pixel, decoding a code into a symbol, and outputting the symbol; and a symbol-to-pixel converter for converting the symbol into the decoding pixel by referring to one of the prediction value and the non-prediction value of the constant table and outputting the symbol decoded to the image memory.

The variable table includes a state table for storing a combination of the prediction value for the decoding pixel and a value specifying a matching probability between the prediction value and the decoding pixel as a state.

The constant table includes a prediction value table for outputting the prediction value using the state stored in the state table as an index.

The state table stores the state including the prediction value in a predetermined bit, and the predetermined bit of the state table is used as a part of the constant table.

The predetermined bit of the state table is located in either of a high order bit and a low order bit for indicating the prediction value.

The constant table includes a next state table, using the state stored in the state table as an index, for storing a next state for a transition of the state of the state table; and the decoding section includes an update processor for updating the prediction value of the next state by the transition of the state of the state table.

The decoding apparatus is installed in one of a computer, a scanner, a facsimile, a printer, a database, and a semiconductor chip.

According to the present invention, an encoding method for generating a context from a plurality of reference pixels adjacent to a pixel for encoding (an encoding pixel), obtaining a prediction value predicting an encoding pixel value based on the context and a state number showing a matching probability of the prediction value, and encoding the encoding pixel based on the prediction value and the state number, the encoding method includes the steps of:

storing a predetermined prediction value corresponding to the state number;

obtaining a state number for the encoding pixel;

determining the prediction value based on the state number;

obtaining a symbol by comparing the prediction value and the encoding pixel;

obtaining an interval based on the state number for the encoding pixel; and encoding the encoding pixel based on the symbol and the interval.

The encoding method further includes the step of referring indirectly to the prediction value from the state controlled by a state transition.

According to the present invention, a decoding method for generating a context from a plurality of reference pixels adjacent to a pixel for decoding (a decoding pixel), obtaining a prediction value predicting a decoding pixel value based on the context and a state number showing a matching probability of the prediction value, and decoding the decoding pixel based on the prediction value and the state number, the decoding method includes the steps of:

storing a predetermined prediction value corresponding to the state number;

obtaining a state number for the decoding pixel;

determining the prediction value based on the state number;

obtaining an interval based on the state number for the decoding pixel;

inputting a code, decoding the code based on the interval and outputting a symbol; and obtaining the decoding pixel based on the prediction value and the symbol.

The decoding method further includes the step of referring indirectly to the prediction value from the state controlled by the state transition.

According to the invention, an encoding method for generating a context from a plurality of reference pixels adjacent to a pixel for encoding (an encoding pixel), obtaining a prediction value showing a pixel value having a high probability of occurrence and a state number specifying a matching probability of the prediction value, and encoding the encoding pixel based on the prediction value and the state number, the encoding method comprising the steps of:

extending the prediction value to be constant corresponding to the state number;

determining the prediction value based on the state number by obtaining the state number for the encoding pixel; and updating the state number for the context according to the change of the probability of occurrence of the pixel; and the encoding method performs encoding by controlling the state number and the prediction value.

According to the invention, a decoding method for generating a context from a plurality of reference pixels adjacent to a pixel for decoding (a decoding pixel), obtaining a prediction value showing a pixel value having a high probability of occurrence and a state number specifying a matching probability of the prediction value, and decoding the decoding pixel based on the prediction value and the state number, the encoding method includes the steps of:

extending the prediction value to be constant corresponding to the state number;

determining the prediction value based on the state number by obtaining the state number for the decoding pixel; and updating the state number for the context according to the change of the probability of occurrence of the pixel; and the decoding method performs decoding by controlling the state number and the prediction value.

BRIEF DESCRIPTION OF THE DRAWINGS

FIG. 42 shows a conventional constant table.

FIG. 47 shows a conventional ST table.

FIG. 48 shows a conventional ST table.

FIG. 49 shows an ST table according to the present invention.

FIG. 50 shows a constant table according to the present invention.

FIG. 51 shows a constant table according to the present invention.

FIG. 52 shows a STATE table according to the present invention.

FIG. 53 shows a STATE table according to the present invention.

FIG. 54 shows a STATE table according to the present invention.

FIG. 55 shows a relationship between the STATE table of the present invention and the conventional variable table.

FIG. 57 explains an effect of the present invention,.

FIG. 58 shows a STATE table according to the present invention.

FIG. 59 shows a STATE table according to the present invention.

FIG. 60 shows a compatibility between the STATE table of the invention and the conventional variable table.

BEST MODE FOR CARRYING OUT THE INVENTION

Embodiment 1

Figure 26:
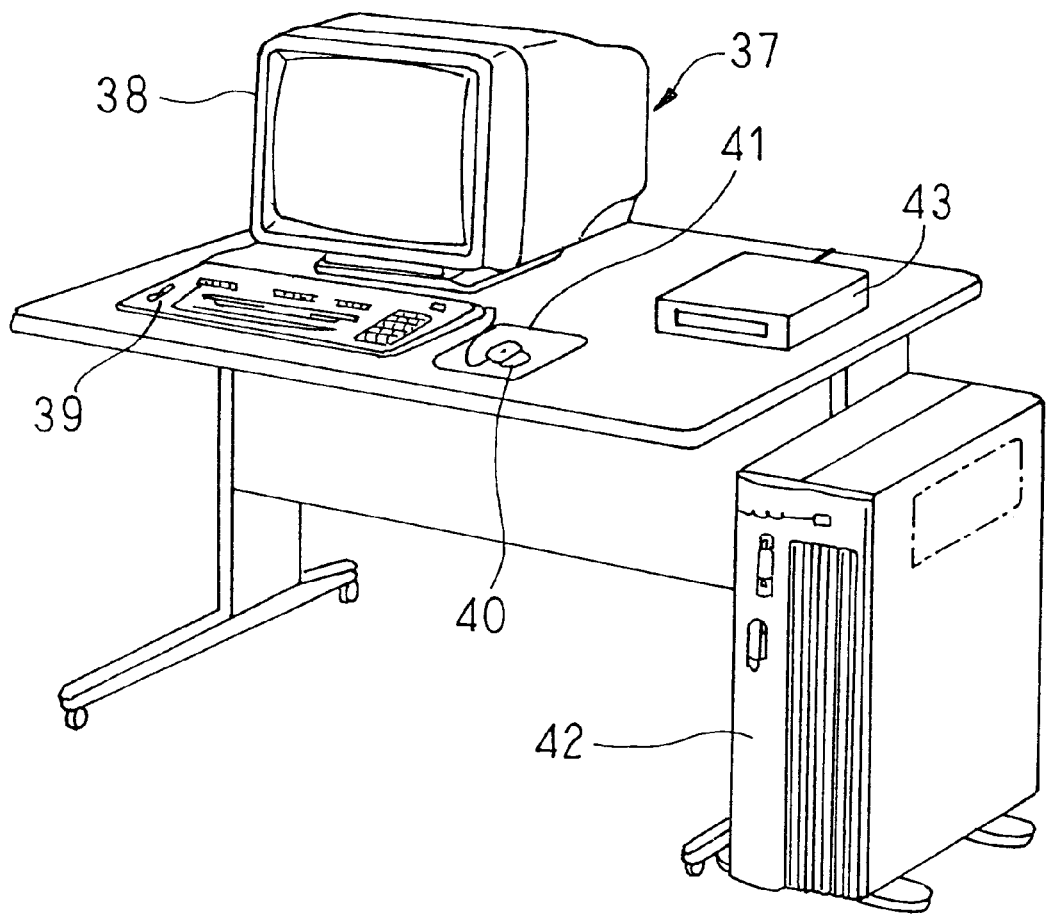
FIG. 26 shows image encoding system or image decoding system according to the present invention.

FIG. 26 shows a configuration of an image encoding apparatus according to the present invention.

An image decoding apparatus according to the present invention has a configuration similar to the image encoding apparatus shown in FIG. 26.

A display unit 38, a keyboard 39, a mouse 40, a mouse pad 41, a system unit 42 and a compact disc drive 43 are provided to an image encoding apparatus 37.

In the image encoding/decoding apparatus of the invention, as shown in FIG. 26, for example, an encoded image is input at the compact disk drive 43 to be decoded and the decoded image data is transmitted to the system unit 42 to display on the display unit 38. And in the image encoding/decoding apparatus of the invention, an image data is encoded and transmitted through a line (not shown in the figure). The image encoding/decoding apparatus of the invention can be also applied to any form of the apparatus other than a personal computer or a work station as shown in FIG. 26. For example, a video player can be used instead of the compact disk drive 43. Image data from the network can be input. Input image data can be in the form of both analog and digital.

Figure 27:
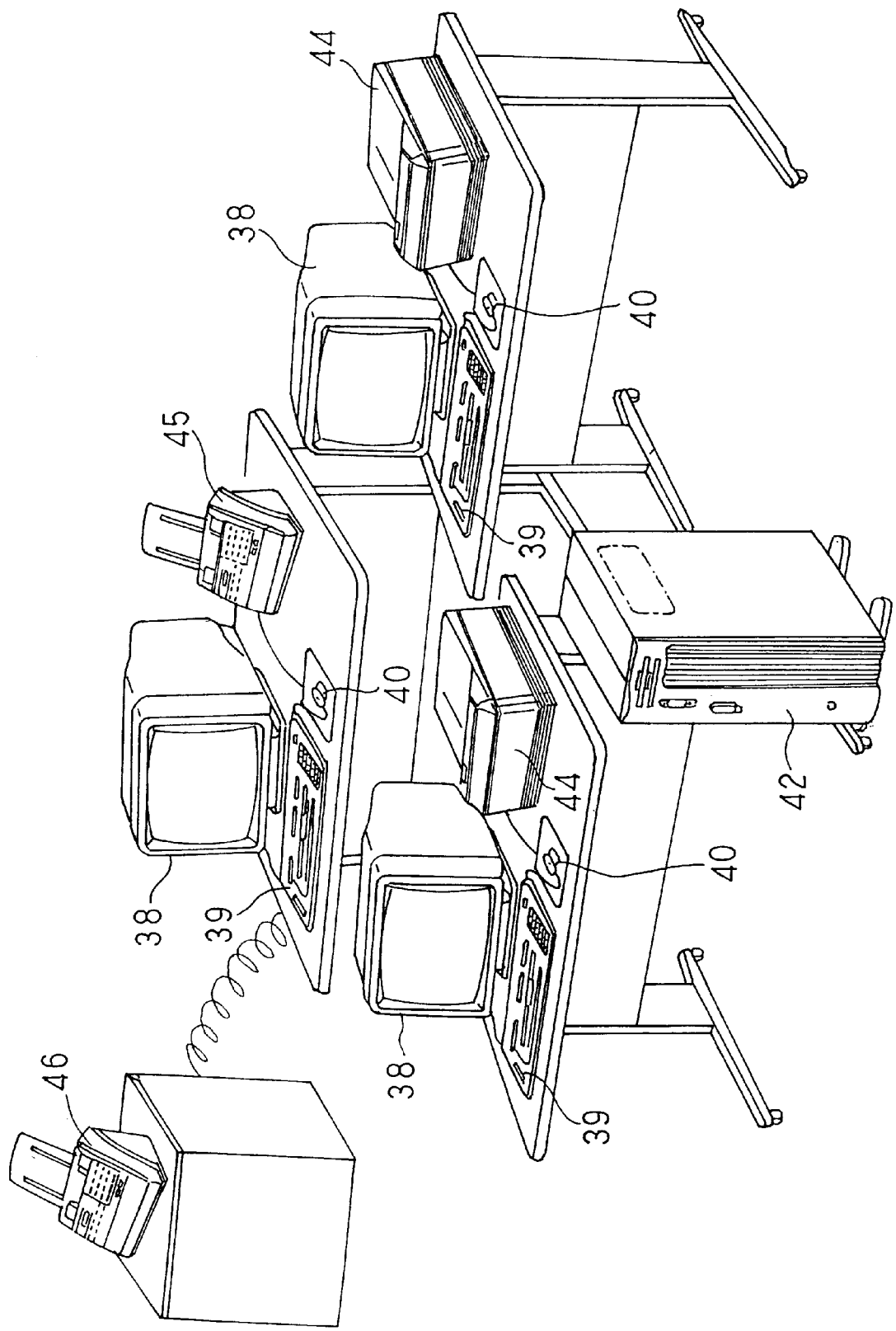
FIG. 27 shows an application of an image encoding apparatus or an image decoding apparatus according to the present invention.

The image encoding/decoding apparatus of the invention is shown in FIG. 26 as an independent frame. The apparatus can be included in the frame of peripheral equipment such as a printer 44, a scanner 45, or a facsimile 46 as shown in FIG. 27. The image encoding/decoding apparatus of the invention can be included in system board such as a TV camera, a measuring apparatus or a computer. The present invention can be also applied to mutual transmission of encoded data among the equipment shown in FIG. 27 when the equipment is connected together through Local Area Network (not shown in the figure). The present invention can be also applied to communication with encoded data through Wide Area Network such as ISDN (Integrated Services Digital Network). The present invention can be also included in the database. Communication lines for transmitting/receiving encoded data can be any kinds of lines such as an analog (modem) network, a digital network, a public network, a private network, Local Area Network (LAN), Wide Area Network (WAN), an Internet, an Intranet, a radio, a wired line, an optical fiber, a cable. Recording medium can be any kinds of medium such as disks of a Flexible Disk (FD), a Hard Disk (HD), a Compact Disk (CD), PD, a Magneto Optical Disk (MO), ZIP, a Mini Disk (MD), a magnetic tape, a Random Access Memory (RAM), a Read Only Memory (ROM), or printed objects such as a character or a barcode. Recording method can be any kinds of methods such as electric recording, magnetic recording, optical recording, or recording by ink.

In this embodiment, the following encoding/decoding method is used in an encoding apparatus of an image encoding processing device and a decoding apparatus of an image decoding processing device.

The first embodiment can be applied to the probability state transition for Markov information source. This embodiment will introduce an encoding/decoding method using the probability estimation due to the state transition of the binary Morkov information source in relation to the QM-Coder described in the conventional related art.

Figure 28:
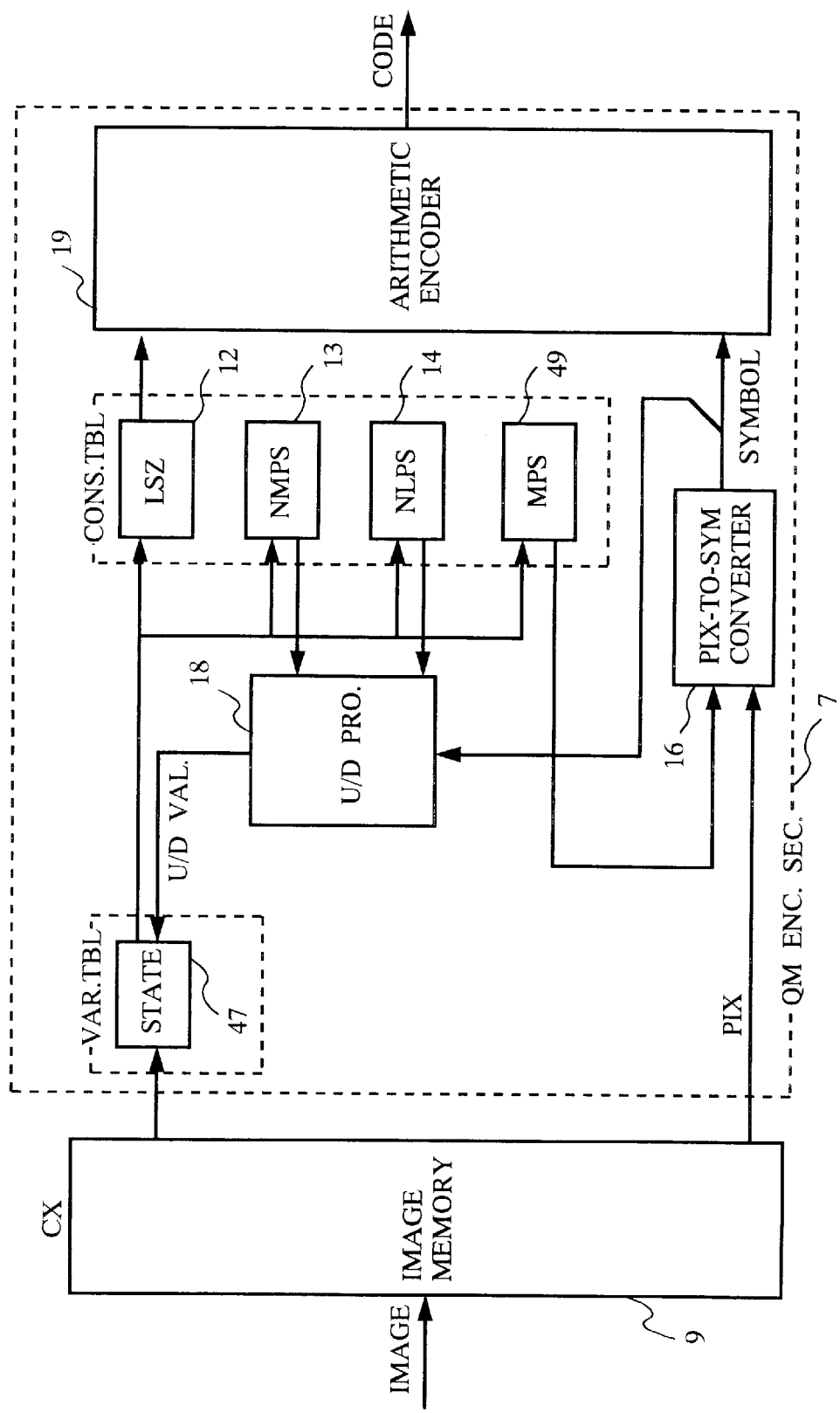
FIG. 28 shows a general configuration of the encoding apparatus of the invention.
Figure 29:
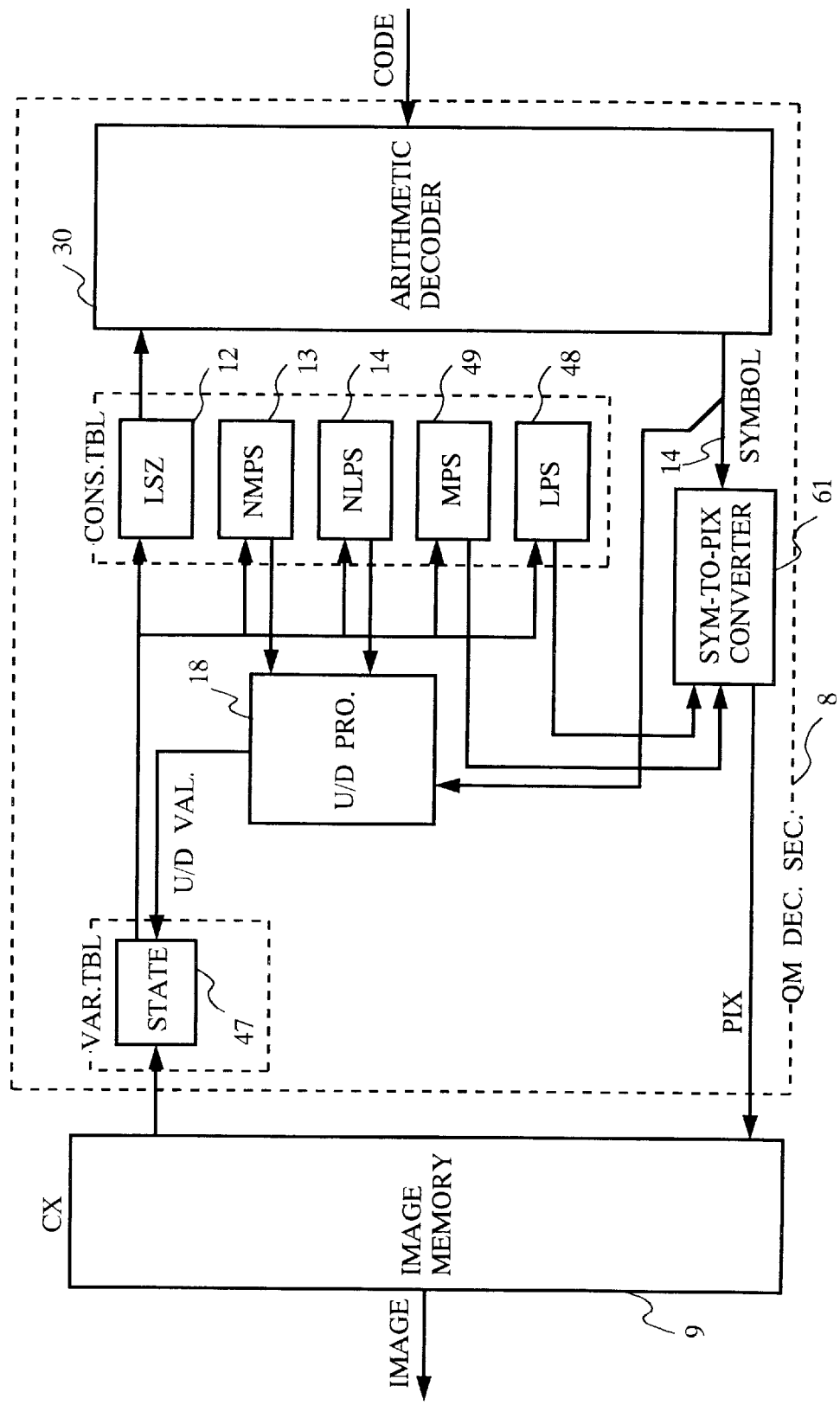
FIG. 29 shows a general configuration of the decoding apparatus of the invention.
Figure 49:
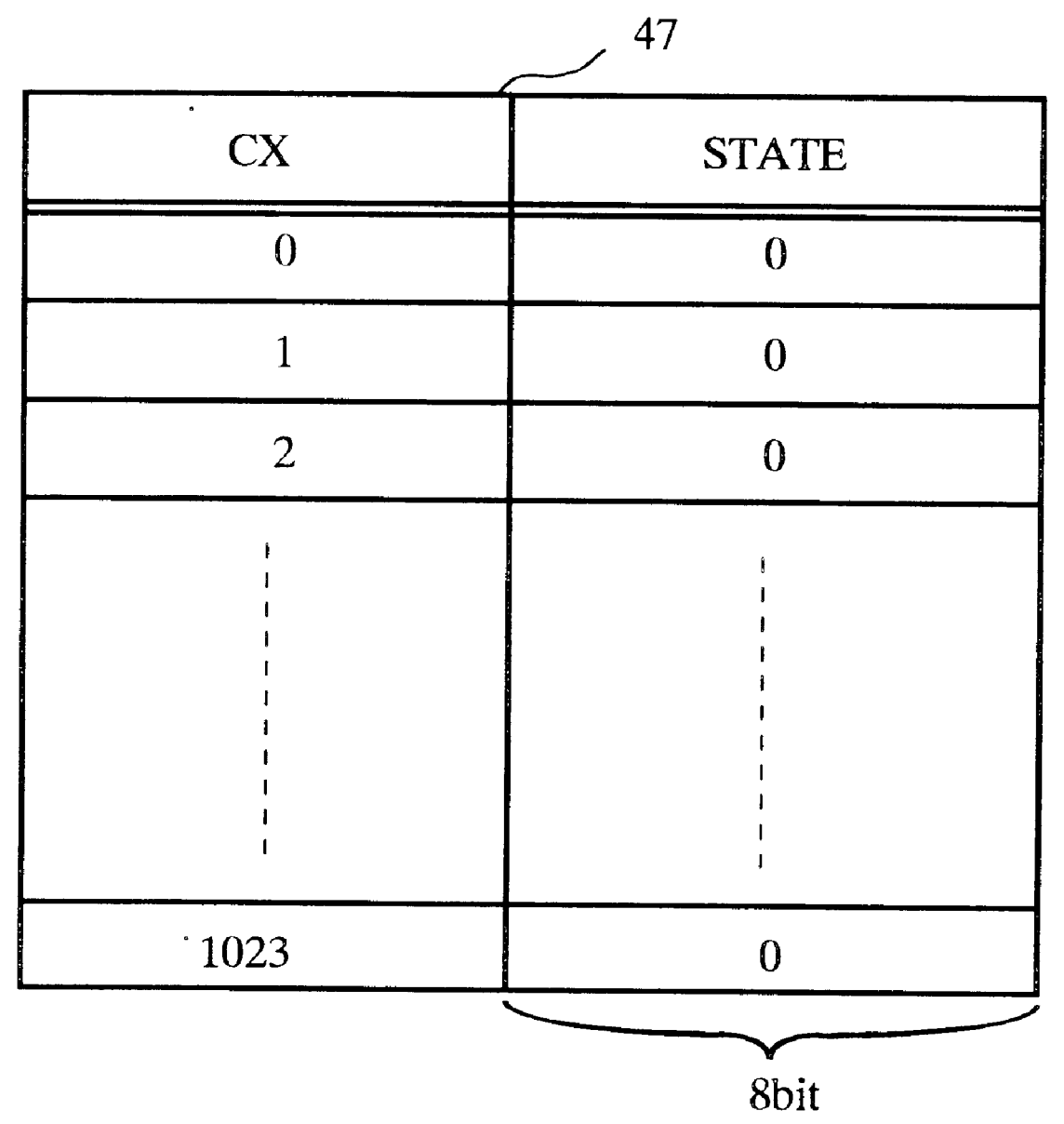

The constant table (probability estimation table) of the QM-Coder is set as will be explained below. As shown in FIG. 49, the conventional ST table 11 (7 bits) is extended into the STATE table 47 (8 bits) (hereinafter, ST does not mean an array variable, but means a variable used for an index for the constant table). The constant tables are an LSZ table 12, an NMPS table 13, an NLPS table 14, a prediction value table (MPS table) 49, in which the prediction value corresponds to each state instead of each context, and a non-prediction value table (LPS table) 48 storing inverted value of the MPS table 49, that is, "1-MPS" as shown in FIGS. 50 and 51. Encoding is implemented by detecting a match/mismatch of the prediction value. The LPS table 48 is not required for the encoding apparatus because non-prediction value is not used for encoding. The LPS table 48 is provided for obtaining non-prediction value as the pixel value of decoding the LPS only by referring to the table without calculation of "1-MPS". The LPS table 48 can be eliminated if "1-MPS" is calculated at each encoding time as has been done in the conventional method. FIGS. 28 and 29 show general configurations of the encoding apparatus and the decoding apparatus including these tables. Because the MPS table 49 is a constant table, an update processor does not need to be provided in the MPS table 49. The variable STATE table 47 only includes the updating processor.

The constant tables shown in FIGS. 50 and 51 according to this embodiment will be set in the following way. The SWTCH table 15 is used as auxiliary constant for explaining table expansion. For clear understanding, the array referred by "( )" shows a conventional constant table (before table extension) and the array referred by "[ ]" shows the constant table according to the embodiment (after table extension). The states ST will be converted in the following:
As for the states ST, of which the conventional state number ST=0–112:

LSZ [ST]=LSZ(ST);
NMPD[ST]=NMPS(ST);
NLPS[ST]=NLPS(ST)+SWTCH(ST)×128;
MPS[ST]=0;
LPS[ST]=1.

In case of the state when the prediction value is 1, the states ST, of which the state number ST=129–240 (in case of state number 0, the state is not duplicated, ST=128 is omitted), will be converted as:

LSZ[ST+128]=LSZ(ST);
NMPS[ST+128]=NMPS(ST)+128;
NLPS[ST+128]=NLPS(ST)+(1−SWTCH(ST))×128;
MPS[ST+128]=1;
LPS[ST+128]=0.

In this way, the constant tables according to the present invention shown in FIGS. 50 and 51 can be methodically and easily obtained from the conventional constant tables. Namely, the constant tables of the invention will be generated by duplicating the conventional constant tables.

Figure 1:
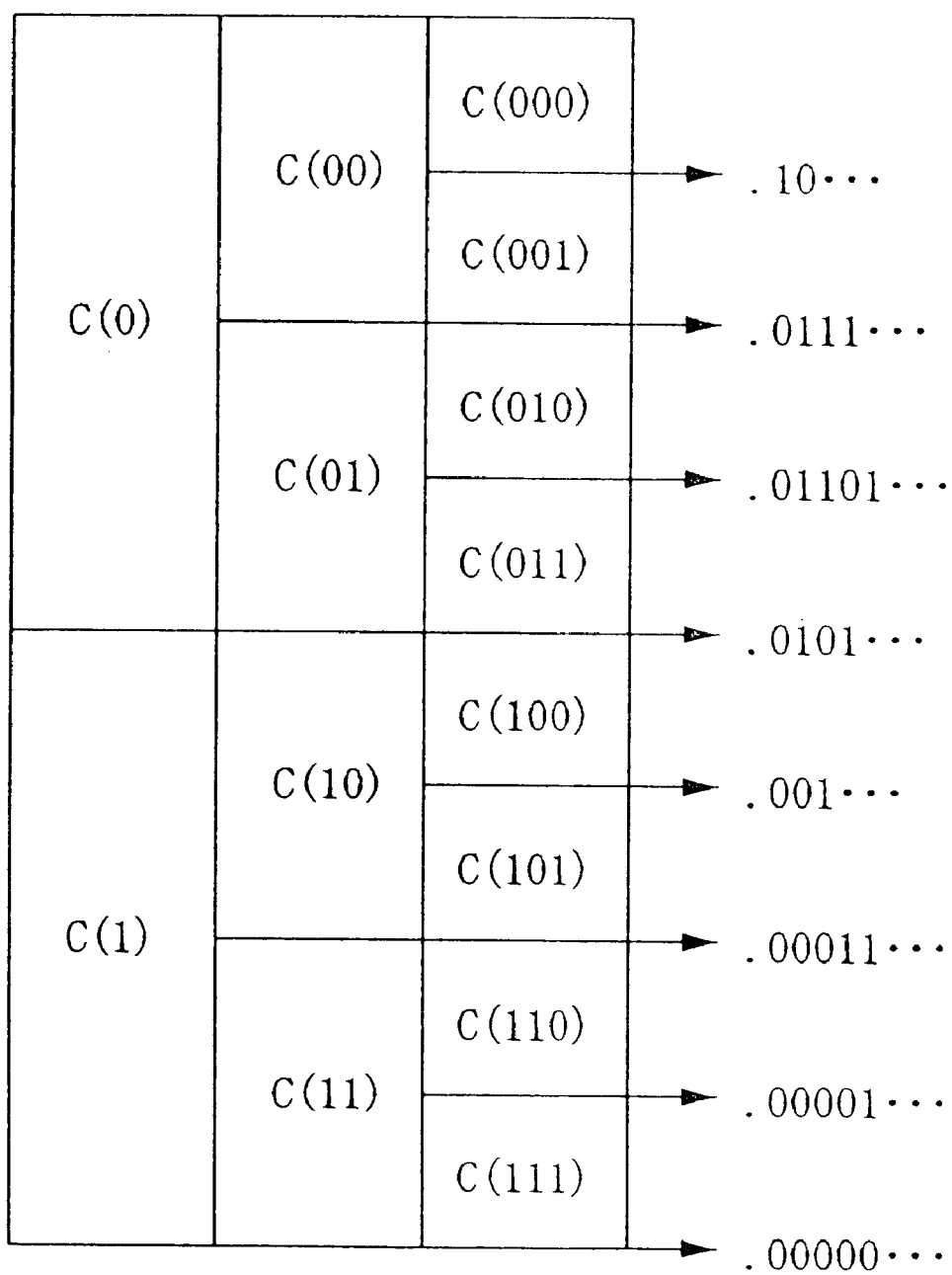
FIG. 1 shows a conceptual drawing of a conventional arithmetic encoding.
Figure 2:
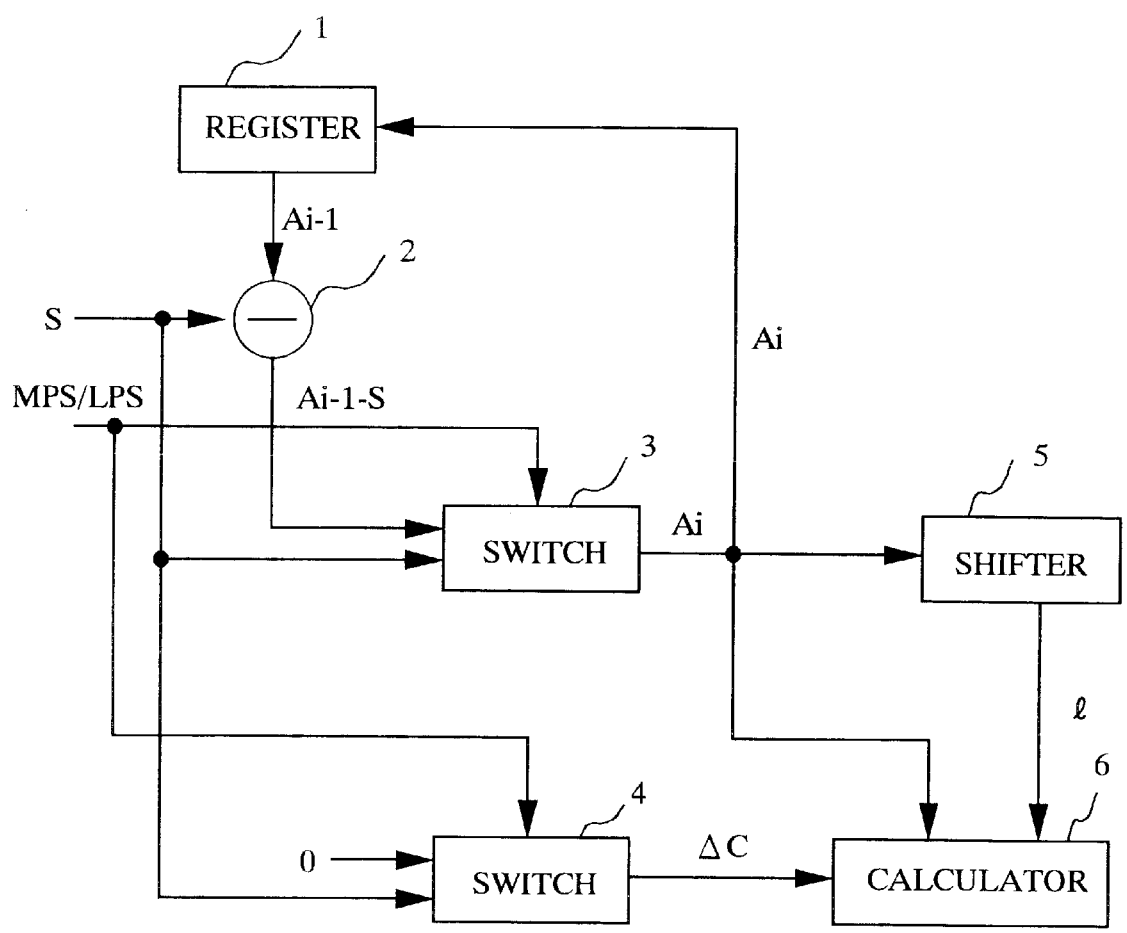
FIG. 2 shows a block diagram of a circuit of a conventional arithmetic encoder.
Figure 3:
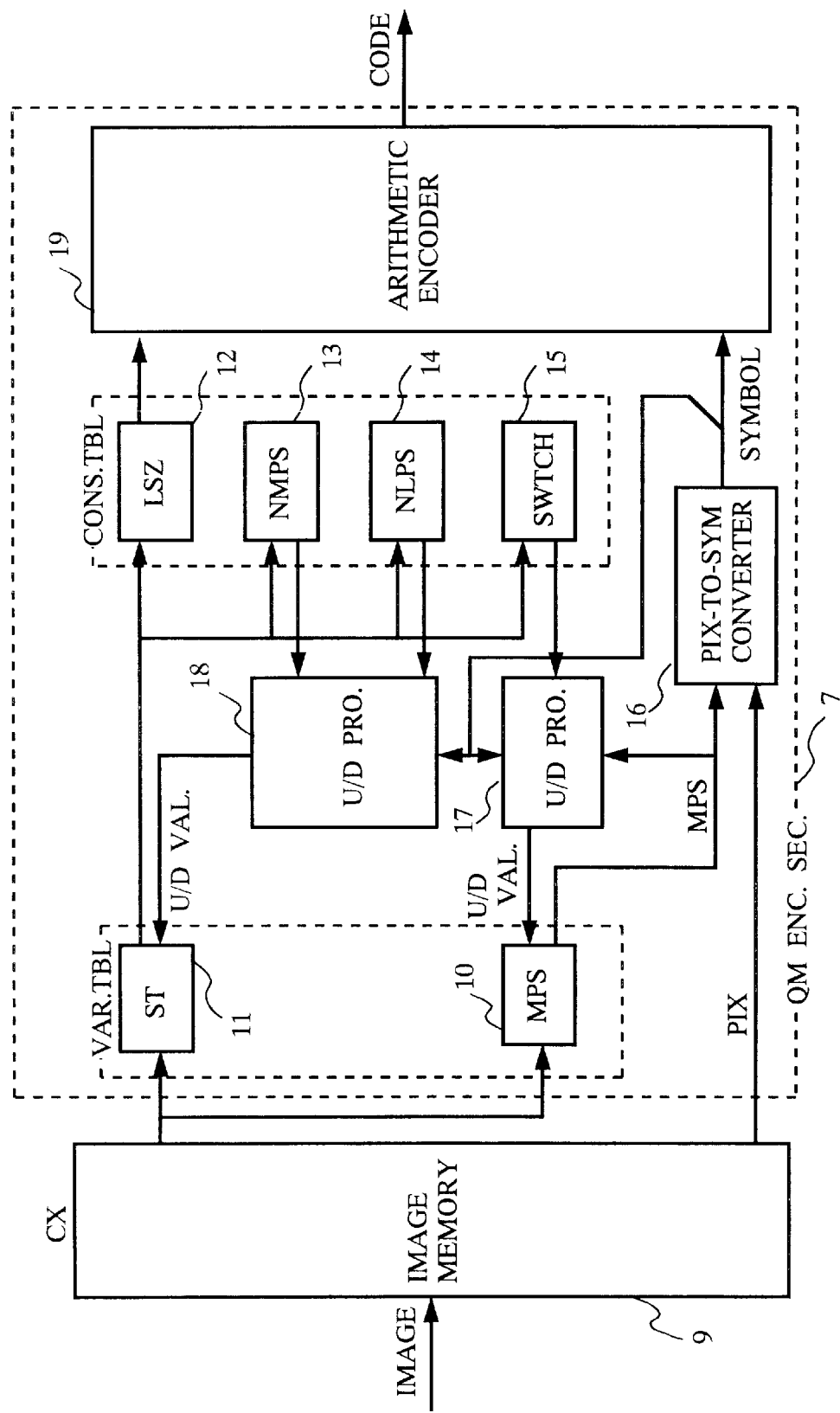
FIG. 3 shows a general configuration of a conventional encoding apparatus.
Figure 4:
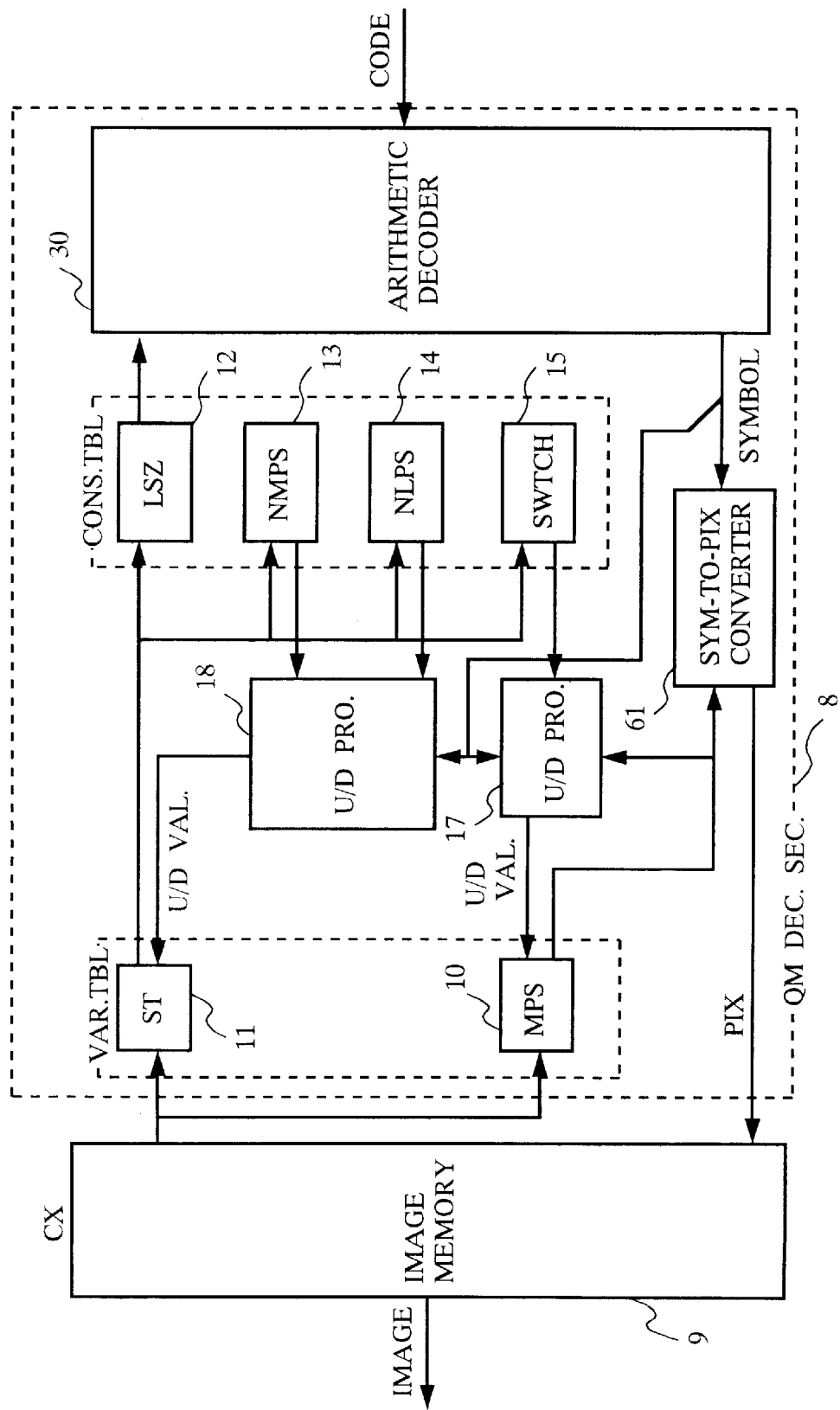
FIG. 4 shows a general configuration of a conventional decoding apparatus.
Figure 5:
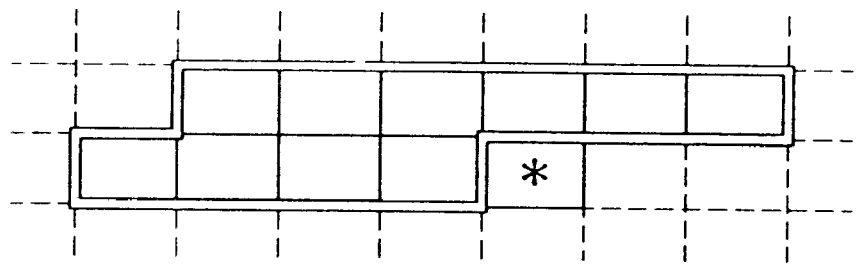
FIG. 5 shows conventional model templates.
Figure 5:
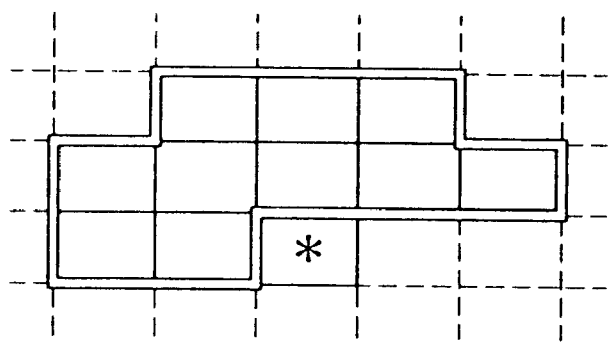
Figure 6:
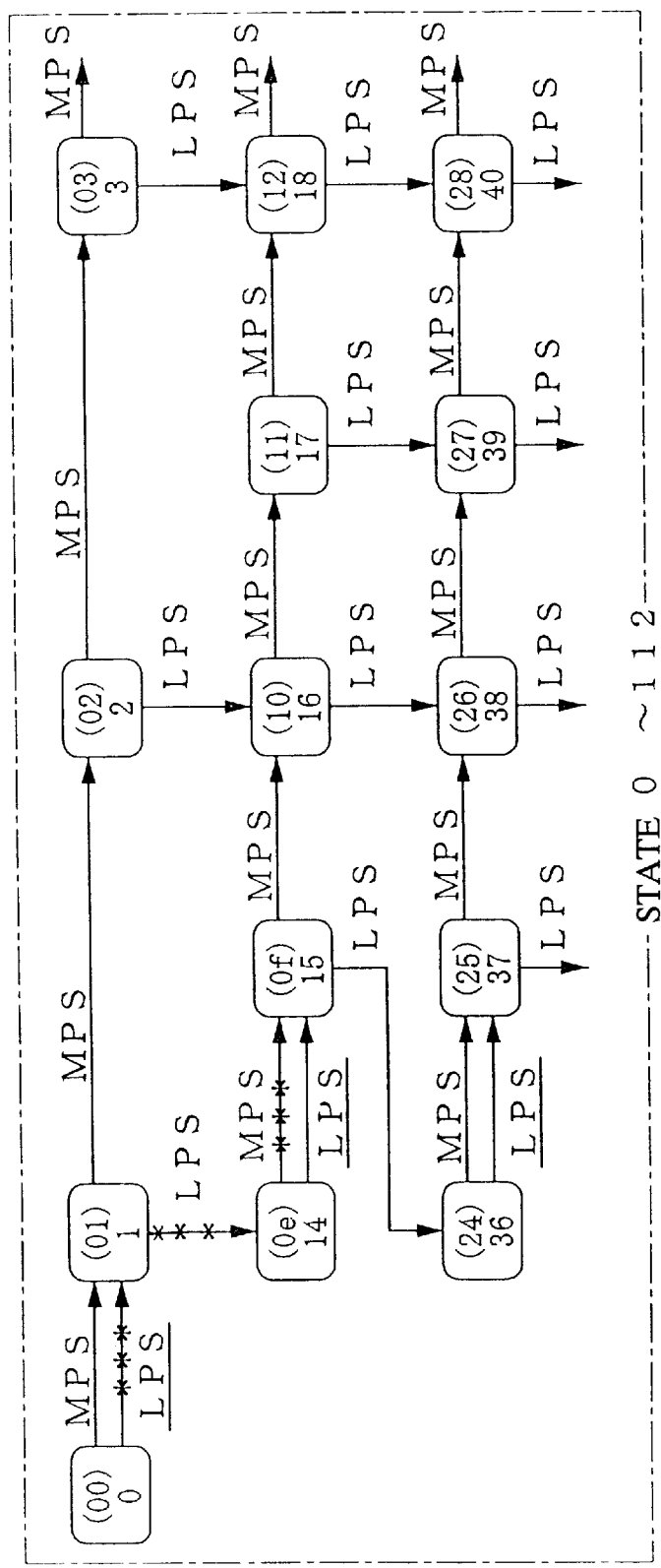
FIG. 6 shows a conventional state transition.
Figure 7:
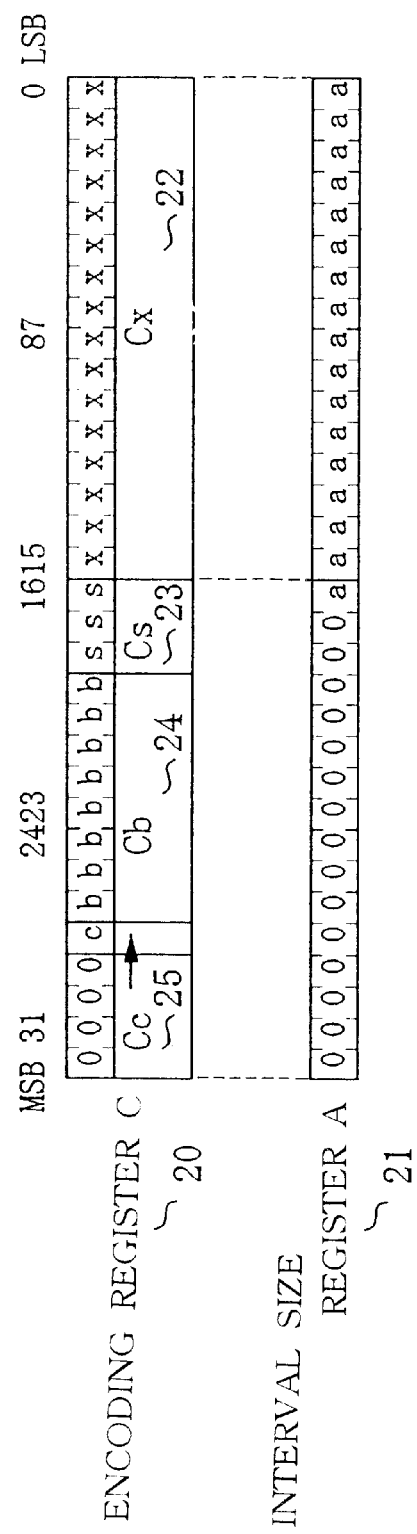
FIG. 7 shows a conventional encoding register for calculation.
Figure 30:
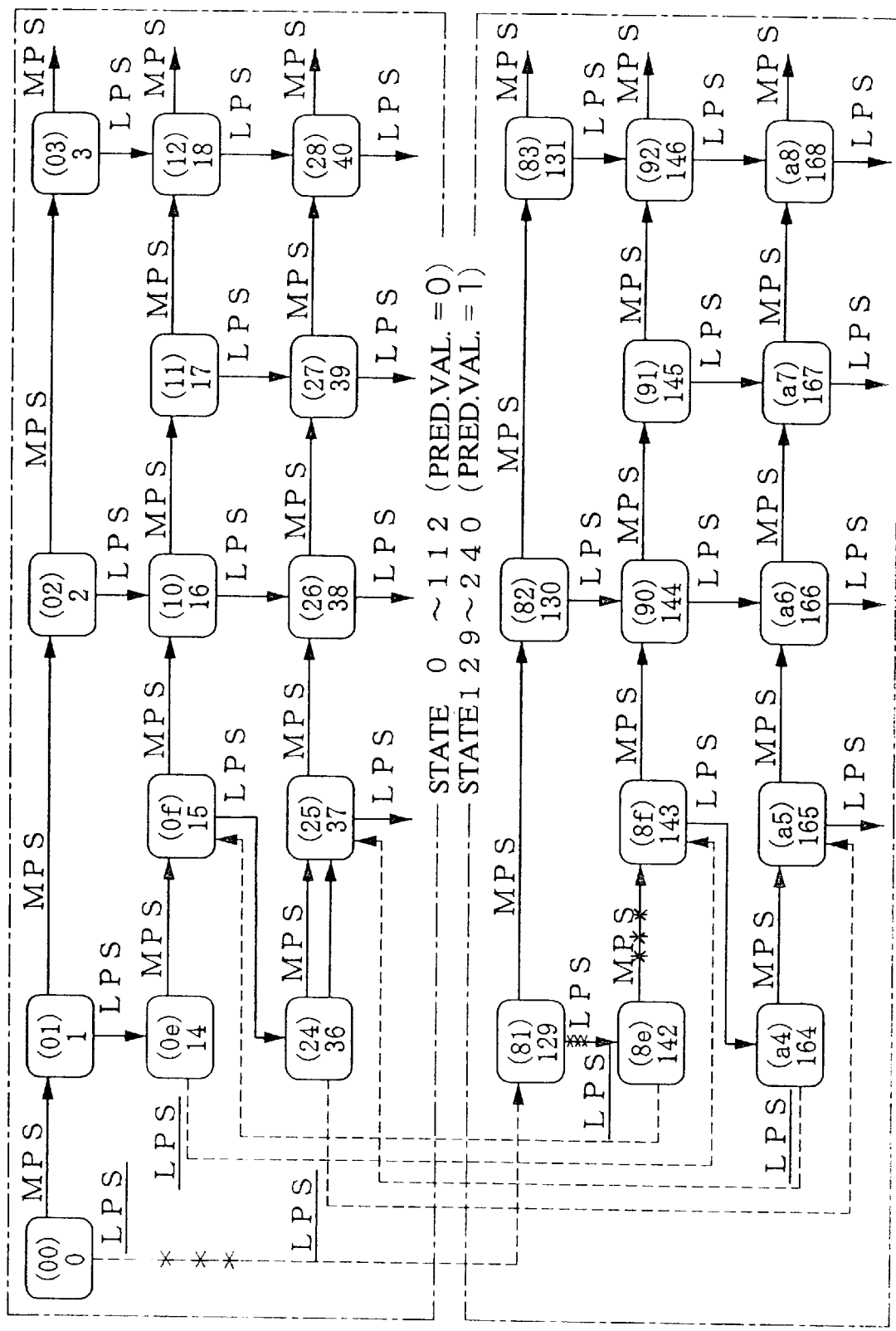
FIG. 30 shows a state transition according to the present invention.

FIG. 30 shows state transition of the QM-Coder according to the invention. The same method as the conventional one (FIG. 6) can be applied to the state transition here. The prediction value (MPS table), which has been controlled for each context in the conventional related art, is corresponded to each state one by one. Therefore, the inversion of the prediction value becomes unnecessary. In the figure, a large upper frame shows a case of the prediction value 0 (states 0–112), and a large lower frame show a case of the prediction value 1 (state 129–240). The number of the states is 225, approximately twice as conventional states of 113 (not exactly twice because sate 0 cannot be duplicated and state number 128 does not exist). Basic operation of the state transition is the same as the conventional method. An arrow drawn in a broken line shows the state transition (in case of SWTCH value=1) which requires an inversion of the prediction value in the conventional related art. A state is moved from the large frame corresponding to the prediction value to the other large frame. An example of the state transition will be explained. At starting time of encoding, for example, states for all the contexts are initialized to "state=0" as shown in FIG. 49. To simplify the explanation, the state transition will be explained assuming that context CX become continuously the same value (e.g., CX=1) for a plurality of continuous pixels. In the encoding process, the state number for the context CX is referred from the variable table as STATE[CX]. If LPS occurs as the first symbol, the state ST[CX] transits from 0 to 1. In the figure, a next state of the LPS transition is shown as:

NLPS[STATE[CX](=0)]=129
The STATE[CX] value of the STATE table 47 is updated as shown in FIG. 52 as (in the figure, underlined "LPS"):

STATE[CX]=129.

If LPS occurs again as the second symbol, a next state is:

NLPS[STATE[CX](=129)]=142
The STATE[CX] value of the STATE table 47 is updated as shown in FIG. 53 as:

STATE[CX]=142.

If the third symbol is MPS, the state transits only when the renormalization is required. Assuming the state transits, a next state is:

NMPS[STATE[CX](=142)]=143.
The STATE[CX] value of the STATE table 47 is updated as shown in FIG. 54 as:

STATE[CX]=143.
The above transition is shown in the figure by "****". The above transition is also performed in decoding process.

FIG. 55 compares the change between the conventional ST table 11 and the conventional MPS table 10 shown in FIGS. 45 through 48 and the change of STATE table 47 according to the invention shown in FIGS. 52 through 54. The relation among the MPS value, the ST value and the STATE value becomes:

MPS×128+ST=STATE.
Namely, the STATE value is obtained by weighing the MPS value by 128 and adding the ST value. The MPS takes the value of "0" or "1". If the MPS value is "0", the STATE value becomes the same value to the value of the conventional ST table. If the MPS value is "1", the STATE value is obtained by the value of the conventional ST table and adding 128.

In FIG. 30, for the convenience of the explanation, states 113 through 128 are not used because the state number is made correspondence with the prediction value "1" by weighing by 128. All the states corresponding to the prediction value "1" can be packed to set as states 113 through 224. However, if the table is set without packing all the states, the low-order 7 bits of the STATE table 47 can be used as the conventional ST table 11, the high-order 1 bit can be used as the conventional MPS table 10. Accordingly, the STATE table 47 keeps compatibility between encoding method according to the invention and the conventional encoding method. This is an important and effective point of the invention. When the table of the initial values can be shared between the encoding apparatus and the decoding apparatus through transmission at starting time of processing, it is not required to convert or reset the table even if the encoding apparatus and the decoding apparatus implement different type of encoding/decoding methods, namely, the conventional method or the method according to the invention.

Encoding and decoding processing flows according to the embodiment will be described. In the encoding and decoding processing flows, underlined part is different from the one of the conventional processing flow.

Figure 8:
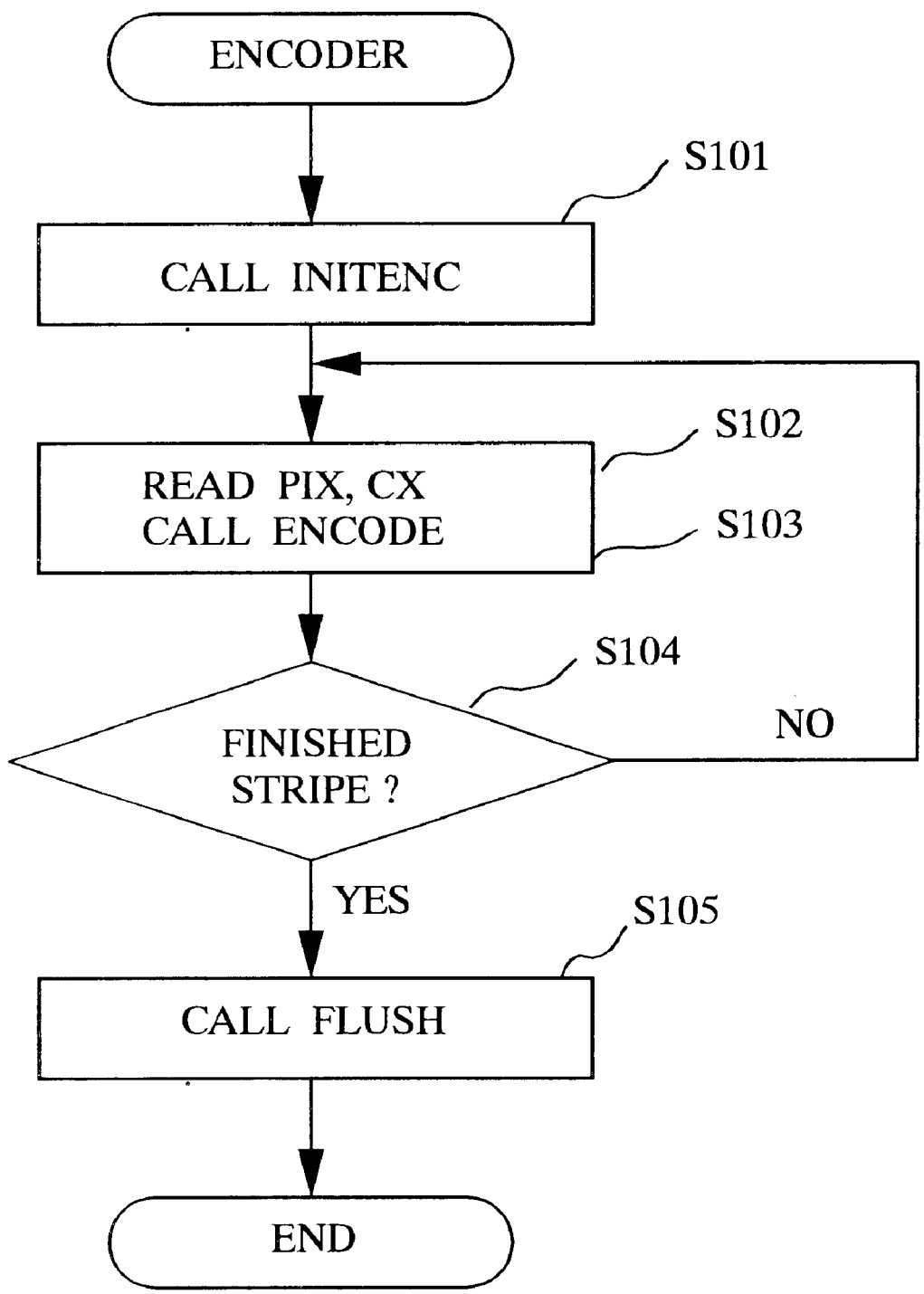
FIG. 8 shows a conventional ENCODER processing flow.
Figure 12:
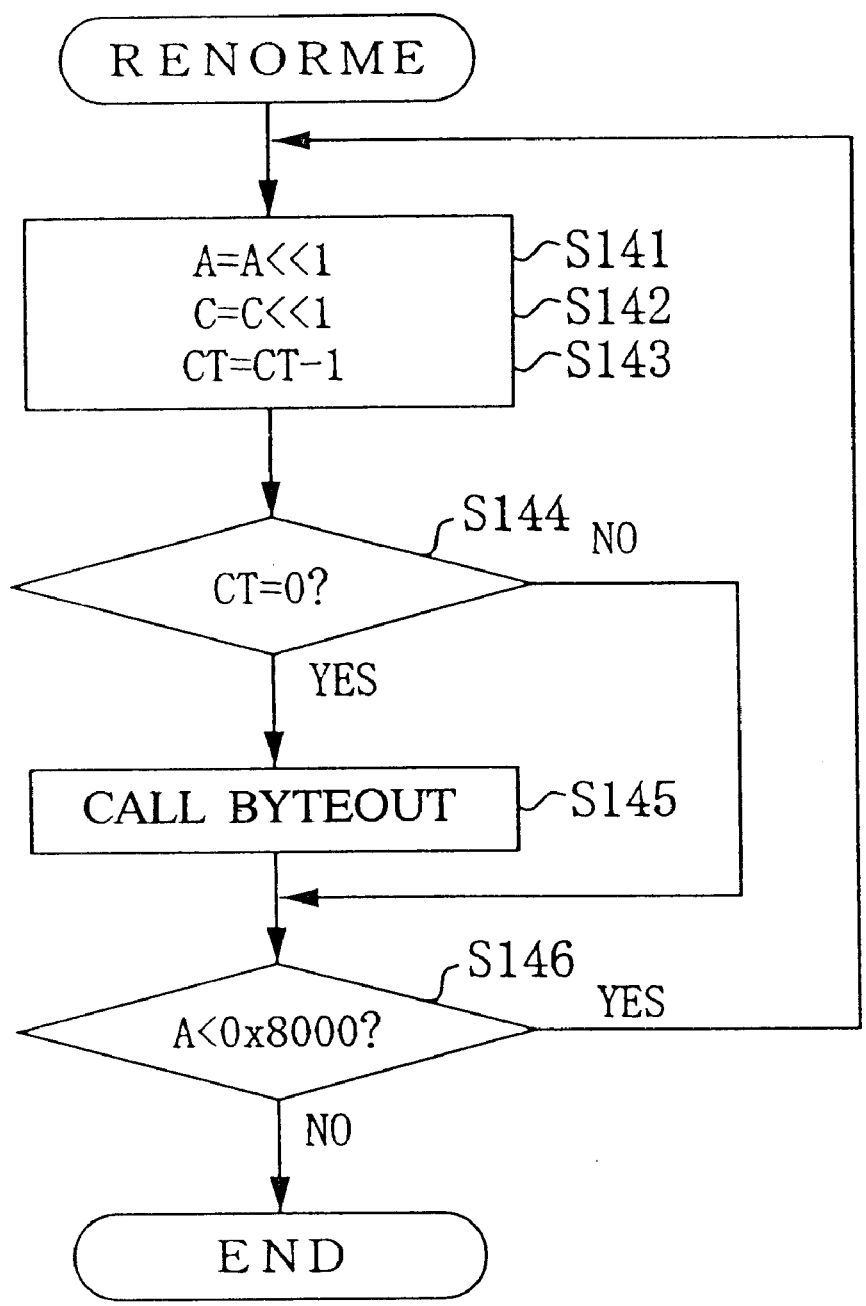
FIG. 12 shows a conventional RENORME processing flow.
Figure 13:
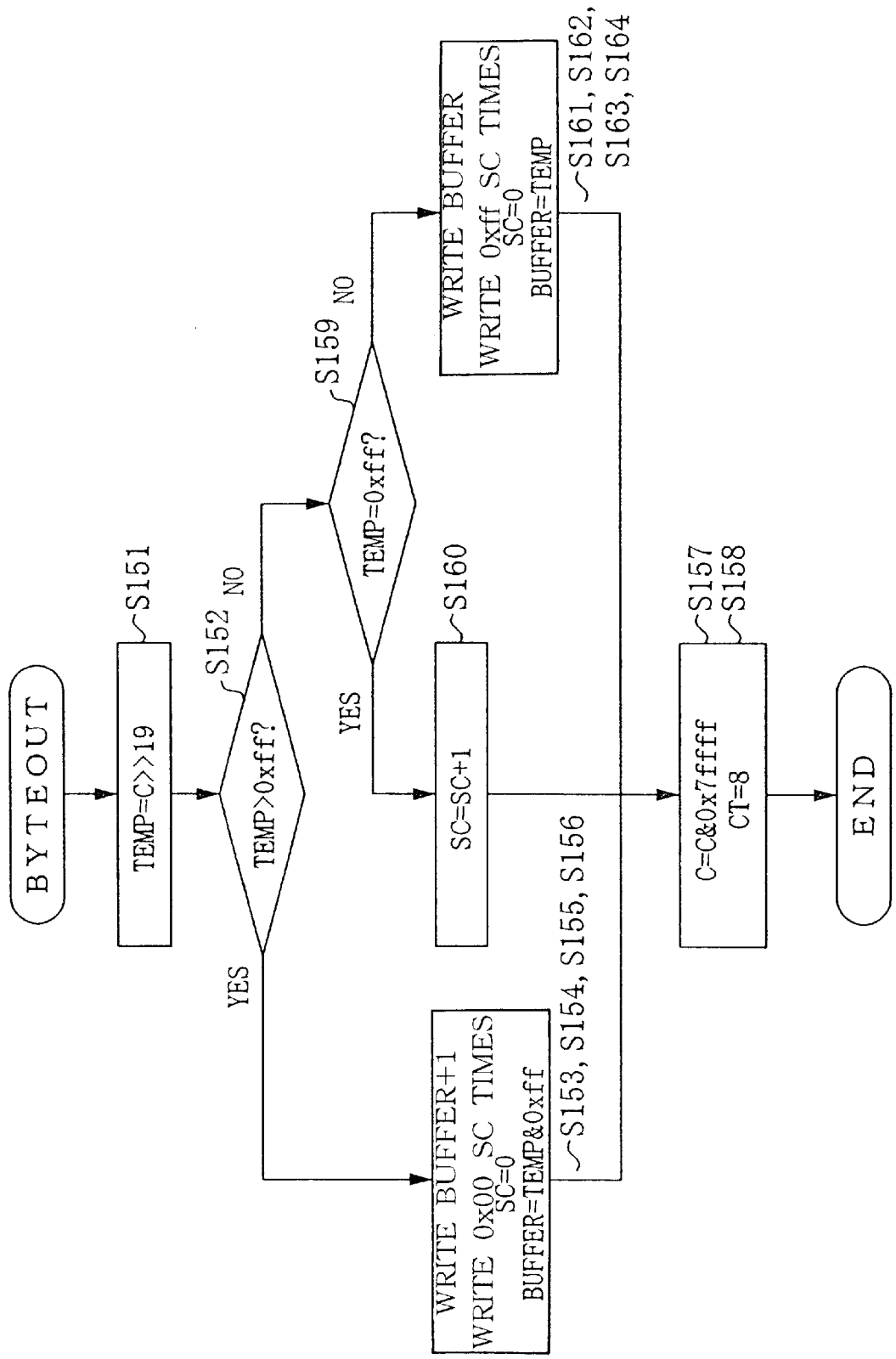
FIG. 13 shows a conventional BYTEOUT processing flow.
Figure 15:
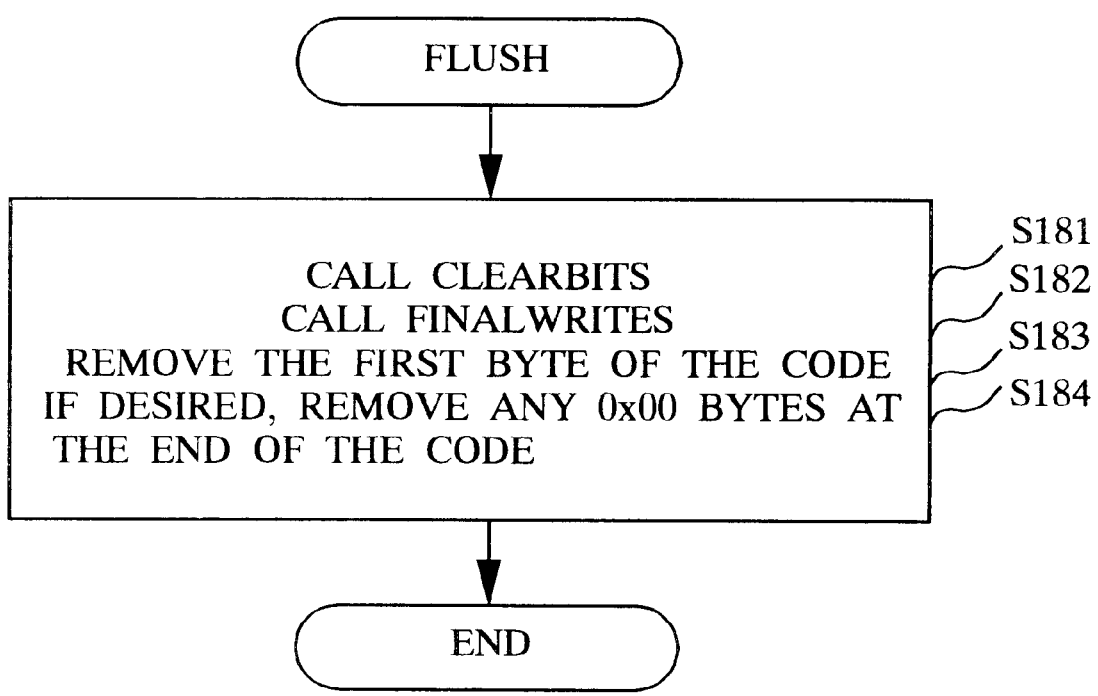
FIG. 15 shows a conventional FLUSH processing flow.
Figure 16:
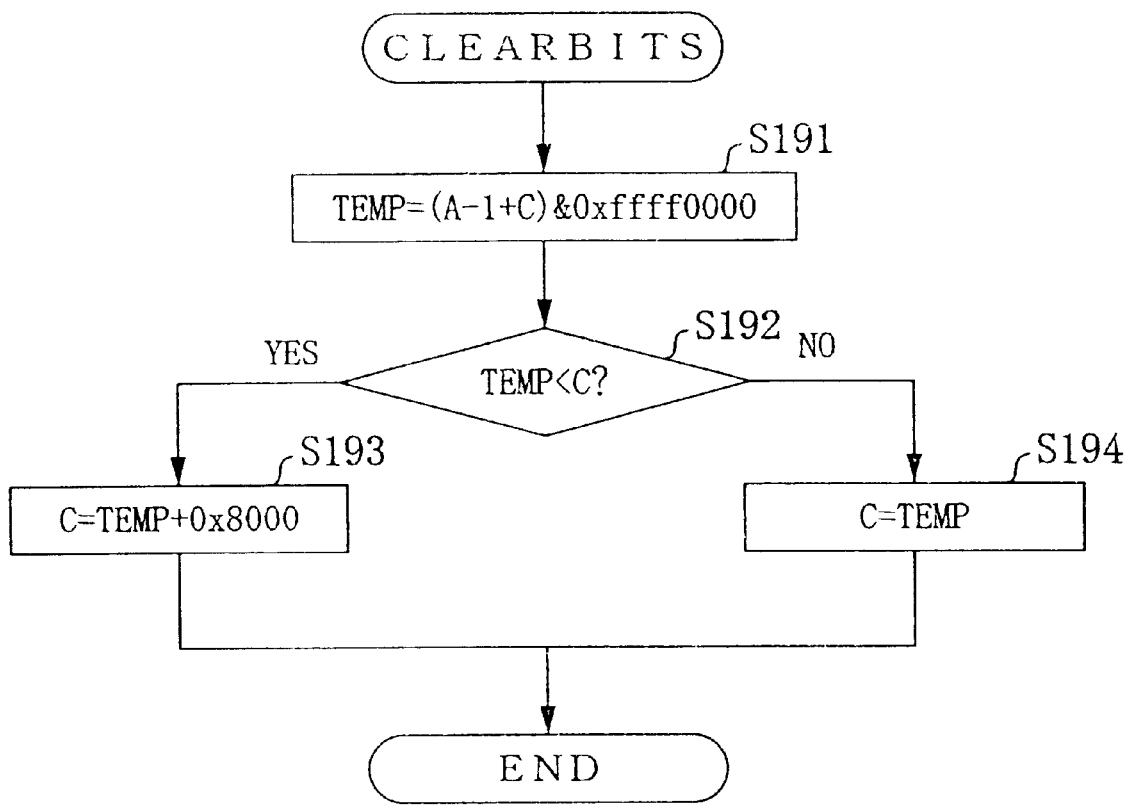
FIG. 16 shows a conventional CLEARBITS processing flow.
Figure 17:
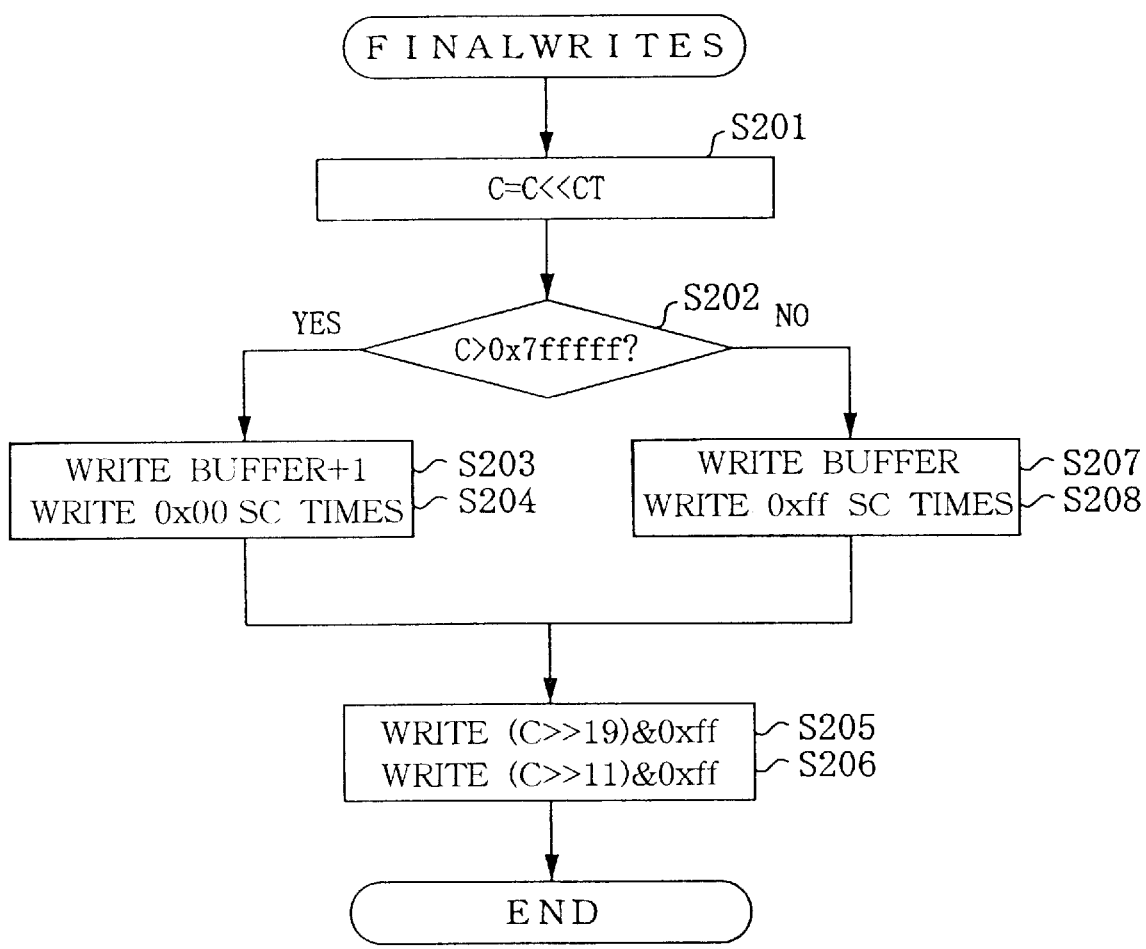
FIG. 17 shows a conventional FINALWRITES processing flow.
Figure 24:
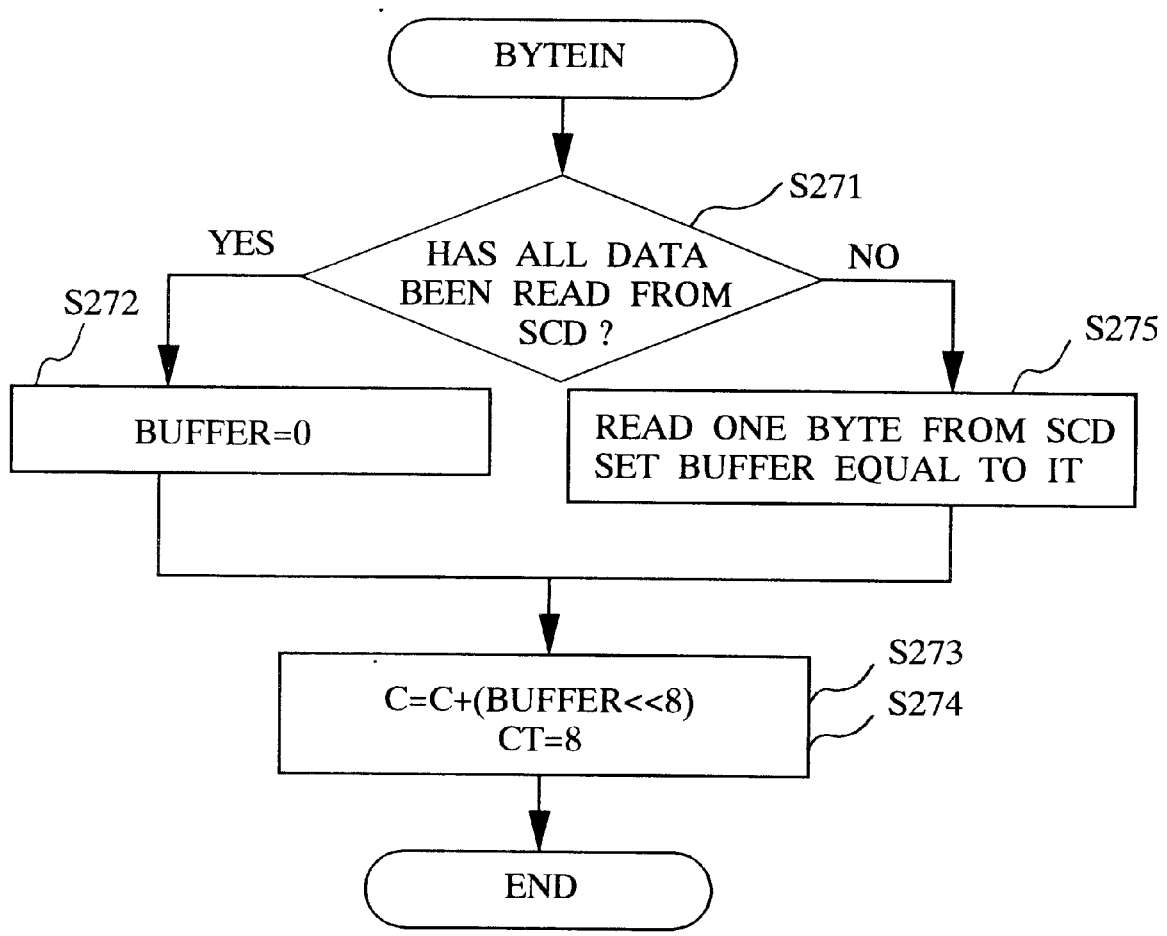
FIG. 24 shows a conventional BYTEIN processing flow.

In this embodiment, the encoding processing flows, namely, an ENCODER flow (FIG. 8), an RENORME flow (FIG. 12), a BYTEOUT flow (FIG. 13), a FLUSH flow (FIG. 15), a CLEARBITS flow (FIG. 16), a FINALWRITES flow (FIG. 17), and the decoding processing flows, namely, a DECODER flow (FIG. 18), a BYTEIN flow (FIG. 24) are the same as the conventional processing flows. The same identifier is used for the same element already explained in the conventional processing flow with the same name.

Figure 9:
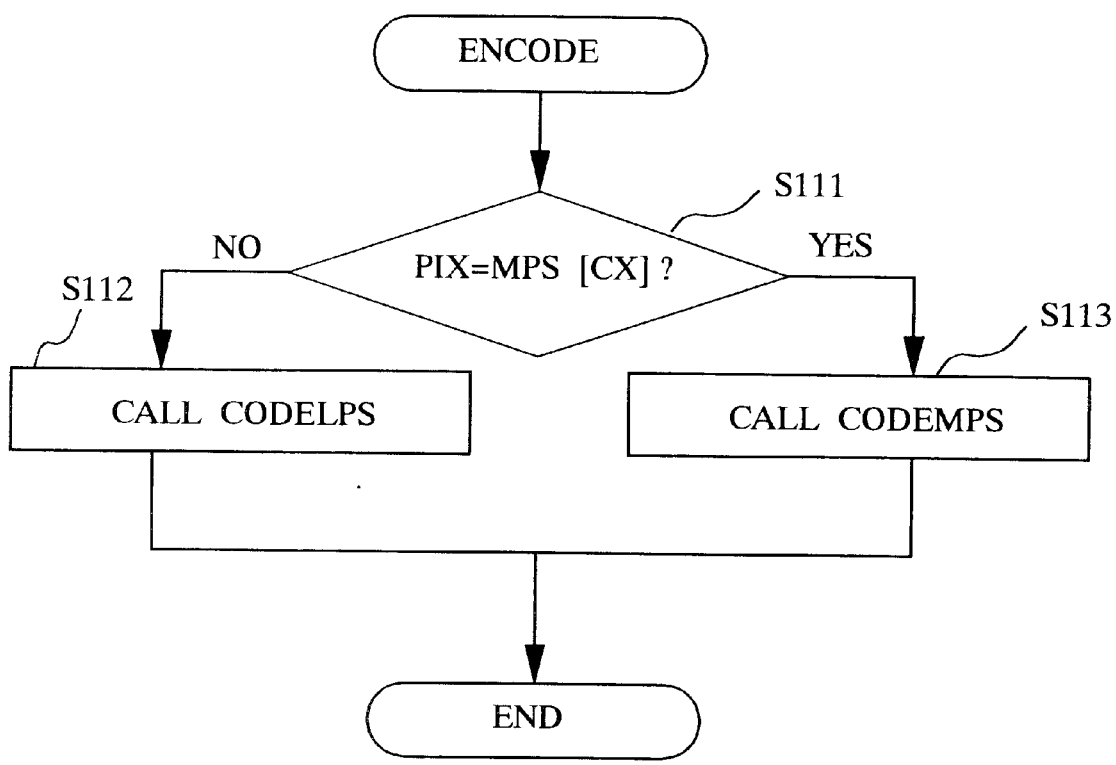
FIG. 9 shows a conventional ENCODE processing flow.
Figure 31:
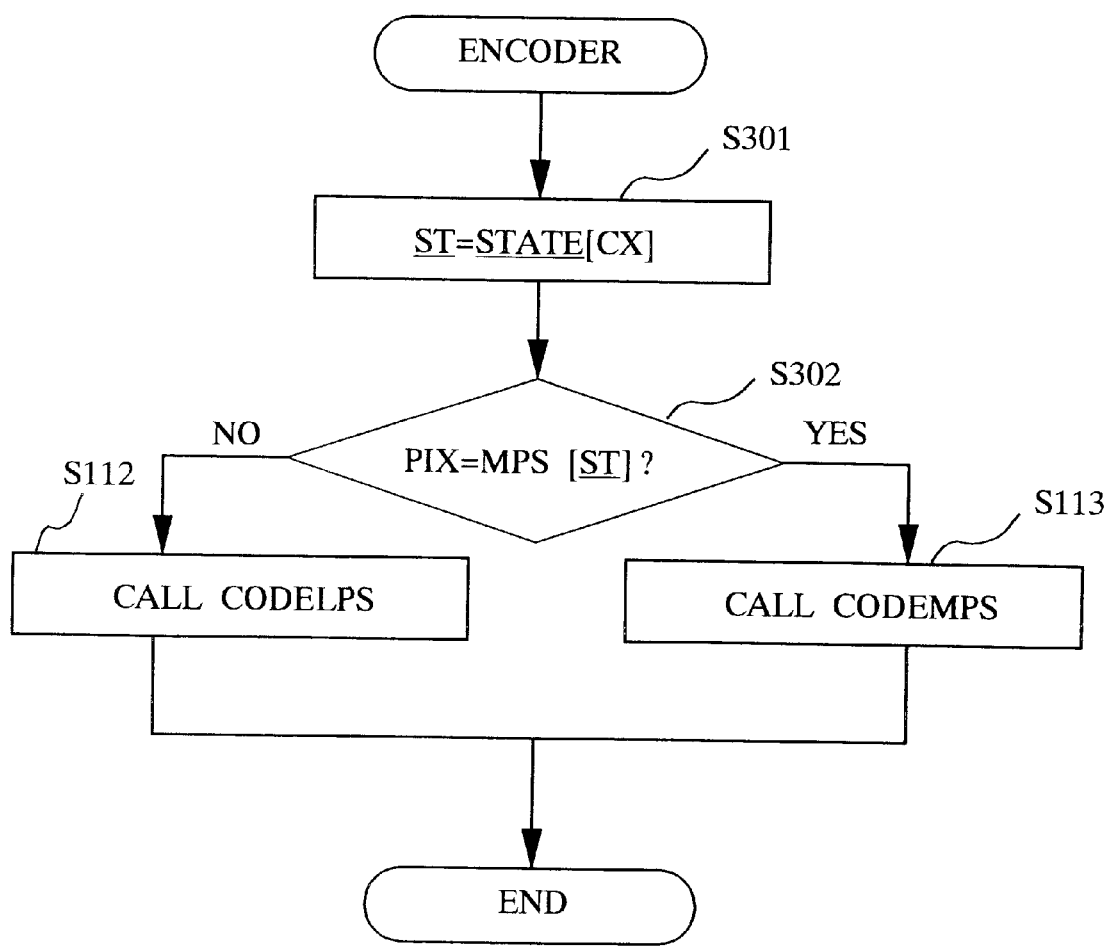
FIG. 31 shows ENCODE processing flow according to the present invention.

FIG. 31 shows the ENCODE processing flow and corresponds to the processing flow of FIG. 9 of the conventional related art. At step S301, the state number is set from the STATE table 47 to a variable ST, which becomes an index of the constant table. At step S302, it is checked whether the pixel value and the prediction value match or mismatch. The prediction value can be referred by the variable ST as the index. If step S302 results in "No", at step S112, CODELPS is called, and if "Yes", CODEMPS is called at step S113.

Figure 10:
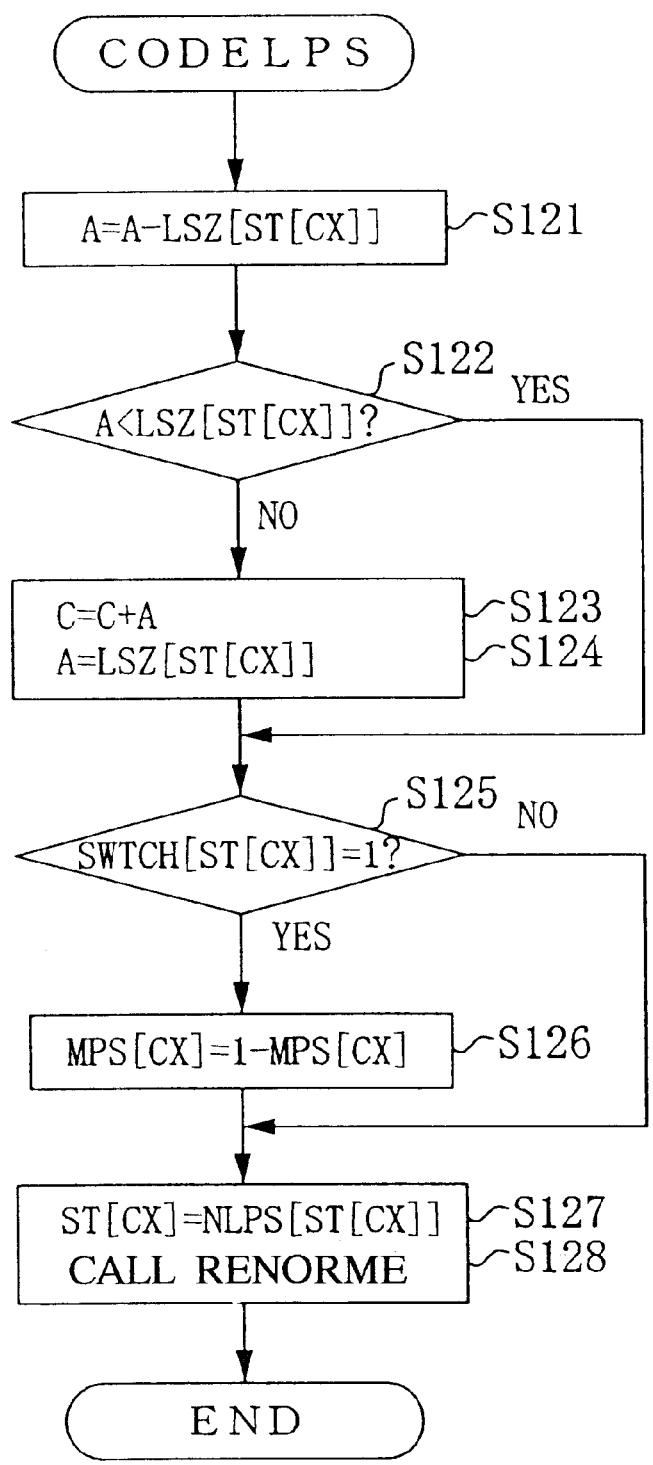
FIG. 10 shows a conventional CODELPS processing flow.
Figure 32:
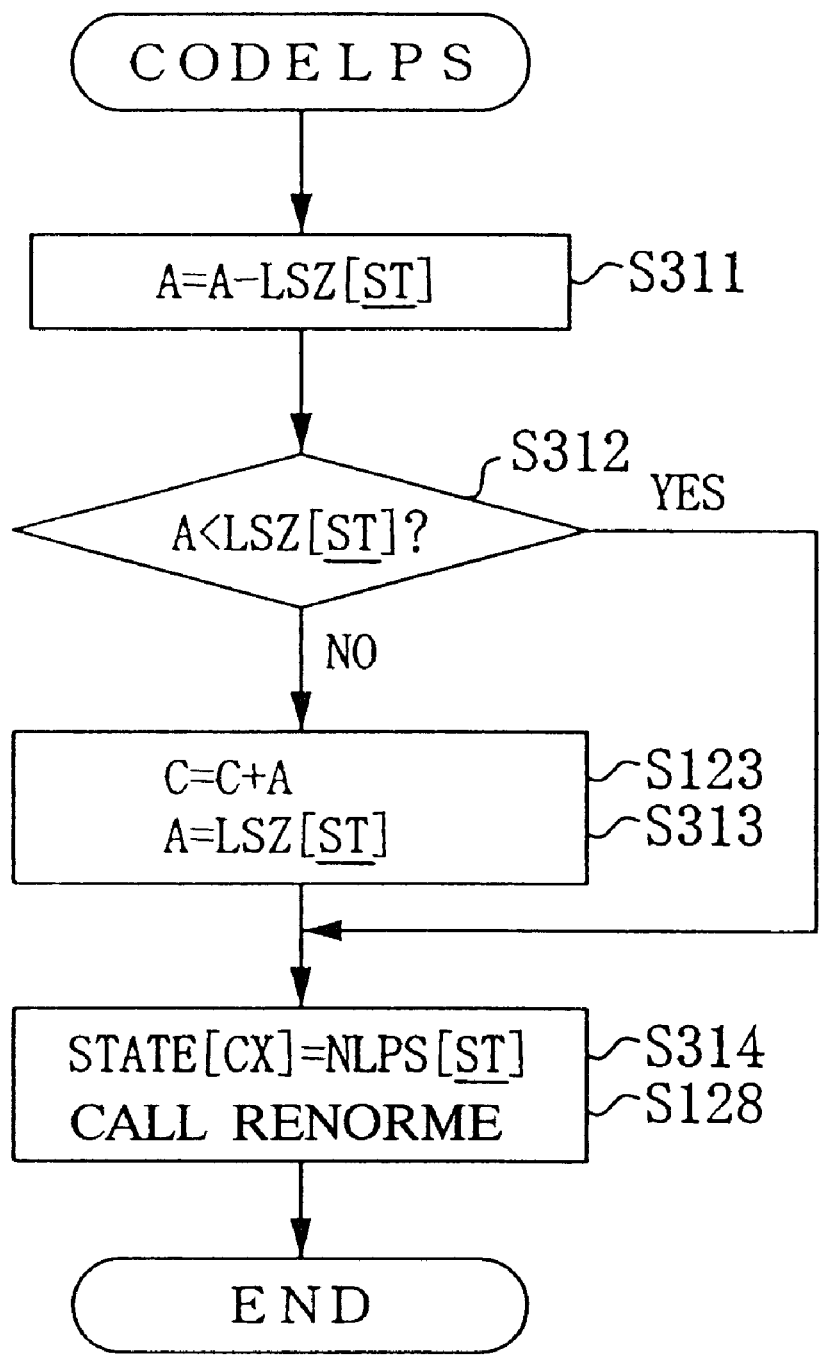
FIG. 32 shows CODELPS processing flow according to the present invention.

FIG. 32 shows the CODELPS processing flow and corresponds to FIG. 10 of the conventional related art. The index of the LSZ table 12 shown in steps S311, S312 and S313 and the NLPS table 14 at step S314 become the variable ST. The variable table at step S314 is changed to the STATE table 47 from the ST table 11. Processing is the same as the conventional related art. The detection of the inversion of the prediction value at step S125 and the inversion at step S126 of the conventional processing flow become unnecessary by performing step S314 corresponding to S127.

Figure 11:
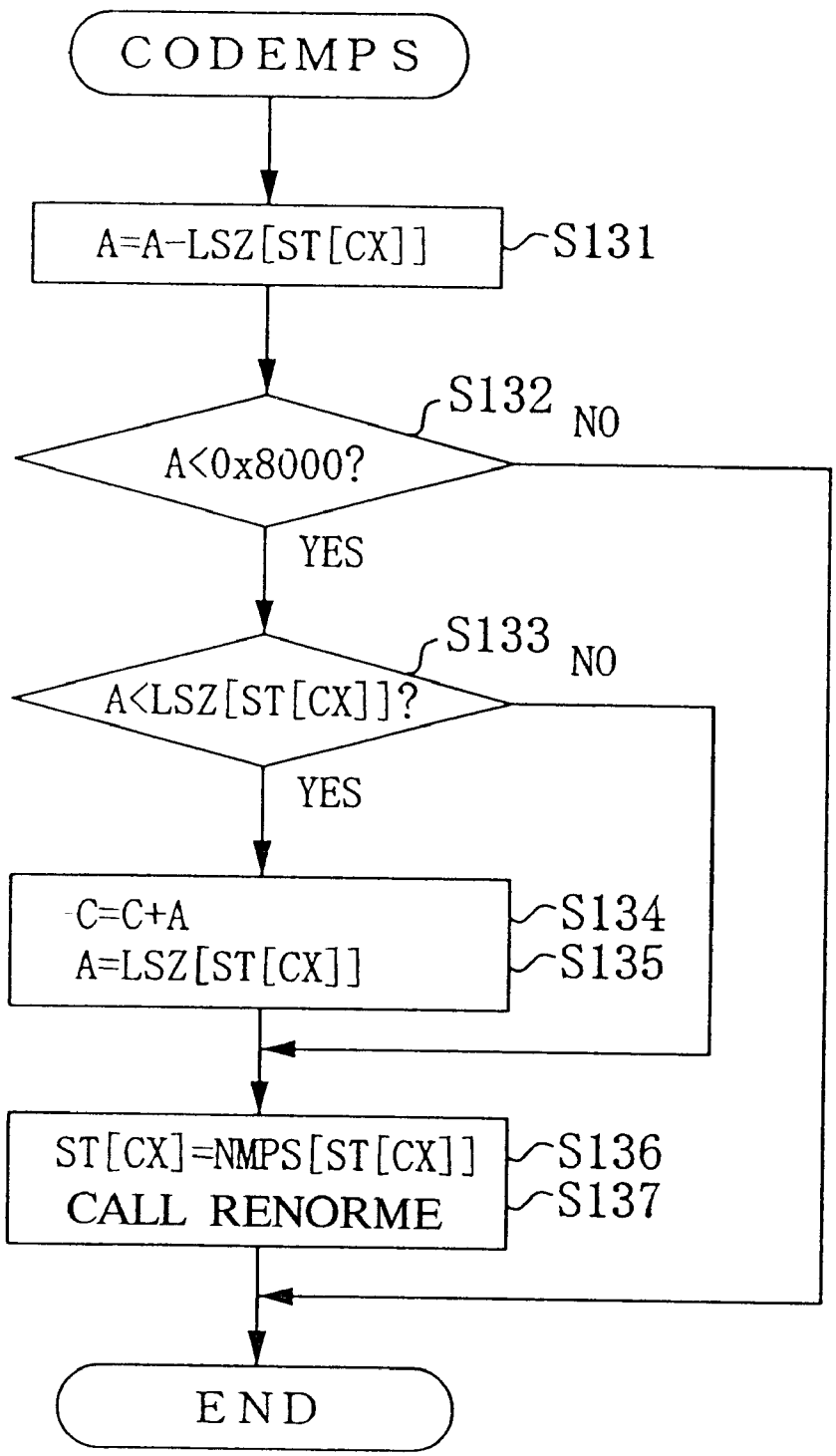
FIG. 11 shows a conventional CODEMPS processing flow.
Figure 33:
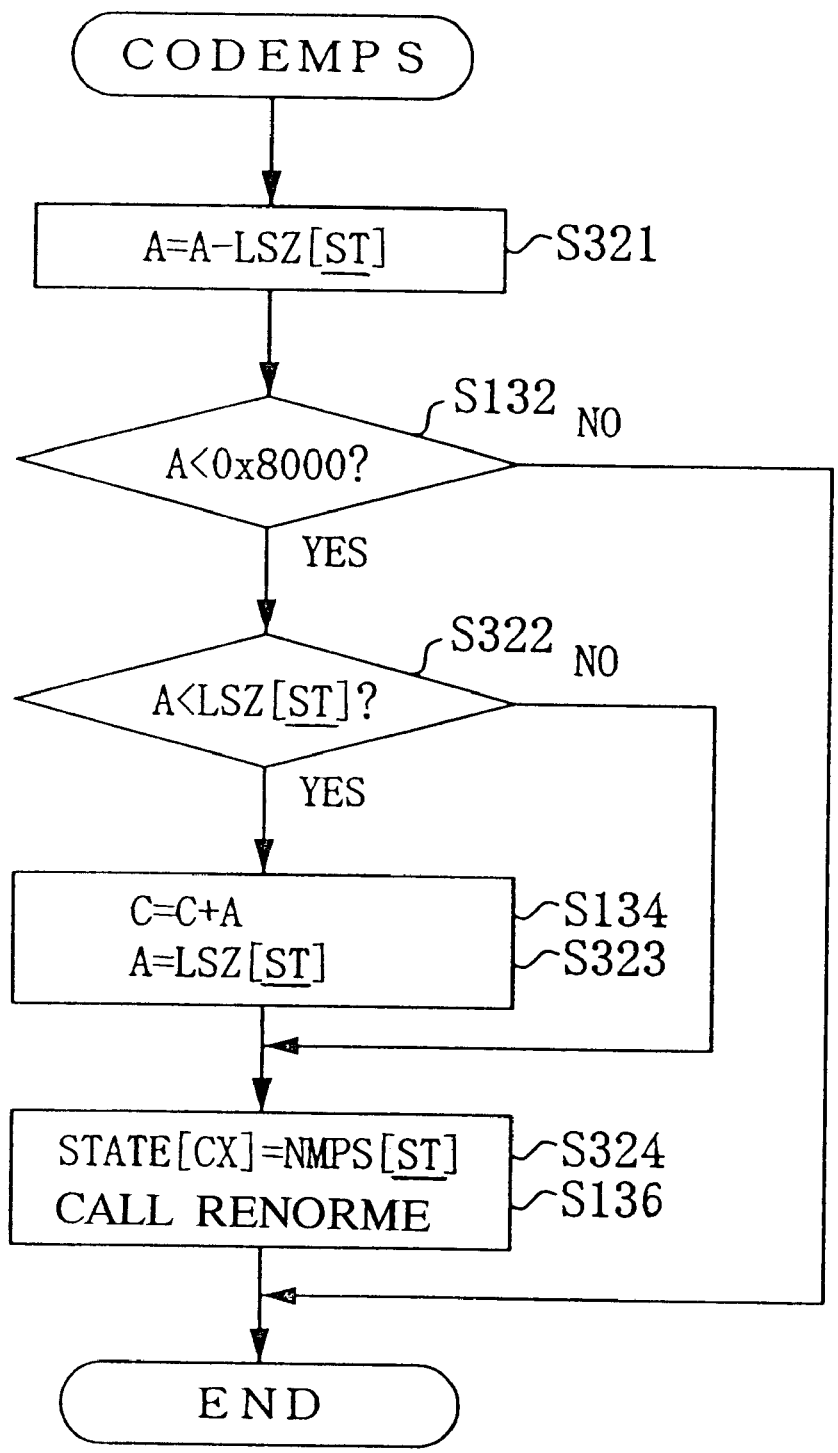
FIG. 33 shows CODEMPS processing flow according to the present invention.

FIG. 33 shows the CODEMPS processing flow and corresponds to FIG. 11 of the conventional related art. The index of the LSZ table 12 shown in steps S321, S322 and S323 and the NMPS table 13 at step S324 become the variable ST. The variable table at step S324 is changed to the STATE table from the ST table. Processing is the same as the conventional related art.

Figure 14:
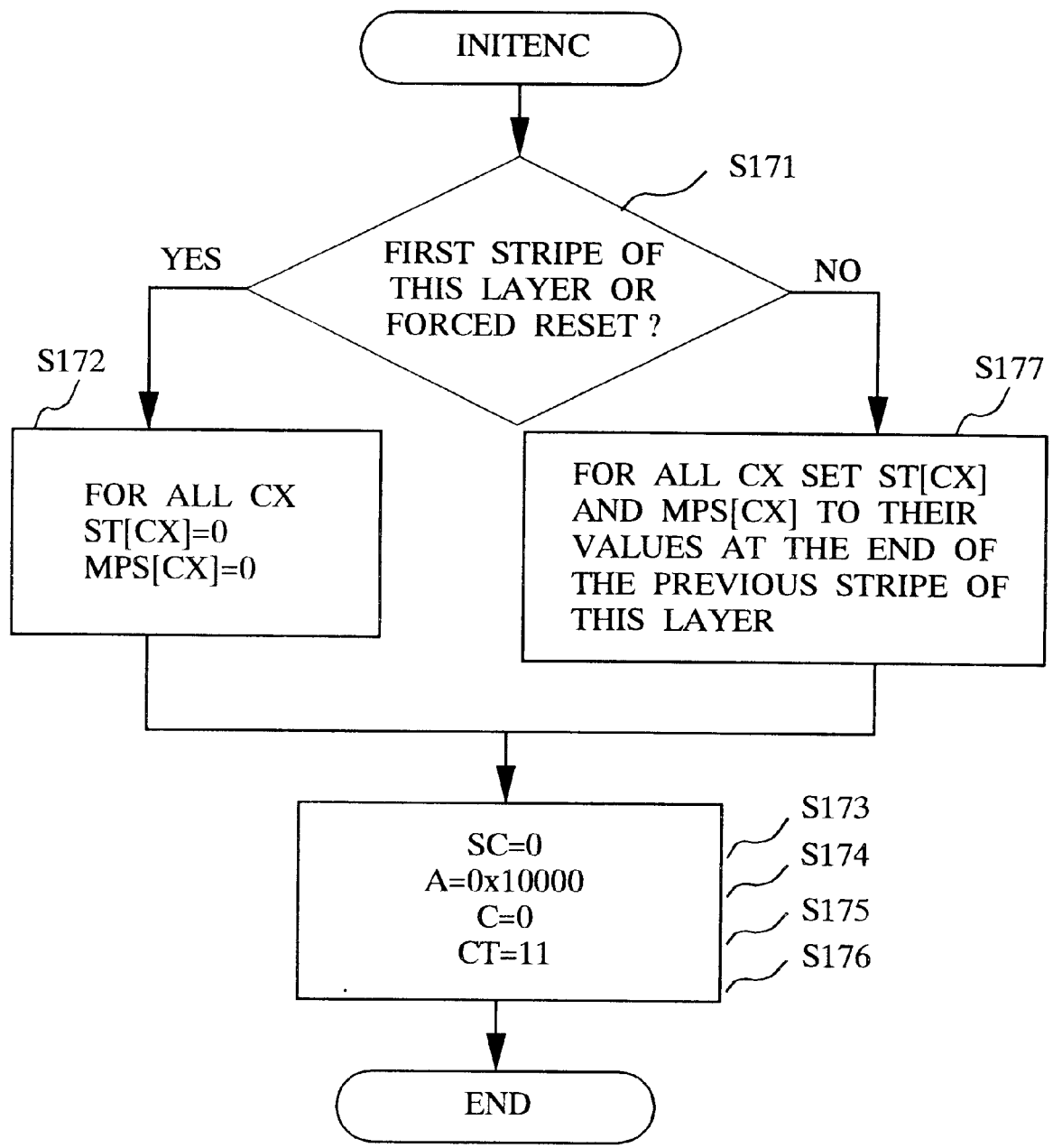
FIG. 14 shows a conventional INITENC processing flow.
Figure 34:
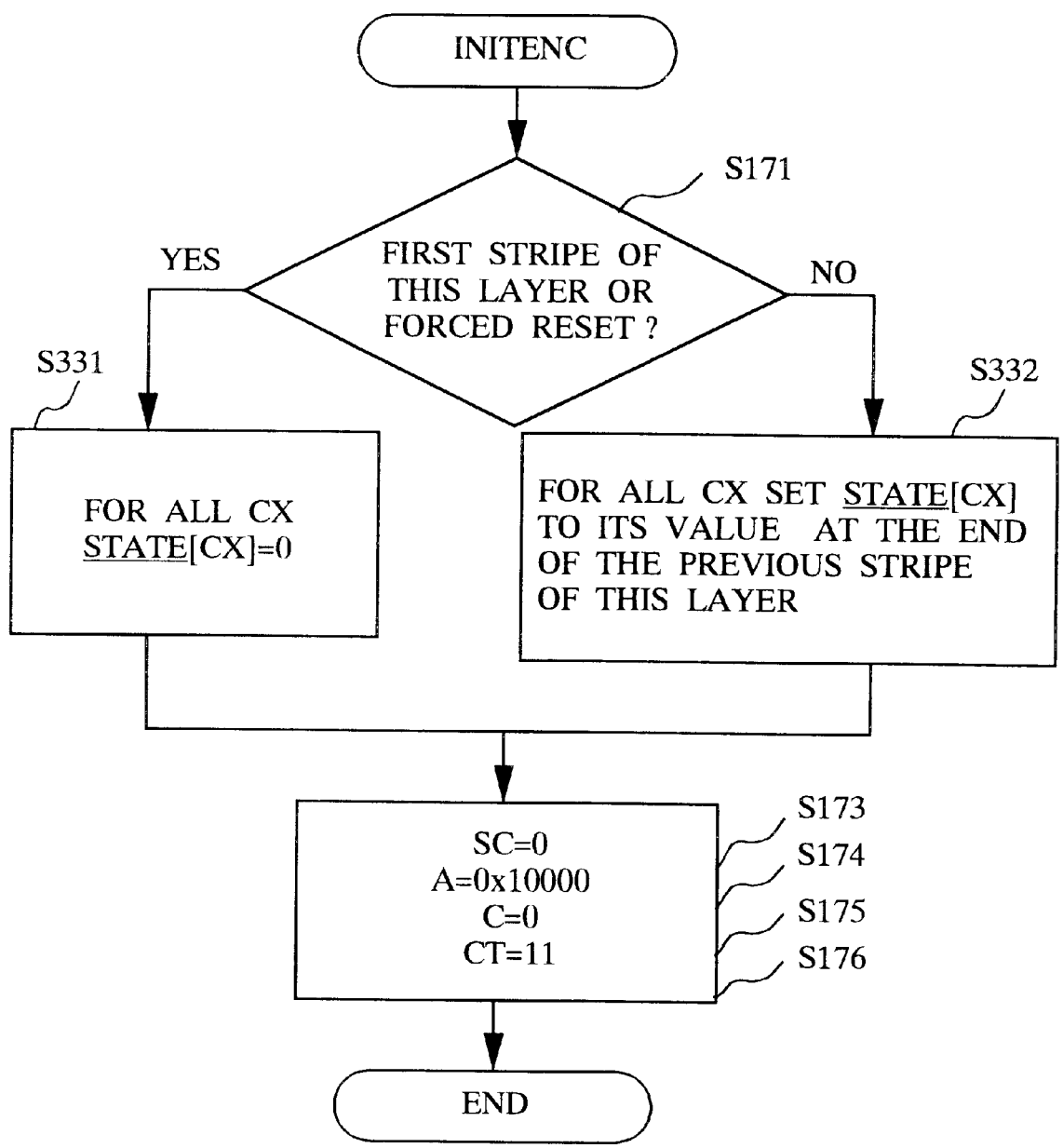
FIG. 34 shows INITENC processing flow according to the present invention.

FIG. 34 shows the INITENC processing flow and corresponds to FIG. 14 of the conventional related art. Since the conventional variable tables, the ST table 11 and the MPS table 10 are united into the STATE table 47, only the STATE table 47 is initialized. Processing is the same as the conventional related art.

Figure 18:
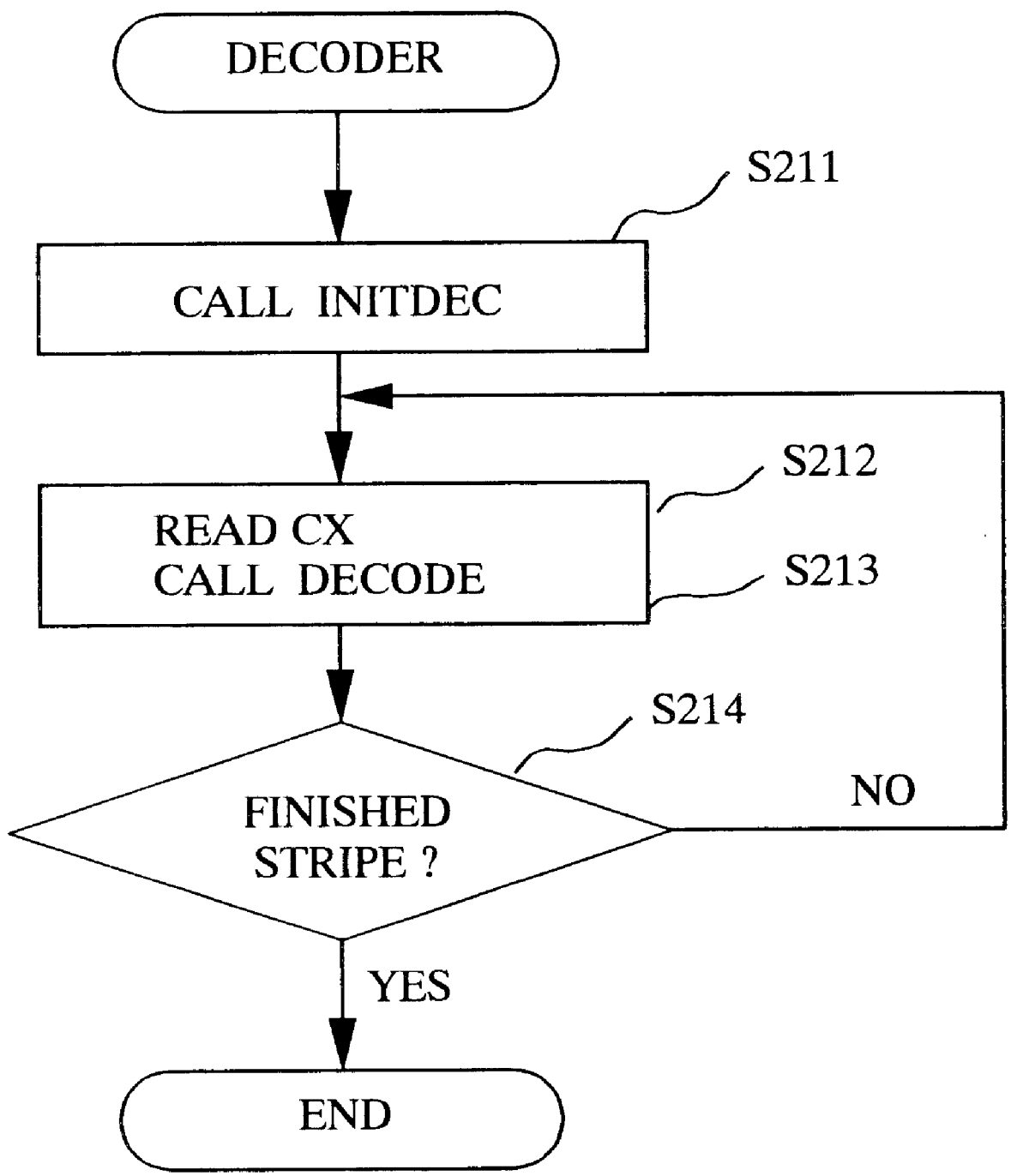
FIG. 18 shows a conventional DECODER processing flow.
Figure 19:
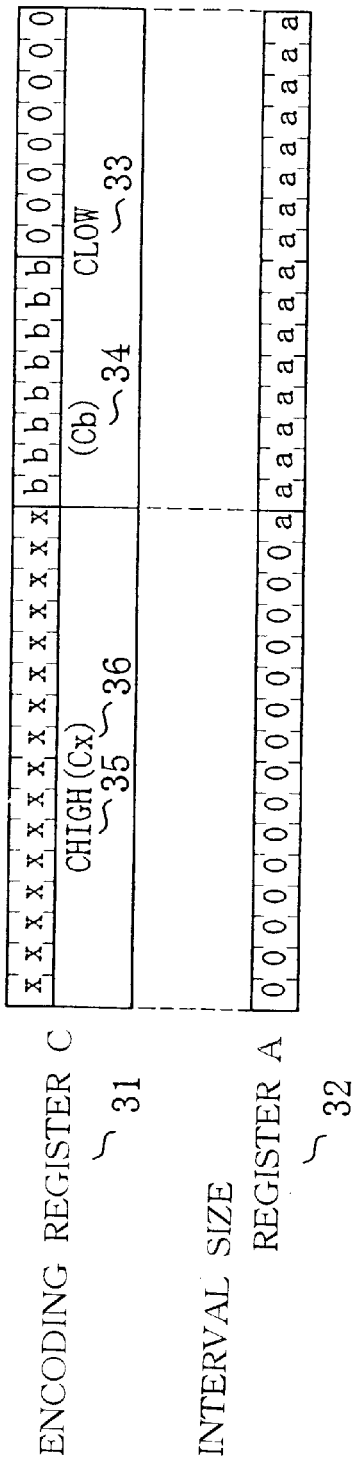
FIG. 19 shows a conventional decoding register for calculation.
Figure 20:
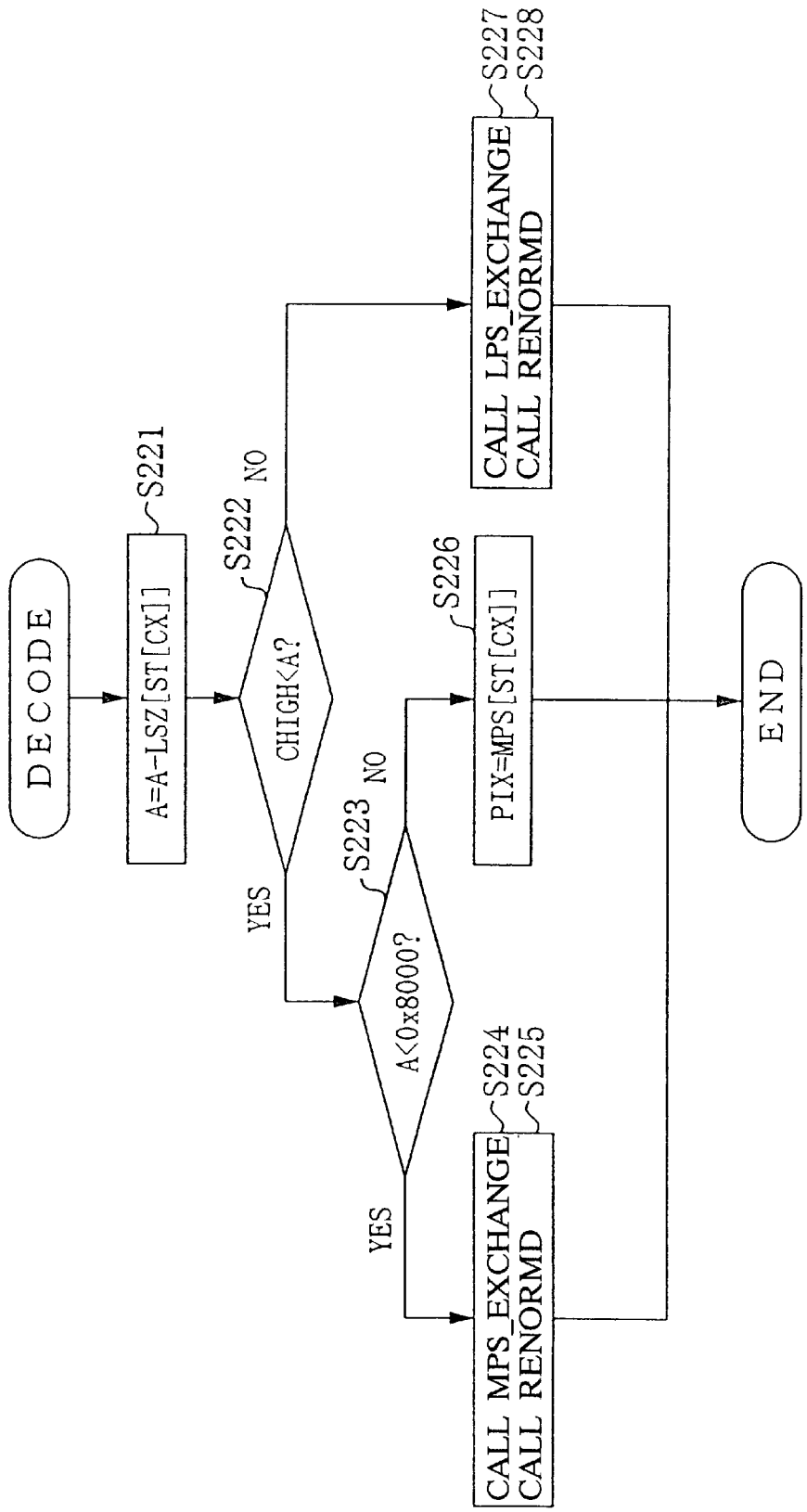
FIG. 20 shows a conventional DECODE processing flow.
Figure 35:
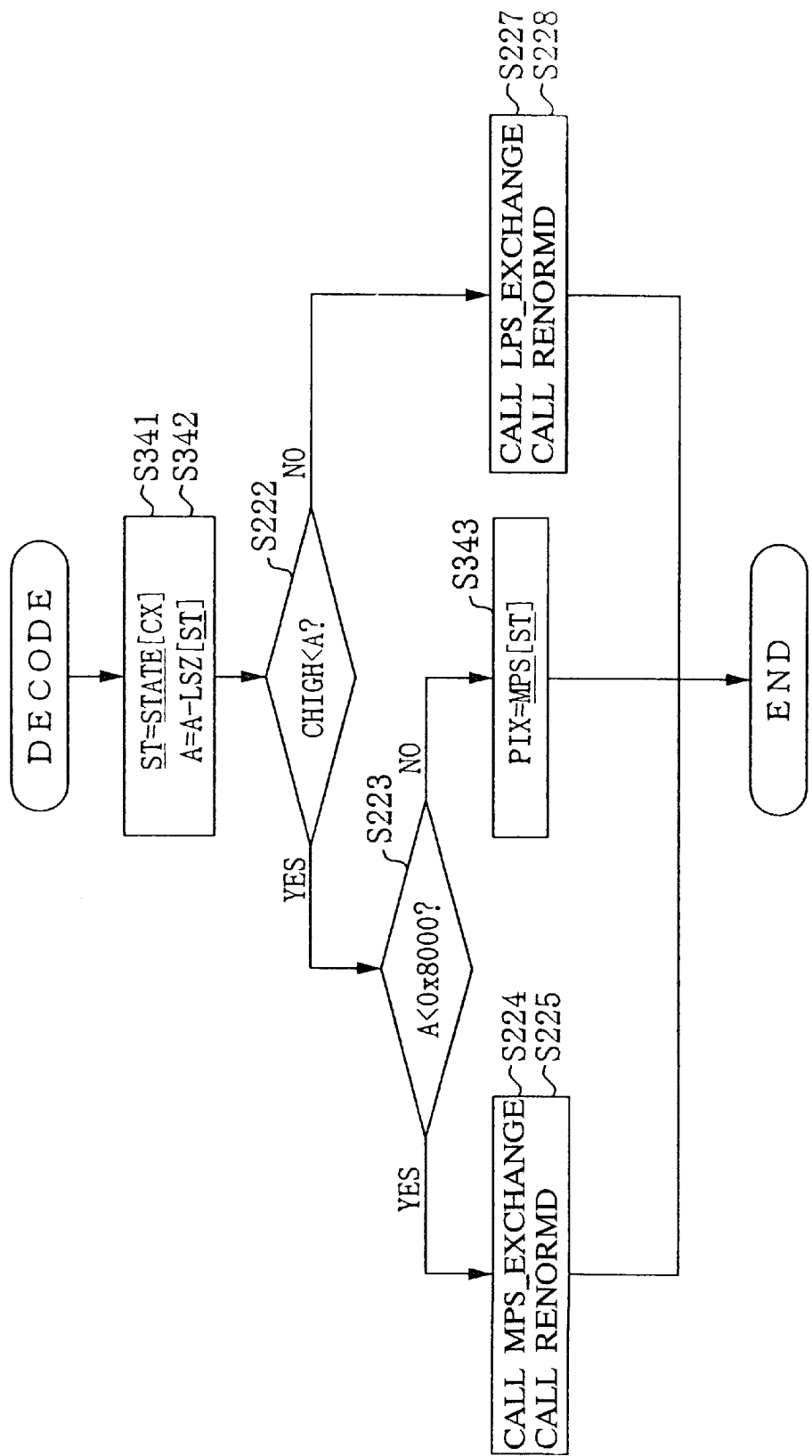
FIG. 35 shows DECODE processing flow according to the present invention.

FIG. 35 shows the DECODE processing flow and corresponds to FIG. 18 of the conventional related art. At step S341, the state number (state) from the STATE table 47 is set to the variable ST of the index of the constant table. The index of the LSZ table 12 of step S342 and the MPS table 49 of step S343 are changed to the variable ST. Processing is the same as the conventional related art.

Figure 21:
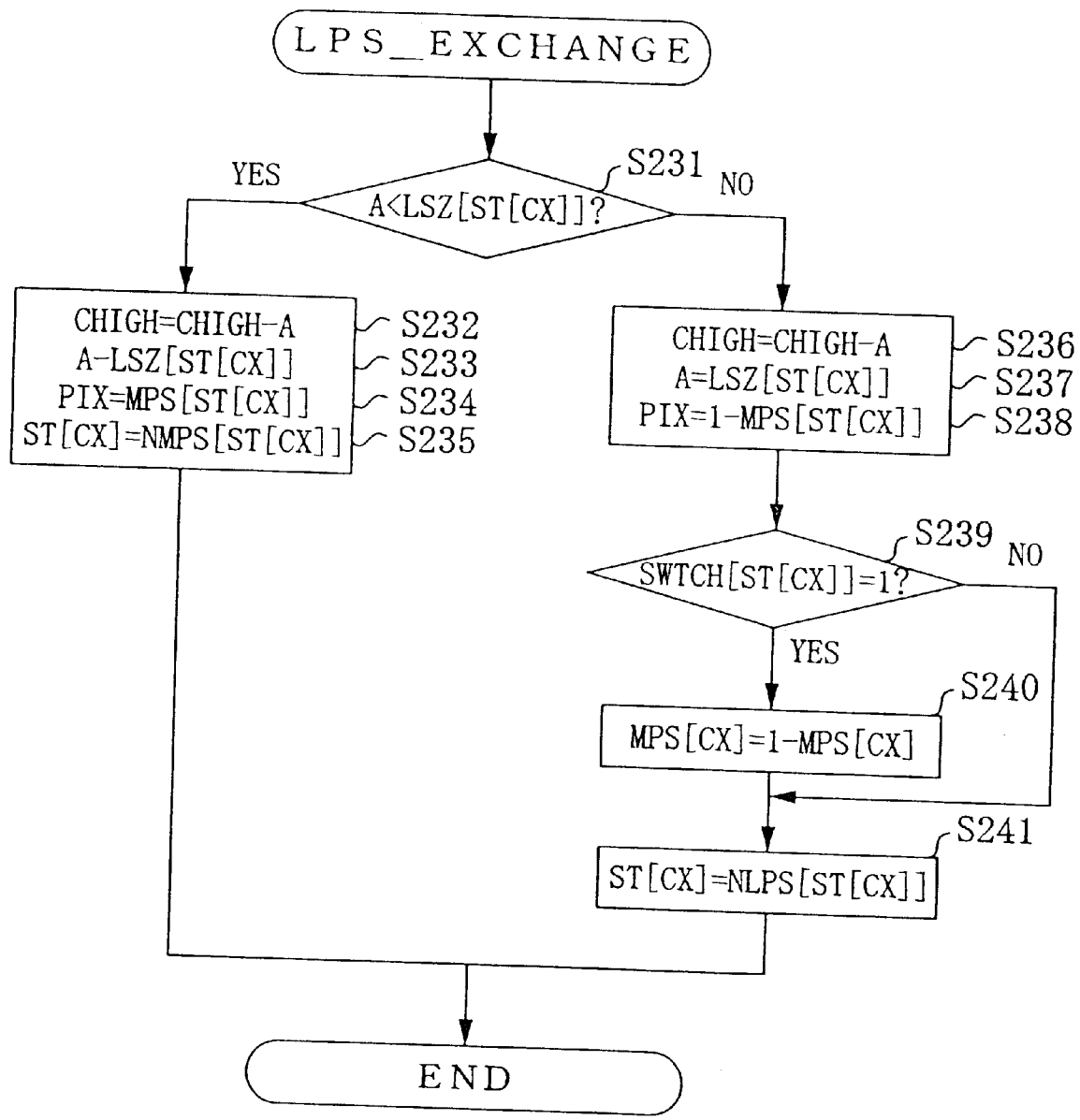
FIG. 21 shows a conventional LPS_EXCHANGE processing flow.
Figure 36:
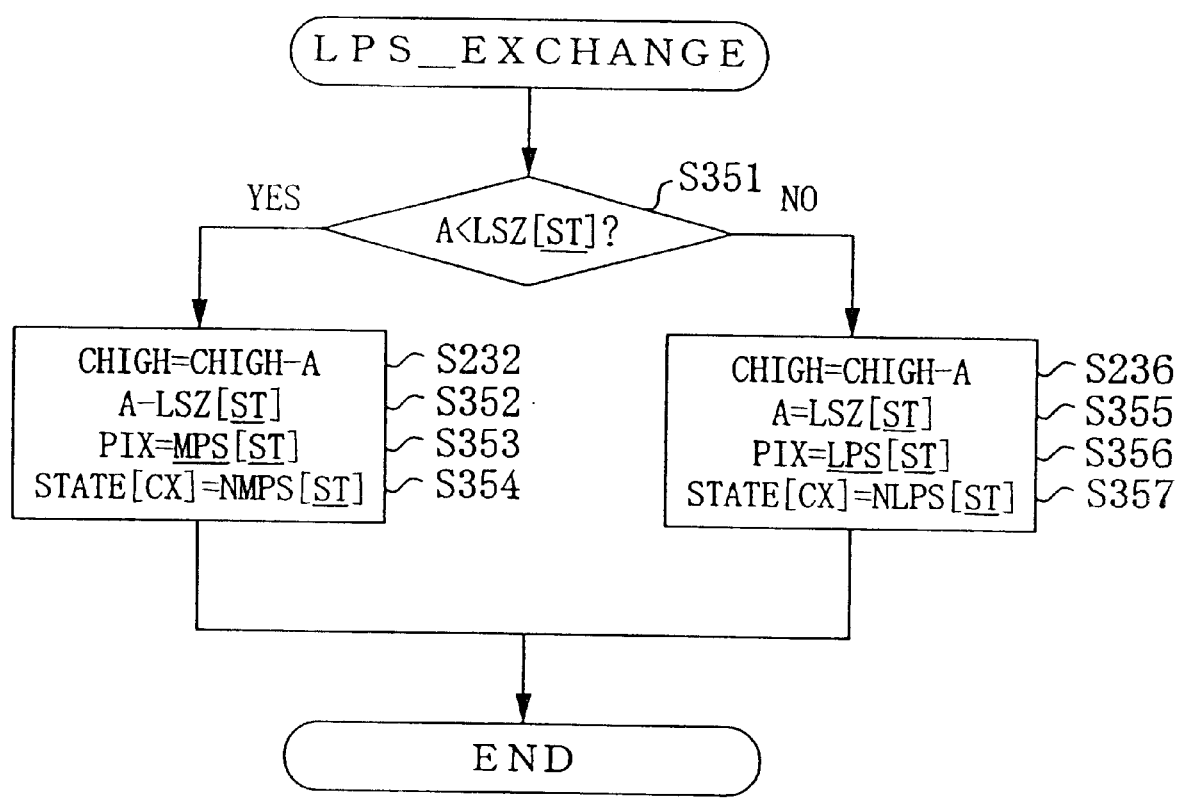
FIG. 36 shows LPS_EXCHANGE processing flow according to the present invention.

FIG. 36 shows the LPS_EXCHANGE processing flow and corresponds to FIG. 21 of the conventional related art. The index of the LSZ table 12 of steps S351, S352, and S355 and the NMPS table 13 of step S354 and the NLPS table 14 of step S357 become the variable ST. The variable table of steps S354 and S357 are changed to the STATE table 47 from the ST table 11. Processing is the same as the conventional related art. The pixel values obtained by the MPS decoding ("Yes" at step S351) and the LPS decoding ("No" at step S351) become the prediction value (step S353) and the non-prediction value (step S356), respectively, obtained by referring to the MPS table 49 and the LPS table 48 using the variable ST as the index. If the LPS table 48 is not used, an operation of "1-MPS(ST)" is calculated. Detection of the inversion of prediction value at step S239 and the inversion at step S240 become unnecessary by performing step S357, which corresponds to S241 of the conventional related art.

Figure 22:
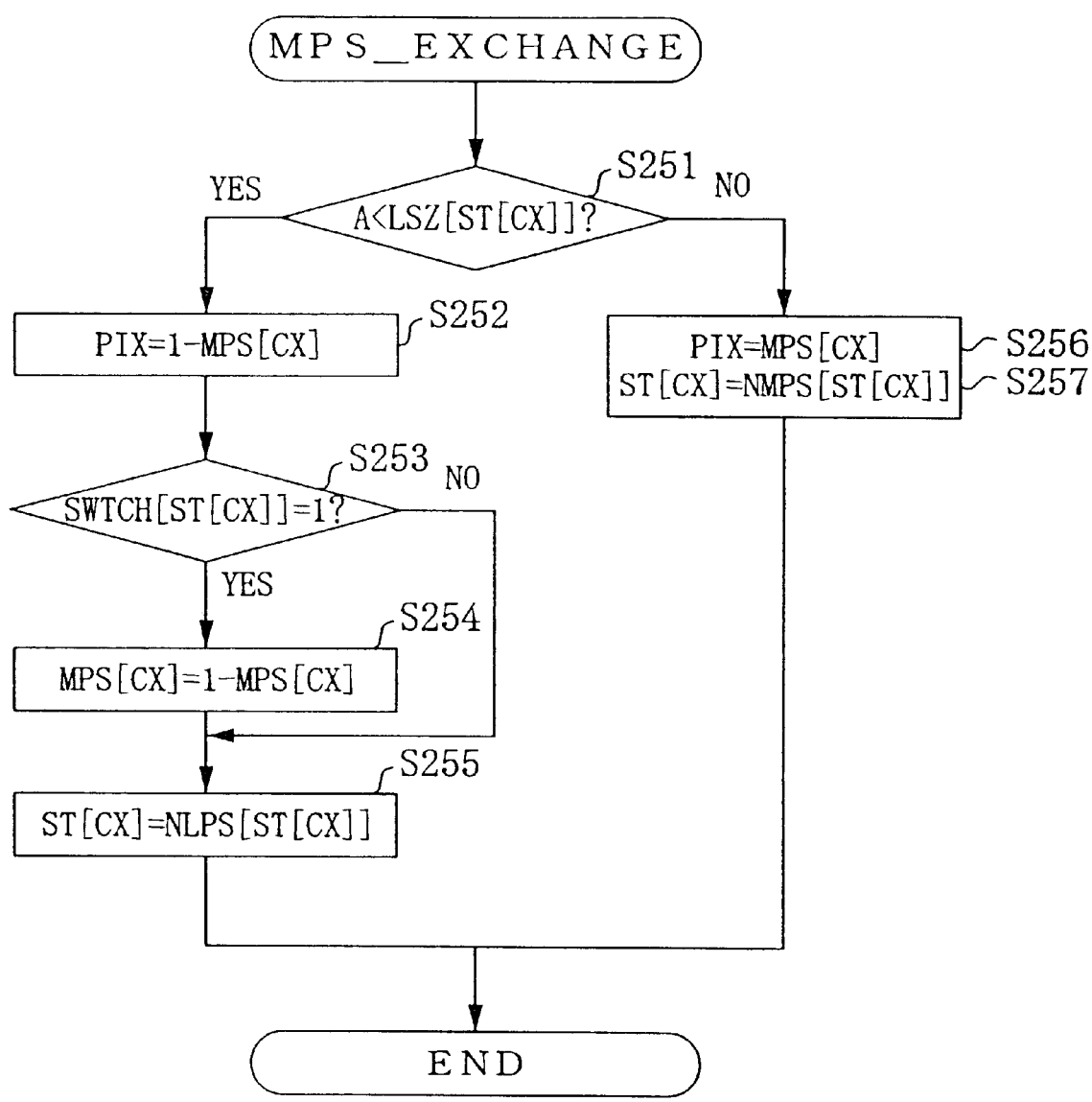
FIG. 22 shows a conventional MPS_EXCHANGE processing flow.
Figure 37:
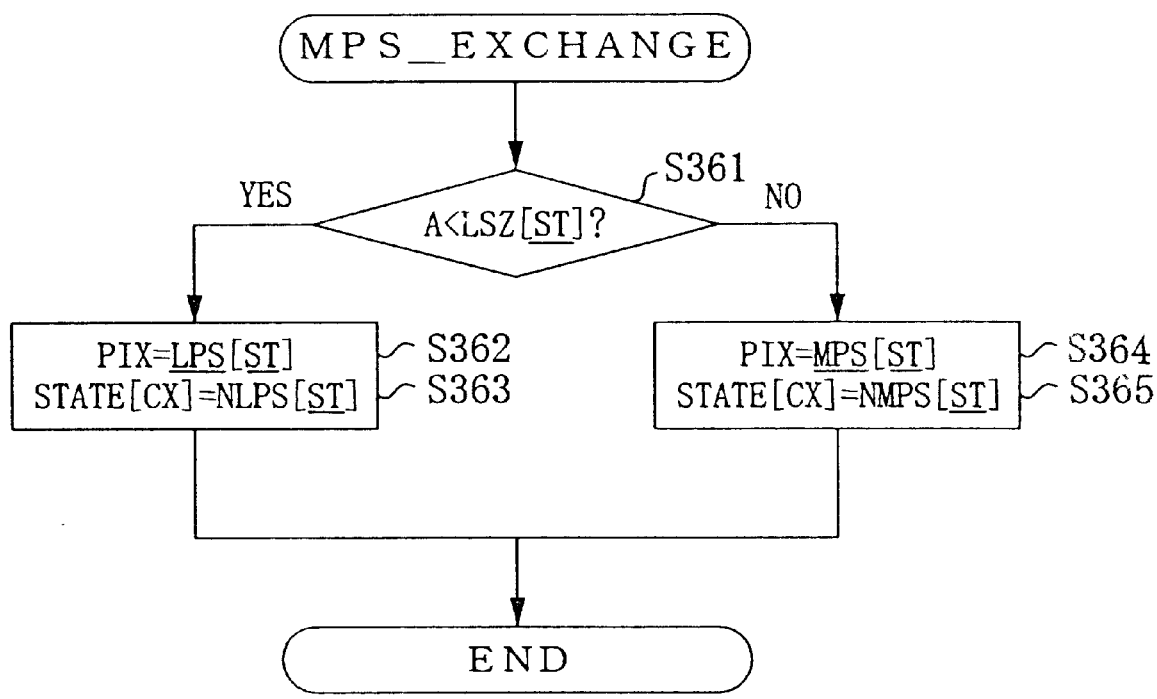
FIG. 37 shows MPS_EXCHANGE processing flow according to the present invention.

FIG. 37 shows the MPS_EXCHANGE processing flow and corresponds to FIG. 22 of the conventional related art. The index of the LSZ table 12 of step S361 and the NMPS table 13 of step S364 become the variable ST and the variable table of steps S354 and S357 are changed to the STATE table 47 from the ST table 11. Processing is the same as the conventional related art. The pixel values obtained by the MPS decoding ("No" at step S361) and the LPS decoding ("Yes" at step S361) become the prediction value (step S364) and the non-prediction value (step S362), respectively, obtained by referring to the MPS table 49 and the LPS table 48 using the variable ST as the index. If the LPS table is not used, an operation of "1-MPS(ST)" is calculated. The detection of the inversion of prediction value at step S253 and the inversion at step S254 become unnecessary by performing step S363, which corresponds to step S255 of the conventional related art.

Figure 23:
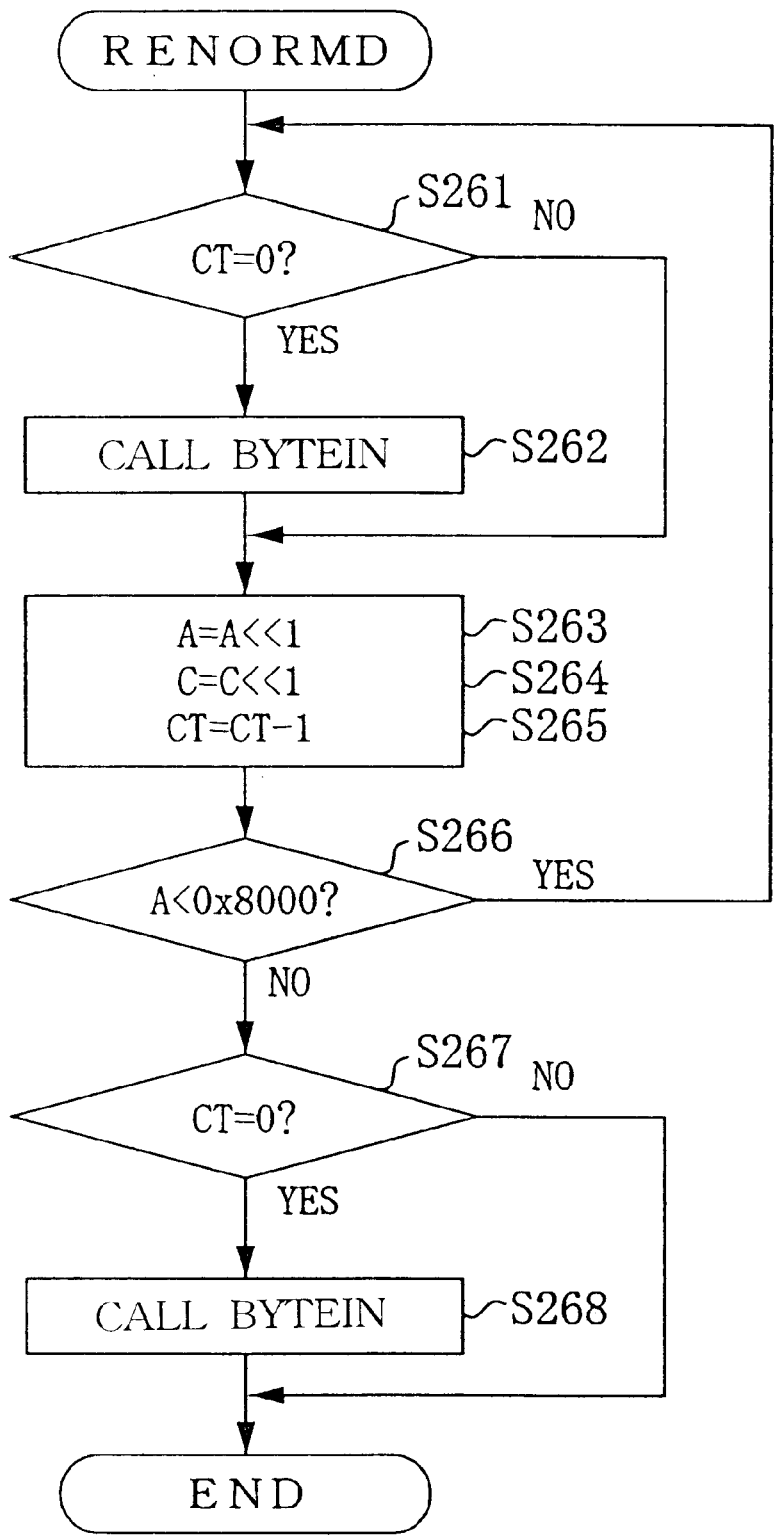
FIG. 23 shows a conventional RENORMD processing flow.
Figure 38:
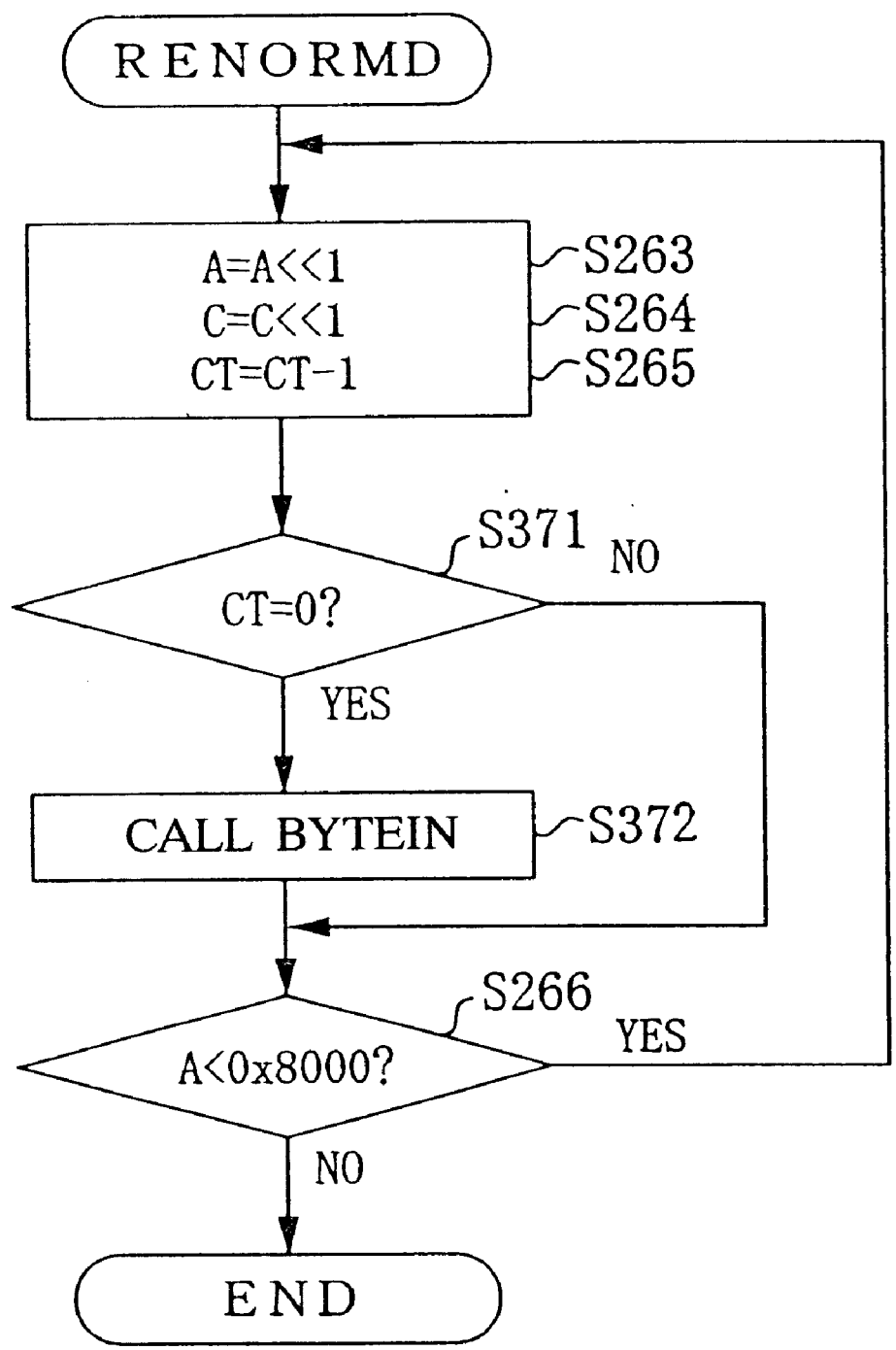
FIG. 38 shows RENORMD processing flow according to the present invention.

FIG. 38 shows the RENORMD processing flow and corresponds to FIG. 23 of the conventional related art. Processing is the same as the RENORME processing flow of the encoding process except that the outputting process of the code (BYTEOUT) becomes the inputting process of the code (BYTEIN). The shape of the processing flow is identical to the flow of encoding process. The conventional processing flow can be applied to this process, however, the number of processing steps can be reduced by using the processing flow according to the embodiment.

Figure 25:
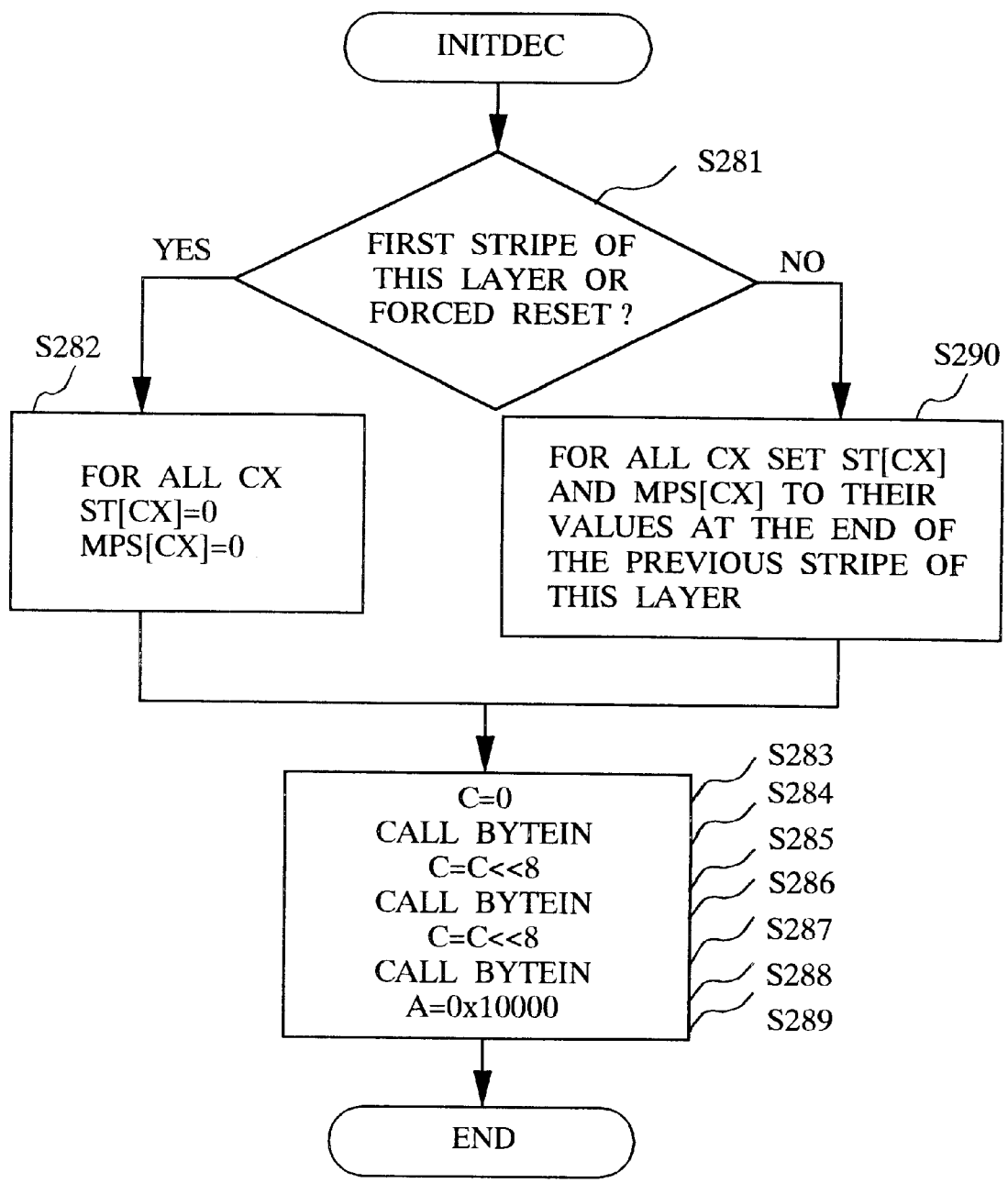
FIG. 25 shows a conventional INITDEC processing flow.
Figure 39:
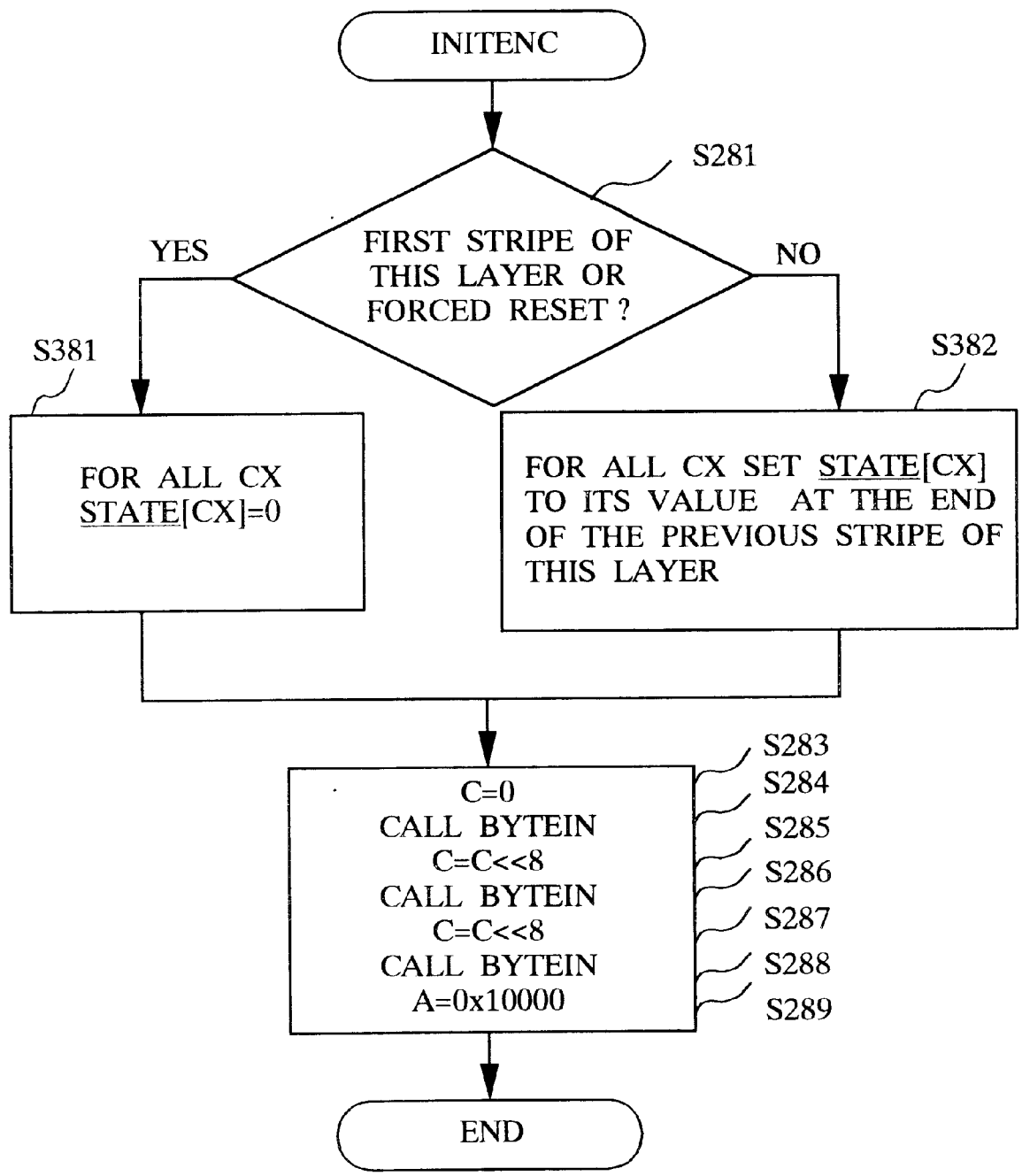
FIG. 39 shows INITDEC processing flow according to the present invention.
Figure 40:
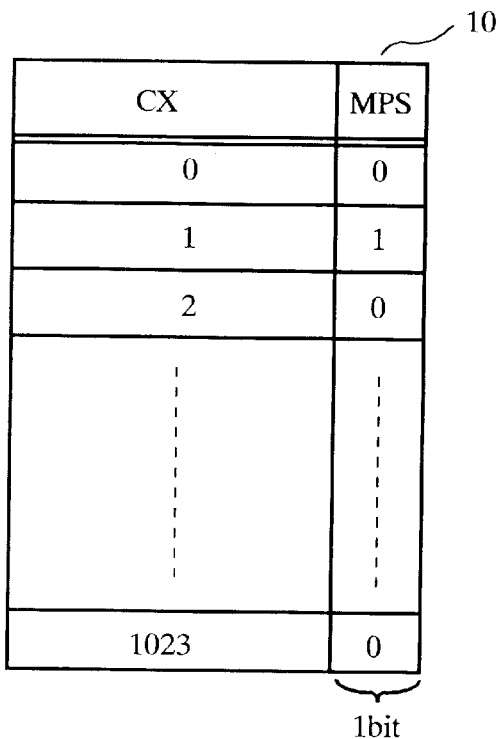
FIG. 40 shows a conventional MPS table.
Figure 41:
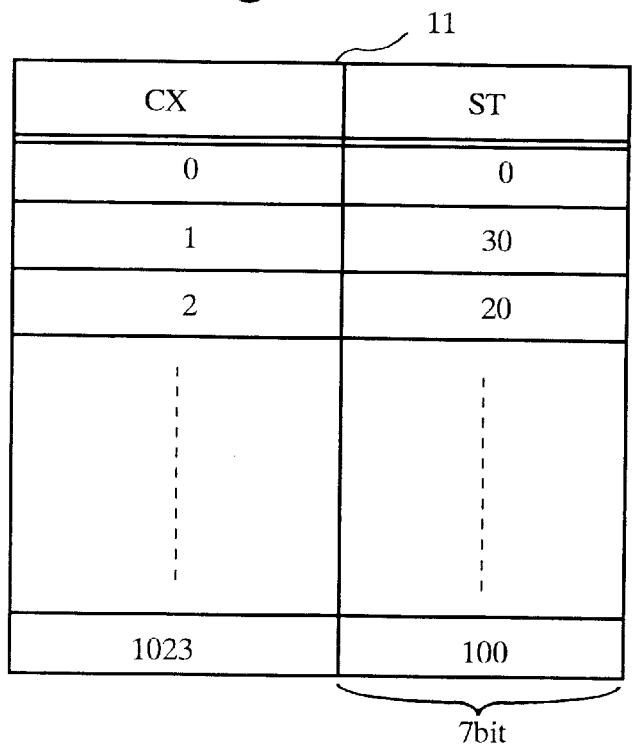
FIG. 41 shows a conventional ST table.
Figure 43:
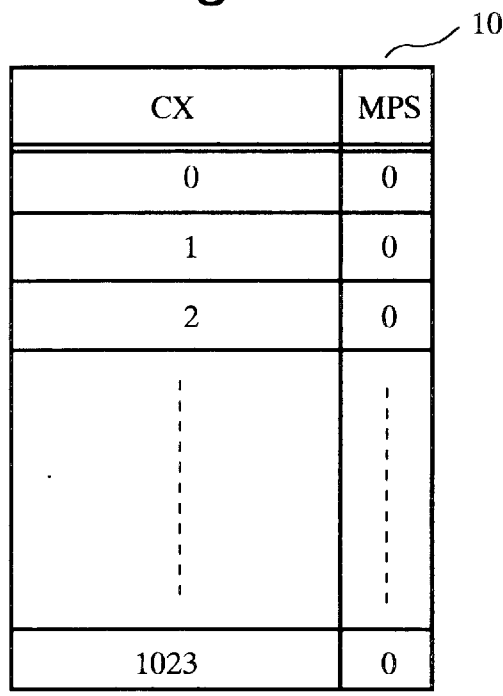
FIG. 43 shows a conventional MPS table.
Figure 44:
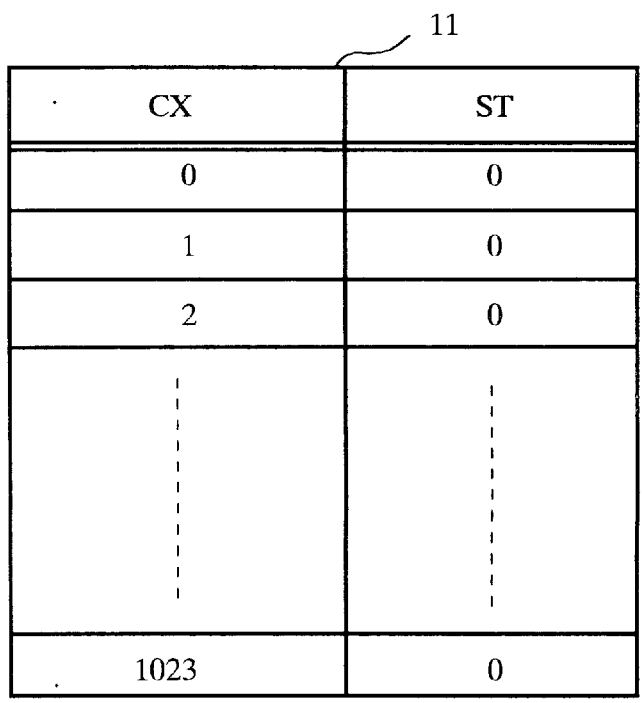
FIG. 44 shows a conventional ST table.
Figure 45:
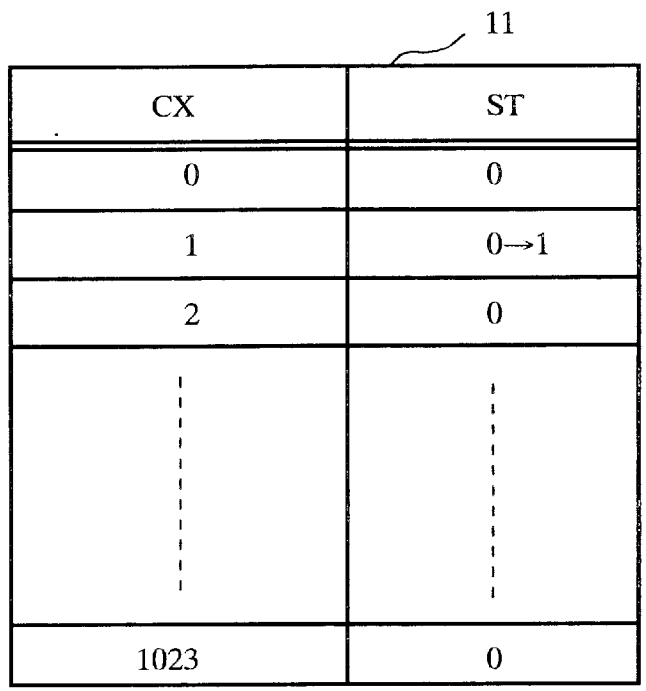
FIG. 45 shows a conventional ST table.
Figure 46:
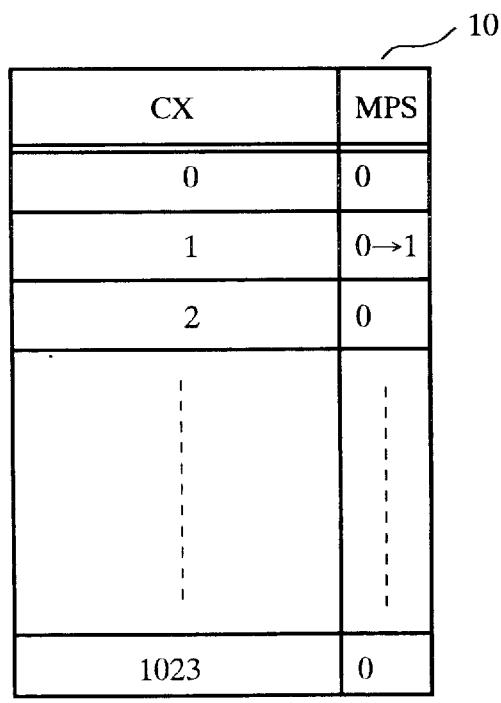
FIG. 46 shows a conventional MPS table.

FIG. 39 shows the INITDEC processing flow and corresponds to FIG. 25 of the conventional related art. Since the variable ST table 11 and the MPS table 10 are united into the STATE table 47, processing is changed to that only the STATE table 47 is initialized. Processing is performed in the same way as the conventional processing flow.

An effect obtained by introducing the first embodiment of the invention using an evaluation image is shown in FIG. 57. In case of encoding/decoding an error diffusion image, an LPS occurrence probability is higher than the LPS occurrence probability in encoding/decoding a character image. The more the number of performing SWTCH detection increases, the greater the number of inversion of prediction value becomes. Accordingly, it is especially effective to apply this first embodiment, which does not require the SWTCH detection and the inversion of prediction value, to pseudo-half tone image such as an error diffusion image and a dither image, which is difficult to be compressed by encoding.

In the first embodiment, an example of the arithmetic encoding is explained. In the QM-Coder, the carry-over range is not limited, the coordinate value itself is output/input as a code. The first embodiment can be applied to the case, on the contrary, when the range of the carry-over to the high order bits of the code is limited, such as a method for stuffing a control signal into the code (e.g., bit-stuffing method) and a method where a part of effective interval is removed and a coordinate, unable to be stored, is forced to be determined when the carry may occur. In such cases, the processes of the BYTEOUT processing, the FINALWRITES processing, the BYTEIN processing, the INITENC processing and the INITDEC processing may be changed, which does not prevent applying this embodiment to the above-mentioned methods.

In summary, in this embodiment, in case of encoding/decoding the Morkov information source data, on controlling the states for context specifying the events and the prediction value corresponding to the context by a table, the prediction value, which is conventionally a variable for the context, becomes a constant corresponding to the state by multiplexing the number of states for the prediction value. As described above, in this invention, the prediction value is not directly referred from the context, but is indirectly referred from the state controlled by the state transition.

In this embodiment, an example of QM-Coder for an application of the arithmetic encoding as entropy encoding has been explained. The application of this embodiment is not limited to the arithmetic encoding, but other application can be made to a block encoding method using such as Huffman code, an entropy encoding method specified as a universal encoding method and so on. Further, this embodiment is not limited to encoding binary data.

In this embodiment, all the states of the STATE table are initialized to "0" as shown in FIG. 49. Initialization can be performed by any value as long as the value of the STATE table of the encoding apparatus and the STATE table of the decoding apparatus are set to the identical initial value.

In this embodiment, the context is continuously set to the same value (CX=1). This embodiment can be applied to the case the context is not always set to the same value.

In the following, a feature of the application of this embodiment to the case of encoding binary data will be described.

In case of encoding binary data, the prediction value is updated by duplication (doubling) by inverting the prediction value. The prediction value for encoding data being more than three-valued cannot be always updated to the same value. In case of data being N-valued, the prediction value cannot be updated only by multiplexing with N, but should be updated by multiplexing with the number of combinations, $_NC_2$. There maybe a case where multiplexing becomes impossible only for eliminating the updating process.

Embodiment 2

In the constant table (probability estimation table) of the QM-Coder explained in Embodiment 1, for example, the conventional prediction value is set at the high order 1 bit and the conventional state number is set in the low order 7 bits among the bits of the index (the STATE value of 8 bits) of the constant table, which is configured by duplication of the state.

In this embodiment, the constant table is set in another way, that is, among the bits of the index (the STATE value of 8 bits), the conventional prediction value is set at the low order 1 bit and the conventional state number is set in the high order 7 bits.

As for the states ST which is conventionally indicated by the state number ST=0–112, When the prediction value is 0, the state number becomes even number and the following value become:

LSZ[ST×2]=LSZ(ST);

NMPS[ST×2]=NMPS(ST)×2;

NLPS[ST×2]=NLPS(ST)×2+SWTCH(ST);

MPS[ST×2]=0;

LPS[ST×2]=1.

When the prediction value is 1, the state number becomes odd number and the following value become:

LSZ[ST×2+1]=LSZ(ST);

NMPS[ST×2+1]=NMPS(ST)×2+1;

NLPS[ST×2+1]=NLPS(ST)×2+(1−SWTCH(ST));

MPS[ST×2+1]=1;

LPS[ST×2+1]=0.

FIGS. 58 and 59 show the constant tables generated by the above operation.

The state number 1 is not actually used, and the number of states is 225 states as well as in Embodiment 1. Since the conventional initial state number 0 becomes state number 0 when the constant table is set in the above way, no special change is required except exchanging the constant tables for the processing flow of encoding and decoding described in the first embodiment. The prediction value (MPS) can be obtained only by referring to the low order 1 bit of the state number. The non-prediction value (LPS) is obtained by inverting the above prediction value (MPS).

It is an advantage of this embodiment as well as the first embodiment that the second embodiment retains compatibility with the conventional method by using the high order 7 bits of the STATE table 47 for the conventional ST table 11, the low order 1 bit of the STATE table 47 for the MPS table 10.

Figure 56:
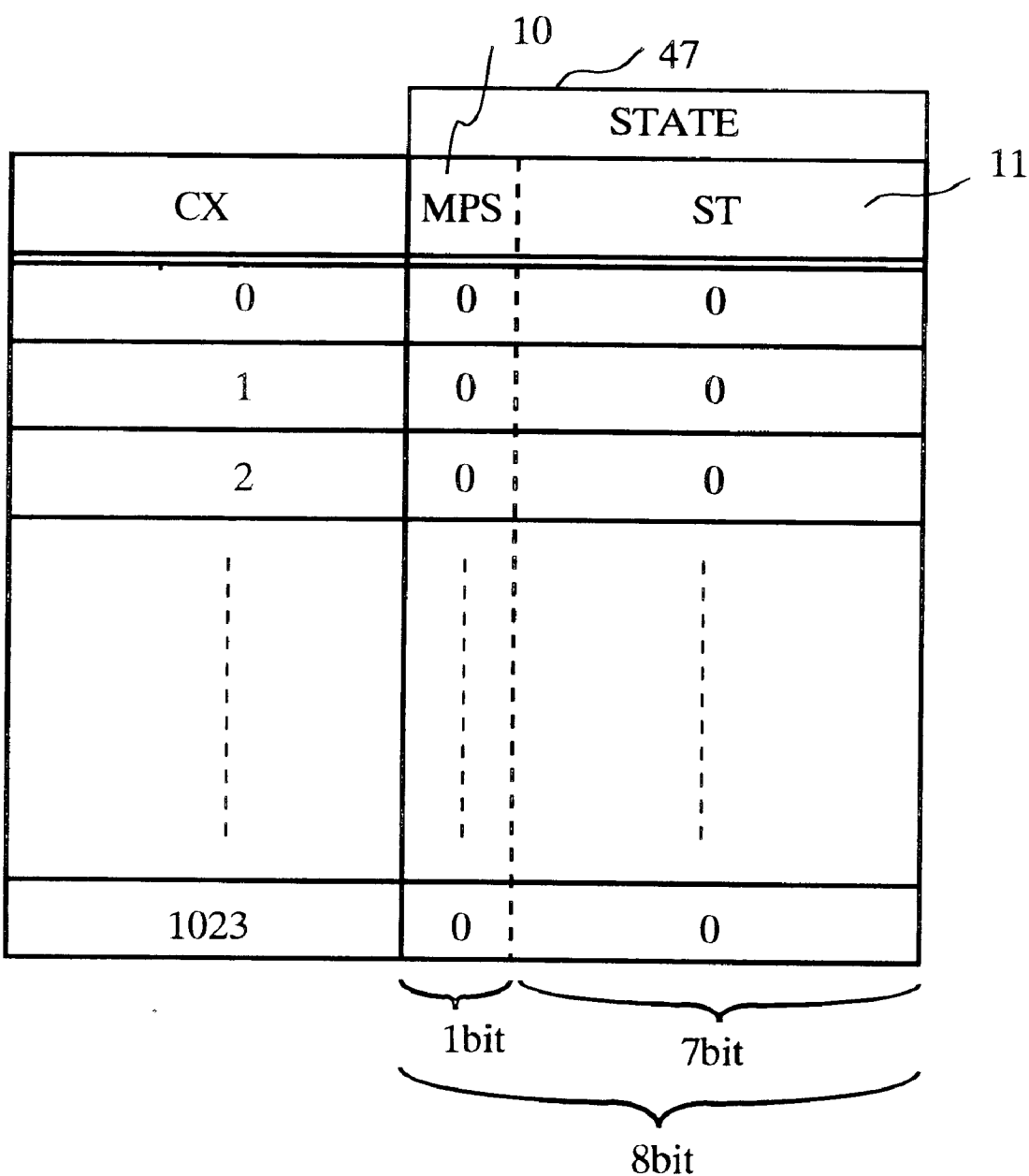
FIG. 56 shows a compatibility between the STATE table of the present invention and the conventional variable table.
Figure 60:
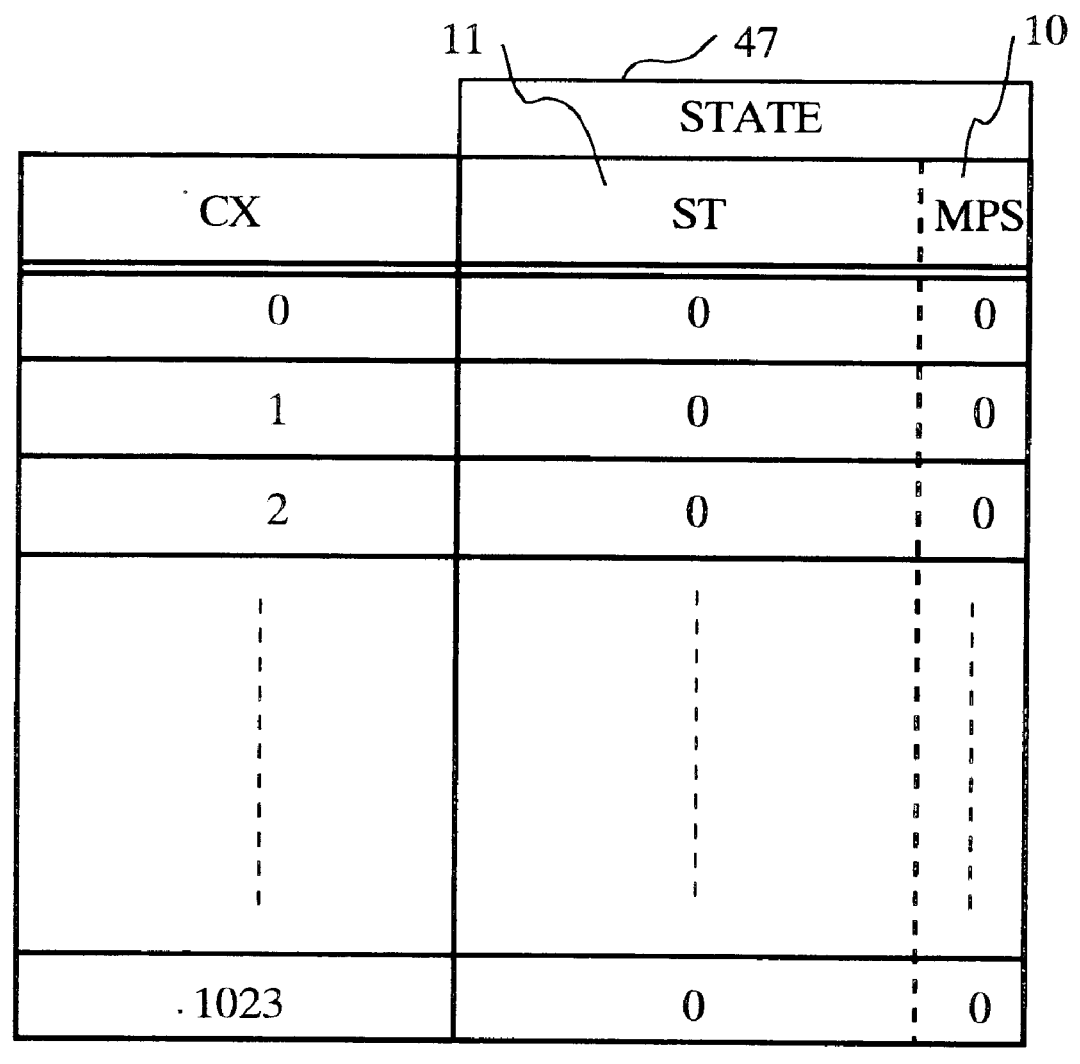
Figure 61:
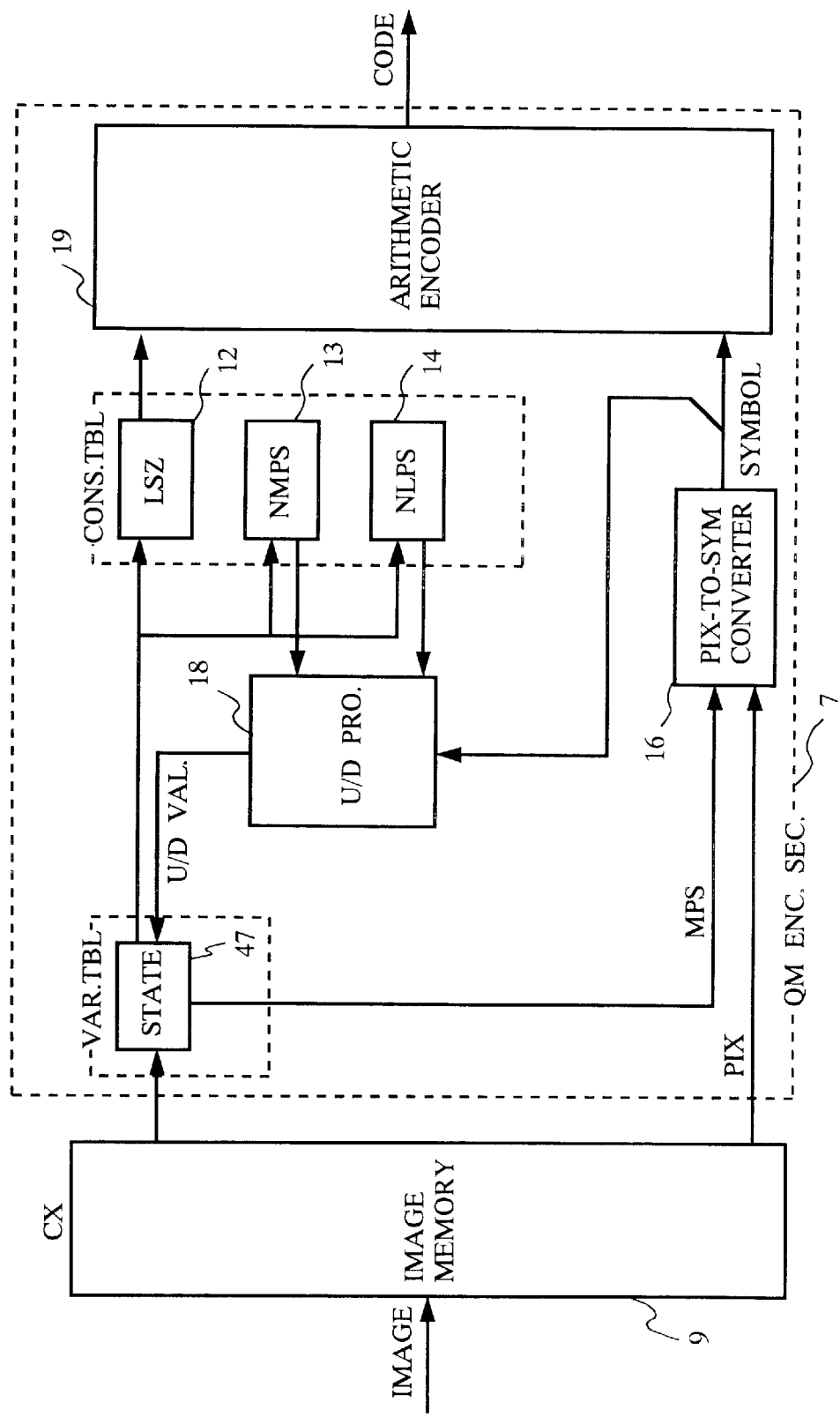
FIG. 61 shows a general configuration of an encoding apparatus according to the present invention.
Figure 62:
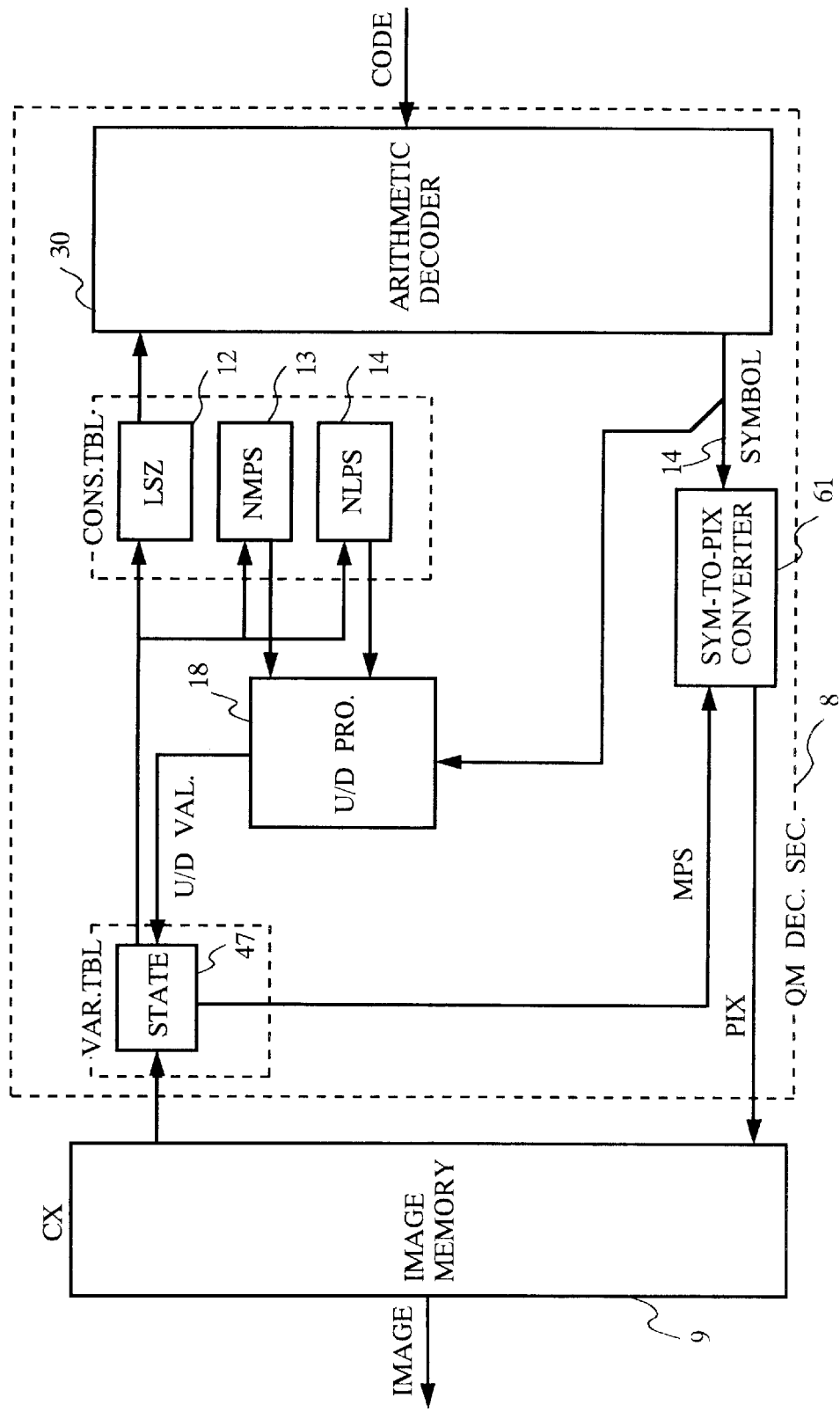
FIG. 62 shows a general configuration of a decoding apparatus according to the present invention.

FIGS. 61 and 62 show other configurations using the STATE table 47 shown in FIGS. 56 and 60. The MPS value set at the first bit or the eighth bit is input to the pixel-to-symbol converter 16 or the symbol-to-pixel converter 61. The MPS table 49 (and the LPS table 48) is eliminated.

The first and second embodiments respectively show setting method for the constant table to duplicate the states. It is possible to set the prediction value and the state number at random onto the newly indicated state number without clearly dividing the state number into high order bits and low order bits. In the present invention, the state is multiplexed corresponding to the prediction value to increase the number of states and the correspondence is made between the newly indicated state number and the conventional state number and prediction value. The important feature of the present invention is to eliminate the detection and the implementation of the conventional inversion of prediction value by the state transition. The present invention does not limit the way how to set the numbers showing the conventional prediction value and the conventional state number onto the newly indicated state number. When the prediction value (MPS) and the non-prediction value (LPS) are specified in the table, there is no need to set the table so as to show a specific value using a specific bit of the state number: for example, the table is set so that the preceding bit of the specific bit shows the prediction value 0 and following bit of the specific bit shows the prediction value 1; or the table is set so that when the state number is even number, the prediction value is 0 and the state number is odd number, the prediction value is 1. only example cases are shown in the first and the second embodiments, where it is easy to use compatibly with the conventional variable tables. If the table is set in another way so that the index appears at random on multiplexing the values of the table, the conversion becomes complex from the conventional state number and the conventional prediction value into the newly indicated state number. However, as long as the newly indicated state number corresponds to the conventional state number and the conventional prediction value one by one, the same effect can be obtained as the first and the second embodiments.

As has been described, according to the present invention, the prediction value is previously set corresponding to the state. The number of processes can be reduced by controlling and updating only the state, which makes implementation of encoding/decoding in a high-speed. The processes for detection and implementation of the inversion of prediction value can be eliminated by performing the state transition.

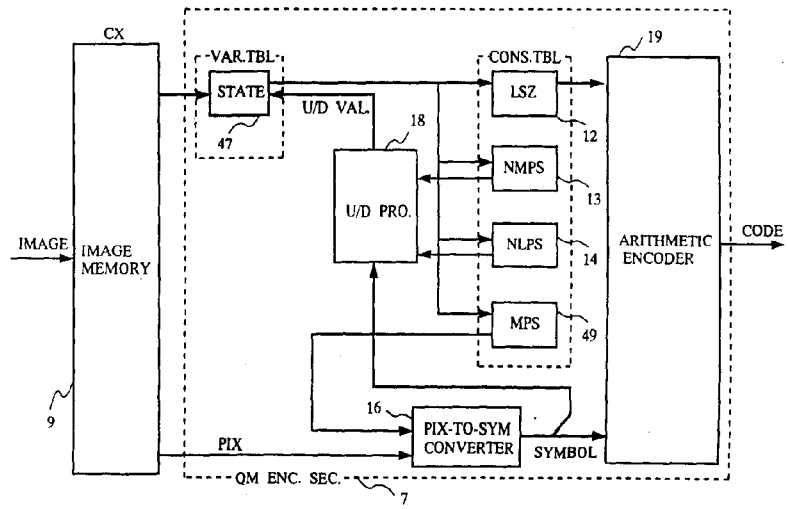

What is claimed is:

1. An encoding apparatus comprising:
a state memory storing a plurality of extended state variables, each of said extended state variables having a combination of a prediction value corresponding to a target data element to be coded and a state representing an occurrence probability corresponding to a context, said context being configured based on a reference data element correlative to said target data element;
an encoder encoding said target data element in accordance with said prediction value and said state; and
an updater updating one of said extended state variables in accordance with said target data element and said prediction value.

2. The encoding apparatus of claim 1, further comprising:
a data memory storing said target data element and said reference data element and outputting said target data element and said context; and
a constant table storing said occurrence probability and said prediction value for said extended state as constants, receiving the said extended state for the target data element from said state memory, and outputting the occurrence probability and the prediction value for the target data element;
said encoder including,
a target data element converter receiving the target data element from said image memory, receiving the prediction value from said constant table, comparing the target data element with the prediction value, converting the target data element to a symbol, and outputting the symbols,
an entropy encoder receiving the interval size for the target data element from the constant table, receiving the symbol from the target data element converter, and encoding the symbol based on the interval size, and outputs a code.

3. The encoding apparatus of claim 2, wherein the constant table includes a prediction value table for outputting said prediction value using said extended state variables stored in said state memory as an index.

4. The encoding apparatus of claim 2, wherein said state memory stores the extended state variables including the prediction value in a predetermined bit thereof, the predetermined bit being used as a part of the constant table.

5. The encoding apparatus of claim 4, wherein the predetermined bit of said state memory is either a high order bit or a low order bit for indicating the prediction value.

6. The encoding apparatus of claim 4, wherein the constant table includes a next extended state, and using the extended state value stored in the state memory as an address, using the next extended state indicating a transit position of the extended state of said state memory.

7. The encoding apparatus of claim 2 wherein said entropy encoder is an arithmetic encoder and the occurrence probability stored in said state memory is the interval size.

8. The encoding apparatus of claim 1 is installed in one of a computer, a scanner, a facsimile, a printer, a database, and a semiconductor chip.

9. The encoding apparatus according to claim 1, wherein said updater updates said prediction value and said state substantially simultaneously.

10. The encoding apparatus according to claim 9, wherein said encoder encodes image data and said target data element is a target pixel to be coded;
said reference data element is a reference pixel adjacent to said target pixel; and
said occurrence probability represents interval size.

11. A decoding apparatus comprising:
a state memory storing a plurality of extended state variables, each of said extended state variables having a combination of a prediction value corresponding to a target data element to be decoded and a state representing an occurrence probability corresponding to a context, said context being configured based on at least one decoded data element correlative to said target data element;
an decoder decoding a code representative of the target data element in accordance with the prediction value to produce said target data element; and
an updater updating the extended state variables in accordance with said target data element and said prediction value.

12. The decoding apparatus of claim 11, further comprising:
a data memory for storing one or more received decoded data elements usable as reference data elements in the decoding process as context for decoding a nearby target data element, and outputting a context configured based on the reference data elements correlated to the target data element to be decoded;
a constant table storing said occurrence probability and said prediction value corresponding to said extended state a constants, receiving said extended state for the target data element from said state memory, and outputting one of the occurrence probability for the target data element to be decoded, the prediction value and a non-prediction value;
said decoder including,
an entropy decoder receiving the interval size of the target data element, decoding a code representative of the target data element into a symbol, and outputting the symbol; and
a target data element converter for converting the symbol into the decoded target data element by referring to one of the prediction value and the non-prediction value of the constant table and outputting the decoded symbol as the decoded target data element to the image.

13. The decoding apparatus of claim 12, wherein the constant table includes a prediction value table for outputting said prediction value using said extended state variables stored in said state memory as an index.

14. The decoding apparatus of claim 13, wherein the state said state memory stores the extended state variables including the prediction value in a predetermined bit thereof, the predetermined bit being used as a part of the constant table.

15. The decoding apparatus of claim 14, wherein the predetermined bit of said state memory is either a high order bit or a low order bit for indicating the prediction value.

16. The decoding apparatus of claim 14, wherein:
the constant table includes a next extended state, and using the extended state value stored in the state memory as an address, using the next extended state indicating a transit position of the extended state of said state memory.

17. The encoding apparatus of claim 12 wherein said entropy encoder is an arithmetic encoder and the occurrence probability stored in said state memory is the interval size.

18. The decoding apparatus of claim 11 is installed in one of a computer, a scanner, a facsimile, a printer, a database, and a semiconductor chip.

19. The decoding apparatus according to claim 11, wherein said updater updating said prediction value and said state substantially simultaneously.

20. The decoding apparatus according to claim 19, wherein said decoder decodes image data and said target data element is decoded to form a target pixel value;

said decoded data element being a reference pixel adjacent to said target pixel; and said occurrence probability represents interval size.

21. The decoding apparatus of claim 11 further comprising a constant table for storing an inverted value of the prediction value related to the interval;

the storing of said inverted value in said constant table enabling said updater to update the extended state variables without the need to update the prediction value due to reversal in the occurrence probability.

22. The decoding apparatus of claim 21 wherein said constant table is a Less Probable Symbol table.

23. A encoding method comprising:

a) storing a plurality of extended state variables, each of said extended state variables having a combination of a prediction value corresponding to a target data element to be coded and a state representing an occurrence probability corresponding to a context, said context being configured based on a reference data element correlative to said target data element;

b) encoding said target data element in accordance with said prediction value and said state; and c) updating one of said extended state variables in accordance with said target data element and said prediction value.

24. The encoding method of claim 23 further comprising:

d) generating the context from the values of a plurality of reference pixels adjacent to the target pixel to be encoded;

e) obtaining a prediction value predicting the value of said target pixel based on the context;

f) obtaining a state number of the state for the encoded target element; and g) determining the prediction value based on the state number; and h) obtaining a symbol by comparing the prediction value and the encoded target element;

i) obtaining an interval based on the state number for the target data element; and encoding the pixel based on the symbol and the interval.

25. The encoding method of claim 23 wherein said step c) of updating updates said prediction value and said state substantially simultaneously.

26. The encoding method of claim 25 wherein said step b) of encoding encodes image data and said target data element is a target pixel to be coded;

said reference data element is a reference pixel adjacent to said target pixel; and said occurrence probability represents interval size.

27. A method of decoding comprising:

a) storing a plurality of extended state variables, each of said extended state variables having a combination of a prediction value corresponding to a target data element to be decoded and a state representing an occurrence probability corresponding to a context, said context being configured based on at least one decoded data element correlative to said target data element;

b) decoding a code representative of the target data element in accordance with the prediction value to produce said target data element; and c) updating the extended state variables in accordance with said target data element and said prediction value.

28. The decoding method of claim 27 further comprising:

d) generating the context from the values of a plurality of reference data elements adjacent to the target pixel to be encoded;

e) obtaining a prediction value predicting the value of said target data element based on the context;

f) obtaining a state number of the state for the target data element; and g) determining the prediction value based on the state number;

h) obtaining an interval based on the state number for the target data element;

i) decoding an inputted code based on the interval and outputting a symbol; and j) obtaining the decoded value of the target pixel based on the prediction value and the symbol.

29. The method of claim 27 wherein said step c) of updating updates said prediction value and said state substantially simultaneously.

30. The method of claim 29 wherein said step b) of decoding decodes image data and said target data element is decoded to form a target pixel value;

said decoded data element being a reference pixel adjacent to said target pixel; and said occurrence probability represents interval size.

31. The method of claim 27 further comprising a providing constant table for storing an inverted value of the prediction value related to the interval;

said step c) updating the extended state variables without the need to update the prediction value due to reversal in the occurrence probability due to the storing of said inverted value in said constant table.

32. The method of claim 31 wherein said constant table is a Less Probable Symbol table.

* * * * *

UNITED STATES PATENT AND TRADEMARK OFFICE
CERTIFICATE OF CORRECTION

PATENT NO.     : 6,351,569 B1
DATED          : February 26, 2002
INVENTOR(S)    : Kimura et al.

It is certified that error appears in the above-identified patent and that said Letters Patent is hereby corrected as shown below:

<u>Title page,</u>
Title page, showing an illustrated figure, should be deleted and substitute therefor the attached page.

Signed and Sealed this

Seventeenth Day of December, 2002

JAMES E. ROGAN
*Director of the United States Patent and Trademark Office*

United States Patent
Kimura et al.

(10) Patent No.: US 6,351,569 B1
(45) Date of Patent: Feb. 26, 2002

(54) CODING METHOD, DECODING METHOD, CODING DEVICE AND DECODING DEVICE

(75) Inventors: Tomohiro Kimura; Masayuki Yoshida; Fumitaka Ono, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/155,166

(22) PCT Filed: Jan. 14, 1998

(86) PCT No.: PCT/JP98/00102

§ 371 Date: Sep. 23, 1998

§ 102(e) Date: Sep. 23, 1998

(87) PCT Pub. No.: WO98/33322

PCT Pub. Date: Jul. 30, 1998

(30) Foreign Application Priority Data

Jan. 29, 1997 (JP) .............................. 9-015536

(51) Int. Cl.[7] .............................................. G06K 9/36
(52) U.S. Cl. .................................. 382/247; 382/233
(58) Field of Search .................................. 382/238, 239, 382/240, 241, 242, 243, 244, 245, 246, 247, 248, 249; 348/415, 416, 417

(56) References Cited

U.S. PATENT DOCUMENTS

| | | | |
|---|---|---|---|
| 4,191,974 A | 3/1980 | Ono et al. | |
| 4,213,154 A | 7/1980 | Ono et al. | |
| 4,542,411 A | 9/1985 | Imanaka et al. | |
| 4,816,914 A | * 3/1989 | Ericsson | 358/133 |
| 4,849,810 A | * 7/1989 | Ericsson | 358/133 |
| 5,059,976 A | 10/1991 | Ono et al. | |
| 5,297,220 A | 3/1994 | Nomizu | |
| 5,307,062 A | 4/1994 | Ono et al. | |
| 5,313,204 A | 5/1994 | Semasa et al. | |
| 5,404,140 A | 4/1995 | Ono et al. | |
| 5,828,411 A | * 10/1998 | Takizawa | 348/415 |
| 5,960,116 A | * 9/1999 | Kajiwara | 382/238 |

FOREIGN PATENT DOCUMENTS

| | | |
|---|---|---|
| JP | A6 38048 | 2/1994 |
| JP | B2834433 | 3/1996 |
| JP | B22504316 | 4/1996 |

OTHER PUBLICATIONS

Japanese abstract: JPA5-176171 Jul. 13, 1993.
Japanese abstract: JPA4-122174 Apr. 22, 1992.
Japanese abstract: JPA2-305225, Dec. 18, 1990.

(List continued on next page.)

*Primary Examiner*—Phuoc Tran
*Assistant Examiner*—Amir Alavi

(57) ABSTRACT

A prediction value is previously set in an MPS table corresponding to a state number, a state number for an encoding pixel is obtained from a STATE table, the prediction value is determined based on the MPS table using the state number, a pixel-to-symbol converter compares the prediction value and the encoding pixel to obtain a symbol, and an arithmetic encoder obtains an LPS interval from an LSZ table using the state number for the encoding pixel, and the arithmetic encoder implements encoding based on the symbol and the LPS interval.

32 Claims, 56 Drawing Sheets